US012621101B2

(12) United States Patent
Qiao et al.

(10) Patent No.: US 12,621,101 B2
(45) Date of Patent: May 5, 2026

(54) METHOD FOR TRANSMITTING SYNCHRONIZATION/PHYSICAL BROADCAST CHANNEL BLOCK AND APPARATUS

(71) Applicant: HUAWEI TECHNOLOGIES CO., LTD., Shenzhen (CN)

(72) Inventors: Liang Qiao, Shenzhen (CN); Jiayin Zhang, Shanghai (CN); Weiwei Fan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 622 days.

(21) Appl. No.: 17/965,045

(22) Filed: Oct. 13, 2022

(65) Prior Publication Data

US 2023/0050092 A1 Feb. 16, 2023

Related U.S. Application Data

(63) Continuation of application No. PCT/CN2021/087274, filed on Apr. 14, 2021.

(30) Foreign Application Priority Data

Apr. 14, 2020 (CN) ......................... 202010292119.6
Oct. 15, 2020 (CN) ......................... 202011106045.9
Feb. 7, 2021 (CN) ......................... 202110169543.6

(51) Int. Cl.
*H04L 5/00* (2006.01)
*H04W 72/04* (2023.01)
*H04W 72/0446* (2023.01)

(52) U.S. Cl.
CPC ....... *H04L 5/0051* (2013.01); *H04W 72/0446* (2013.01)

(58) Field of Classification Search
CPC ......................... H04L 5/0051; H04W 72/0446
See application file for complete search history.

(56) References Cited

U.S. PATENT DOCUMENTS

2019/0132810 A1* 5/2019 Wang ................ H04W 72/0446
2019/0200307 A1 6/2019 Si et al.
(Continued)

FOREIGN PATENT DOCUMENTS

CN 109392080 A 2/2019
CN 110336655 A 10/2019
(Continued)

OTHER PUBLICATIONS

Huawei et al, "On QCL indication and time repetition of SS blocks", 3GPP TSG RAN WG1 Meeting NR#3 R1-1715565, Sep. 21, 2017, total 2 pages.
(Continued)

*Primary Examiner* — Ronald B Abelson
(74) *Attorney, Agent, or Firm* — HAUPTMAN HAM, LLP

(57) ABSTRACT

This application provides a method for transmitting an SS/PBCH block and an apparatus. The method includes: A terminal device receives one SS/PBCH block in an SS/PBCH block burst set, and then obtains indication information based on the one SS/PBCH block. The indication information may be used to indicate candidate indexes of at least one SS/PBCH block in the SS/PBCH block burst set, and a quantity of the candidate indexes is greater than 64. For example, the quantity of candidate indexes may be 128, 160, 180, 196, 240, or the like. A network device may not be limited to 64 candidate indexes. In other words, a quantity of candidate positions used to send the SS/PBCH block is not limited to 64. Therefore, the network device may send a larger quantity of SS/PBCH blocks to the terminal device.

12 Claims, 20 Drawing Sheets

(56) References Cited

U.S. PATENT DOCUMENTS

| | | | | |
|---|---|---|---|---|
| 2020/0280940 | A1* | 9/2020 | Kim | H04J 11/0086 |
| 2020/0304260 | A1* | 9/2020 | Si | |
| 2020/0396747 | A1* | 12/2020 | Lee | H04W 72/54 |
| 2021/0235419 | A1* | 7/2021 | Si | H04W 16/14 |
| 2022/0086904 | A1* | 3/2022 | Ko | H04W 56/0015 |

FOREIGN PATENT DOCUMENTS

| | | | |
|---|---|---|---|
| CN | 110402557 | A | 11/2019 |
| EP | 3758260 | A1 | 12/2020 |
| EP | 3906748 | A1 | 11/2021 |
| WO | 2019050993 | A1 | 3/2019 |
| WO | 2019184563 | A1 | 10/2019 |
| WO | 2020175950 | A1 | 9/2020 |
| WO | 2021027694 | A1 | 2/2021 |

OTHER PUBLICATIONS

3GPP TS 38.213 V16.0.0:"3rd Generation Partnership Project; Technical Specification Group Radio Access Network; NR;Physical layer procedures for control(Release 16)",Dec. 2019,total 146 pages.

3GPP TS 38.214 V16.0.0:"3rd Generation Partnership Project; Technical Specification Group Radio Access Network; NR;Physical layer procedures for data(Release 16)",Dec. 2019, total 147 pages.

International Search Report issued in corresponding International Application No. PCT/CN2021/087274, mailed Jul. 14, 2021, pp. 1-8.

Extended European Search Report issued in corresponding European Application No. 21787767.9, dated Jul. 6, 2023, pp. 1-9.

* cited by examiner 28 symbol indexes are sequentially:
0 1 2 3 4 5 6 7 8 9 10 11 12 13 14 15 16 17 18 19 20 21 22 23 24 25 26 27

METHOD FOR TRANSMITTING SYNCHRONIZATION/PHYSICAL BROADCAST CHANNEL BLOCK AND APPARATUS

CROSS-REFERENCE TO RELATED APPLICATIONS

This application is a continuation of International Application No. PCT/CN2021/087274, filed on Apr. 14, 2021, which claims priority to Chinese Patent Application No. 202110169543.6, filed on Feb. 7, 2021 and Chinese Patent Application No. 202011106045.9, filed on Oct. 15, 2020, and Chinese Patent Application No. 202010292119.6, filed on Apr. 14, 2020. All of the aforementioned patent applications are hereby incorporated by reference in their entireties.

TECHNICAL FIELD

This application relates to the field of wireless communication network technologies, and in particular, to a method for transmitting a synchronization/physical broadcast channel block (synchronization/physical broadcast channel block, SS/PBCH block) and an apparatus.

BACKGROUND

A new radio (new radio, NR) system may be divided into two parts based on a frequency band location: an FR 1 (frequency range 1) and an FR 2. The FR 1 mainly refers to a spectrum below 6 GHz, and the FR 2 mainly refers to a spectrum from 6 GHz to 52.6 GHz. For example, subcarrier spacings (sub-carrier spacing, SCS) that can be supported by a frequency band in the FR 1 are 15 kHz and 30 kHz, and SCSs that can be supported by a frequency band in the FR 2 are 60 kHz, 120 kHz, and 240 kHz or a wider subcarrier spacing.

A synchronization broadcast information block pattern (synchronization signal block pattern, SS/PBCH block pattern) varies with a different SCS. An SS/PBCH block is information first demodulated by a terminal device in an initial access process. The SS/PBCH block may mainly include a primary synchronization signal (primary synchronization signal, PSS), a secondary synchronization signal (secondary synchronization signal, SSS), and a physical broadcast channel (physical broadcast channel, PBCH). The terminal device can complete cell synchronization and coarse symbol-level timing synchronization by demodulating the PSS and the SSS. The PBCH may carry master information block (master information block, MIB) information configured at a higher layer. The terminal device demodulates the MIB information to complete system frame-level timing synchronization and obtain position information of a system information block 1/remaining minimum system information (system information block/remaining minimum system information, SIB1/RMSI). Further, the terminal device can obtain a type0 physical downlink control channel (type0 physical downlink control channel, type0-PDCCH) and a physical downlink shared channel (physical downlink shared channel, PDSCH) by using information in the SIB1/RMSI.

As technologies evolve, available frequency bands keep growing. Therefore, how to transmit an SS/PBCH block needs to be urgently resolved.

SUMMARY

This application provides a method for transmitting an SS/PBCH block and an apparatus, to resolve a problem of a quantity of candidate indexes in transmission of an SS/PBCH block burst set and a problem of whether there are sufficient slots to transmit the SS/PBCH block burst set.

According to a first aspect, this application provides a method for transmitting an SS/PBCH block. The method includes: a terminal device receives one SS/PBCH block; and obtains indication information based on the one SS/PBCH block. The indication information is used to indicate candidate indexes of at least one SS/PBCH block in an SS/PBCH block burst set, a quantity of the candidate indexes is greater than 64, and the SS/PBCH block burst set is a set in which the foregoing one SS/PBCH block is located.

In the technical solution provided in this application, the indication information not only can indicate candidate indexes of at least one SS/PBCH block in the SS/PBCH block burst set, but also can indicate more candidate indexes, for example, indicate 128 or more candidate indexes. In addition, a network device may send more SS/PBCH blocks without being limited by 64 candidate indexes (that is, not limited by 64 candidate positions). The terminal device can learn, by using the indication information, a range of a maximum quantity of SS/PBCH blocks sent by the network device.

In a possible implementation, the method further includes: the terminal device receives the SS/PBCH block burst set.

According to a second aspect, this application provides a method for transmitting an SS/PBCH block. The method further includes: a terminal device receives configuration information. The configuration information includes a length of a discovery burst transmission window, the length of the discovery burst transmission window is greater than 5 ms, and the discovery burst transmission window is used by the terminal device to receive one or more SS/PBCH block burst sets.

In the technical solution provided in this application, a network device may have more slots to send one or more SS/PBCH blocks. In addition, the terminal device needs to receive the SS/PBCH block in the DRS window. Therefore, with the length of the DRS window increased, the terminal device is enabled to receive more SS/PBCH blocks in the DRS window.

Optionally, the method further includes: the terminal device receives one SS/PBCH block; and obtains indication information based on the one SS/PBCH block. The indication information is used to indicate candidate indexes of at least one SS/PBCH block in an SS/PBCH block burst set, a quantity of the candidate indexes is greater than 64, and the SS/PBCH block burst set is a set in which the foregoing one SS/PBCH block is located.

With reference to the methods provided in the first aspect and the second aspect, the terminal device does not need to learn a specific position of the SS/PBCH block burst set by using 1-bit information $\bar{a}_{\bar{A}+4}$, so that the indication information can indicate more candidate indexes. Further, even if the network device needs to transmit more SS/PBCH blocks, it can be ensured that the indication information can indicate more candidate indexes, and it can also be ensured that the network device has sufficient remaining slots to send one or more SS/PBCH blocks that are not sent in time.

According to a third aspect, this application provides a communication apparatus, configured to perform the method in the first aspect or any possible implementation of the first aspect. Specifically, the communication apparatus includes a corresponding unit for performing the method in the first aspect or any possible implementation of the first aspect.

For example, the communication apparatus may include a transceiver unit and a processing unit.

According to a fourth aspect, this application provides a communication apparatus, configured to perform the method in the second aspect or any possible implementation of the second aspect. Specifically, the communication apparatus includes a corresponding unit for performing the method in the second aspect or any possible implementation of the second aspect.

For example, the communication apparatus may include a transceiver unit and a processing unit. For example, the processing unit may be configured to control the transceiver unit to receive configuration information.

According to a fifth aspect, this application provides a communication apparatus. The communication apparatus includes a processor, configured to execute a program stored in a memory. When the program is run, the communication apparatus is enabled to perform the method described in the first aspect or any possible implementation of the first aspect.

In a possible implementation, the memory is located outside the communication apparatus.

According to a sixth aspect, this application provides a communication apparatus. The communication apparatus includes a processor, configured to execute a program stored in a memory. When the program is run, the communication apparatus is enabled to perform the method described in the second aspect or any possible implementation of the second aspect.

In a possible implementation, the memory is located outside the communication apparatus.

According to a seventh aspect, this application provides a communication apparatus. The communication apparatus includes a processor, a memory, and a program that is stored in the memory and that can be run on the processor. When the program is run, the communication apparatus is enabled to perform the method described in the first aspect or any possible implementation of the first aspect.

According to an eighth aspect, this application provides a communication apparatus. The communication apparatus includes a processor, a memory, and a program that is stored in the memory and that can be run on the processor. When the program is run, the communication apparatus is enabled to perform the method described in the second aspect or any possible implementation of the second aspect.

According to a ninth aspect, this application provides a communication apparatus. The communication apparatus includes a processor, a memory, and a transceiver. The transceiver is configured to receive a signal or send a signal. The memory is configured to store computer code. The processor is configured to execute the computer code, so that the communication apparatus performs the method described in the first aspect or any possible implementation of the first aspect.

According to a tenth aspect, this application provides a communication apparatus. The communication apparatus includes a processor, a memory, and a transceiver. The transceiver is configured to receive a signal or send a signal. The memory is configured to store computer code. The processor is configured to execute the computer code, so that the communication apparatus performs the method described in the second aspect or any possible implementation of the second aspect.

According to an eleventh aspect, this application provides a communication apparatus. The communication apparatus includes a processing circuit and an interface circuit. The interface circuit is configured to obtain one SS/PBCH block. The processing circuit is configured to obtain indication information based on the one SS/PBCH block. The indication information is used to indicate candidate indexes of at least one SS/PBCH block in an SS/PBCH block burst set, a quantity of the candidate indexes is greater than 64, and the SS/PBCH block burst set is a set in which the foregoing one SS/PBCH block is located.

In a possible implementation, the interface circuit is further configured to obtain the SS/PBCH block burst set.

According to a twelfth aspect, this application provides a communication apparatus. The communication apparatus includes a processing circuit and an interface circuit. The interface circuit is configured to obtain configuration information. The configuration information includes a length of a discovery burst transmission window, the length of the discovery burst transmission window is greater than 5 ms, and the discovery burst transmission window is used by a terminal device to receive one or more SS/PBCH block burst sets.

Optionally, the interface circuit is further configured to obtain one SS/PBCH block. The processing circuit is further configured to obtain indication information based on the one SS/PBCH block.

According to a thirteenth aspect, this application provides a communication apparatus. The communication apparatus includes a processing unit and a transceiver unit. The transceiver unit is configured to send and receive signals. The processing unit is configured to send an SS/PBCH block burst set to a terminal device by using the transceiver unit. One or more SS/PBCH blocks in the SS/PBCH block burst set include indication information. The indication information is used to indicate candidate indexes of at least one SS/PBCH block in the SS/PBCH block burst set, and a quantity of the candidate indexes is greater than 64.

Optionally, one SS/PBCH block in the SS/PBCH block burst set may include the indication information. Alternatively, a plurality of SS/PBCH blocks in the SS/PBCH block burst set may include the indication information. Alternatively, each SS/PBCH block in the SS/PBCH block burst set may include the indication information.

In a possible implementation, the processing unit is further configured to send configuration information to the terminal device by using the transceiver unit. The configuration information includes a length of a discovery burst transmission window, the length of the discovery burst transmission window is greater than 5 ms, and the discovery burst transmission window is used by the terminal device to receive one or more SS/PBCH block burst sets.

According to a fourteenth aspect, this application provides a communication apparatus. The communication apparatus includes a processor, a memory, and a transceiver. The transceiver is configured to receive a signal or send a signal. The memory is configured to store computer code. The processor is configured to execute the computer code to control the transceiver to send an SS/PBCH block burst set to a terminal device.

In a possible implementation, the processor is further configured to control the transceiver to send configuration information to the terminal device. The configuration information includes a length of a discovery burst transmission window, the length of the discovery burst transmission window is greater than 5 ms, and the discovery burst transmission window is used by the terminal device to receive one or more SS/PBCH block burst sets.

With reference to the first aspect to the fourteenth aspect, in a possible implementation, the indication information includes information used to indicate a demodulation reference signal DMRS sequence and information about PBCH payload. The DMRS sequence occupies 3 bits, and the PBCH payload occupies 4 bits.

With reference to the first aspect to the fourteenth aspect, in a possible implementation, the quantity of the candidate indexes is greater than or equal to 128.

With reference to the first aspect to the fourteenth aspect, in a possible implementation, at least two of the plurality of SS/PBCH block burst sets occupy different slots, and positions of SS/PBCH blocks in the at least two SS/PBCH block burst sets are the same; at least two of the plurality of SS/PBCH block burst sets occupy different slots, and positions of SS/PBCH blocks in the at least two SS/PBCH block burst sets are different; or at least two of the plurality of SS/PBCH block burst sets include different quantities of SS/PBCH blocks.

With reference to the first aspect to the fourteenth aspect, in a possible implementation, when the at least two of the plurality of SS/PBCH block burst sets occupy different slots, and the positions of SS/PBCH blocks in the at least two SS/PBCH block burst sets are the same, the SS/PBCH block burst set sent by a network device to the terminal device is determined by the network device based on a listen before talk LBT result.

With reference to the first aspect to the fourteenth aspect, in a possible implementation, the configuration information further includes a discovery burst transmission window period, and the discovery burst transmission window period is different from an SS/PBCH block burst set periodicity.

With reference to the first aspect to the fourteenth aspect, in a possible implementation, a time-domain position occupied by one SS/PBCH block in the SS/PBCH block burst set meets the following conditions:

a start symbol of one SS/PBCH block in the SS/PBCH block burst set is any even symbol between the $1^{st}$ symbol and the $11^{th}$ symbol in one slot configured by the network device; and/or start symbols of two adjacent SS/PBCH blocks in the SS/PBCH block burst set are spaced by any one or more of 3, 5, 7, or 9 symbols.

With reference to the first aspect to the fourteenth aspect, in a possible implementation, the one SS/PBCH block and a physical downlink shared channel PDSCH associated with the one SS/PBCH block meet the following conditions:

the PDSCH occupies a symbol length of 1 or 3; and/or a start symbol of the PDSCH is the $2^{nd}$ symbol or the $4^{th}$ symbol in four symbols occupied by the one SS/PBCH block.

According to a fifteenth aspect, this application provides a computer-readable storage medium. The computer-readable storage medium is configured to store a computer program. When the computer program is run on a computer, the method described in the first aspect or any possible implementation of the first aspect is performed.

According to a sixteenth aspect, this application provides a computer-readable storage medium. The computer-readable storage medium is configured to store a computer program. When the computer program is run on a computer, the method described in the second aspect or any possible implementation of the second aspect is performed.

According to a seventeenth aspect, this application provides a computer program product. The computer program product includes a computer program or computer code. When the computer program or the computer code is run on a computer, the method described in the first aspect or any possible implementation of the first aspect is performed.

According to an eighteenth aspect, this application provides a computer program product. The computer program product includes a computer program or computer code. When the computer program or the computer code is run on a computer, the method described in the second aspect or any possible implementation of the second aspect is performed.

According to a nineteenth aspect, this application provides a computer program. When the computer program is run on a computer, the method described in the first aspect or any possible implementation of the first aspect is performed.

According to a twentieth aspect, this application provides a computer program. When the computer program is run on a computer, the method described in the second aspect or any possible implementation of the second aspect is performed.

According to a twenty-first aspect, this application provides a communication apparatus, configured to perform the method described in the first aspect or any possible implementation of the first aspect or the method described in the second aspect or any possible implementation of the second aspect.

According to a twenty-second aspect, this application provides a wireless communication system. The wireless communication system includes a network device and a terminal device. The network device is configured to send an SS/PBCH block burst set; or the network device is configured to send the foregoing configuration information. The terminal device is configured to perform the method described in the first aspect or any possible implementation of the first aspect or the method described in the second aspect or any possible implementation of the second aspect.

The indication information in the embodiments of this application may be used to indicate 128, 256, 512, 1024, or 2048 candidate indexes. It can be understood that, the quantity of candidate indexes indicated by the indication information in the embodiments of this application is merely an example, and the quantity of candidate indexes may be another value or the like. Details are not described herein again. That is, the corresponding quantity of candidate indexes may be indicated by using the information used to indicate the DMRS sequence and the information about the PBCH payload.

DESCRIPTION OF EMBODIMENTS

Figure 1:
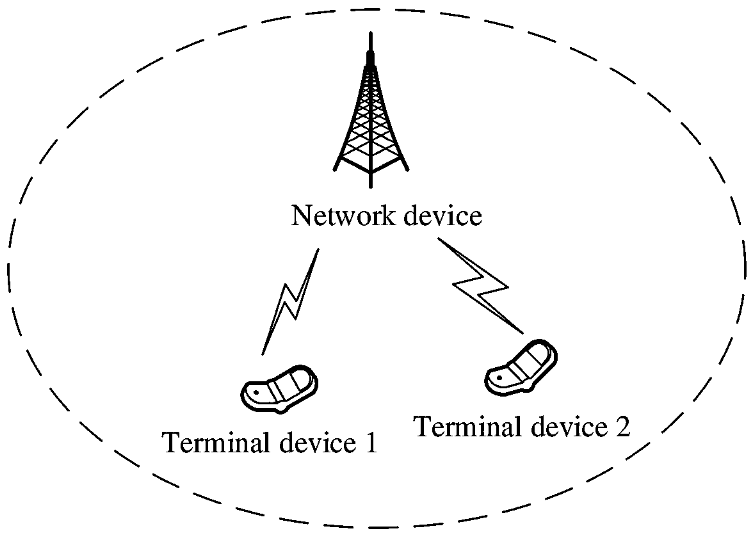
FIG. 1 is a schematic diagram of an architecture of a communication system according to an embodiment of this application.

To make objectives, technical solutions and advantages of this application clearer, the following further describes this application with reference to the accompanying drawings.

In the specification, claims, and accompanying drawings of this application, the terms "first", "second", and so on are only intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

"Embodiment" mentioned in this specification means that a particular feature, structure, or characteristic described with reference to the embodiment may be included in at least one embodiment of this application. The phrase shown in various locations in the specification may not necessarily refer to a same embodiment, and is not an independent or optional embodiment exclusive from another embodiment. It may be explicitly and implicitly understood by a person skilled in the art that embodiments described in the specification may be combined with another embodiment.

In this application, "at least one (item)" refers to one or more, "a plurality of" refers to two or more, and "at least two (items)" refers to two, three, or more. "And/or" is used to describe an association relationship between associated objects, and indicates that three types of relationships may exist. For example, "A and/or B" may represent the following three cases: Only A exists, both A and B exist, and only B exists. A and B may be singular or plural. The character "/" generally indicates an "or" relationship between the associated object. "At least one of the following items" or a similar expression means any combination of these items. For example, "at least one of a, b, or c" may represent: a, b, c, "a and b", "a and c", "b and c", or "a, b, and c".

The following describes in detail a network architecture in this application.

The technical solutions provided in this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a fifth generation (5th generation, 5G) communication system or a new radio (new radio, NR) system, and other future communication systems such as a 6G system. Optionally, the technical solutions provided in this application may be further applied to an internet of things (internet of things, IoT) system, a narrowband internet of things (narrow band internet of things, NB-IoT) system, and the like.

FIG. 1 is a schematic diagram of an architecture of a communication system according to this application. As shown in FIG. 1, the communication system includes one or more network devices (only one network device is used as an example in FIG. 1) and one or more terminal devices (only two terminal devices are used as an example in FIG. 1) connected to the network device.

The network device may be a device that can communicate with the terminal devices. The network device may be any device having a wireless transceiver function. The network device may be a base station, an access point, or a transmission reception point (transmission reception point, TRP), or may be a device, in an access network, that communicates with a terminal device over an air interface by using one or more sectors (cells), or the like. This is not limited in this application. For example, the base station may be an evolved NodeB (evolutional Node B, eNB, or eNodeB) in LTE, a relay station, or an access point, or may be a next-generation NodeB (next generation, gNB) in a 5G network, or the like. It can be understood that, the base station may alternatively be a base station in a future evolved public land mobile network (public land mobile network, PLMN) or the like.

Optionally, the network device may alternatively be an access node, a wireless relay node, a wireless backhaul node, or the like in a wireless local area network (wireless fidelity, Wi-Fi) system.

Optionally, the network device may alternatively be a wireless controller in a cloud radio access network (cloud radio access network, CRAN) scenario.

For ease of description, the following uses a base station as an example to describe the network device and the like in this application. Optionally, in some deployments of the base station, the base station may include a centralized unit (centralized unit, CU), a distributed unit (distributed unit, DU), and the like. In some other deployments of the base station, the CU may be further divided into a CU-control plane (control plane, CP), a CU-user plane (user plan, UP), and the like. In some other deployments of the base station, the base station may alternatively be an open radio access network (open radio access network, ORAN) architecture or the like. A specific deployment manner of the base station is not limited in this application.

The terminal device may also be referred to as user equipment (user equipment, UE). The terminal device in this application may be a device having a wireless transceiver function, and may perform communication with one or more core network (core network, CN) devices (or referred to as core devices) by using an access network device (or referred to as an access device) in a radio access network (radio access network, RAN). Optionally, the terminal device may also be referred to as an access terminal, a terminal, a subscriber unit, a subscriber station, a mobile station, a remote station, a remote terminal, a mobile device, a user terminal, a wireless network device, a user agent, a user apparatus, or the like. Optionally, the terminal device may be deployed on land, including an indoor or outdoor scenario and a handheld or vehicle-mounted scenario; or may be deployed on a water surface (for example, a steamship); or may be deployed in the air (for example, on an airplane, a balloon, or a satellite). Optionally, the terminal device may be a handheld device having a wireless communication function, a vehicle-mounted device, a wearable device, a terminal in an internet of things or an internet of vehicles, a terminal in any form in a 5G network or a future network, or the like. This is not limited in this application.

Optionally, in the communication system shown in FIG. 1, the terminal devices may further communicate with each other by using a device to device (device to device, D2D) technology, a vehicle-to-everything (vehicle-to-everything, V2X) technology, a machine to machine (machine to machine, M2M) technology, or the like. A method for communication between the terminal devices is not limited in this application.

In the communication system shown in FIG. 1, the network device and a terminal device 1 may be configured to perform a method provided in the embodiments of this application;

and the network device and a terminal device 2 may also be configured to perform the method provided in the embodiments of this application.

The following describes in detail some backgrounds in this application.

Synchronization/Physical broadcast channel (synchronization/physical broadcast channel, SS/PBCH) block (block): includes at least a primary synchronization signal (primary synchronization signal, PSS), a secondary synchronization signal (secondary synchronization signal, SSS), and a physical broadcast channel (physical broadcast channel, PBCH). For example, the SS/PBCH block may occupy 4 orthogonal frequency division multiplexing (orthogonal frequency division multiplexing, OFDM) symbols in time domain, and may occupy 20 resource blocks (resource blocks, RBs) in frequency domain.

It can be understood that, the SS/PBCH block described above may also be referred to as a synchronization signal block (synchronization signal block, SSB), or the like. A name thereof is not limited in this application.

In specific implementation, the network device may send a plurality of SS/PBCH blocks in a time division multiplexing (time division multiplexing, TDM) mode. Optionally, the network device may send the plurality of SS/PBCH blocks in a form of an SS/PBCH block burst set (SS/PBCH block burst set). Further, the network device may configure an SS/PBCH block burst set periodicity, and send the SS/PBCH block burst set according to the specific periodicity. Within the SS/PBCH block burst set periodicity, a quantity of SS/PBCH blocks in the SS/PBCH block burst set may be related to a frequency band and/or a subcarrier spacing (sub-carrier spacing, SCS). The frequency band may be understood as a frequency band (or referred to as a spectrum) in which the network device and/or the terminal device are/is located, and the subcarrier spacing may be understood as a subcarrier spacing used by the network device and/or the terminal device. Usually, a frequency band in which the network device is located is the same as that in which the terminal device is located, and a subcarrier spacing used by the network device is the same as that used by the terminal device.

In this application, the frequency band may include a low frequency band and a high frequency band (for example, a spectrum from 52.6 GHz to 71 GHz). In some scenarios, the frequency band may be a licensed frequency band. In some other scenarios, the frequency band may be an unlicensed frequency band or the like. This is not limited in the embodiments of this application. An unlicensed frequency band may also be understood as a shared frequency band.

Optionally, the quantity of SS/PBCH blocks in the SS/PBCH block burst set may be related to the frequency band in which the network device and/or the terminal device operate/operates. For example, when the frequency band f is less than or equal to 3 GHz, a maximum quantity of SS/PBCH blocks in the SS/PBCH block burst set may be 4 and a minimum quantity thereof may be 1; or when the frequency band f is greater than 3 GHz and less than or equal to 6 GHz, a maximum quantity of SS/PBCH blocks in the SS/PBCH block burst set may be 8 and a minimum quantity thereof may be 1; or when the frequency band f is greater than 6 GHz, a maximum quantity of SS/PBCH blocks in the SS/PBCH block burst set may be 64, and a minimum quantity thereof may be 1.

Optionally, the quantity of SS/PBCH blocks in the SS/PBCH block burst set may be further related to the subcarrier spacing used by the network device and/or the terminal device.

For example, for different subcarrier spacings, the quantity of SS/PBCH blocks in the SS/PBCH block burst set may be as follows:

For example, when the SCS is 15 kHz, and duration of the SS/PBCH block burst set sent by the network device is 5 ms, an expression of start symbols of the SS/PBCH blocks are $\{2, 8\}+14n$, and n is equal to 0, 1, 2, 3, or 4.

2 and 8 respectively represent the start symbols of the SS/PBCH blocks in one slot; and n represents a candidate slot occupied by the SS/PBCH block burst set, and that n is equal to 0, 1, 2, 3, or 4 represents that the SS/PBCH block burst set may occupy 5 slots (slot).

Because one slot includes 14 OFDM symbols, 14 may represent that the SS/PBCH blocks are repeated in a unit of one slot. In other words, a pattern (pattern) (which may also be understood as a position distribution) of the SS/PBCH block burst set is repeated in a unit of one slot. Alternatively, in different slots, relative positions of the SS/PBCH blocks in the pattern of the SS/PBCH block burst set are the same. This may also be understood as follows: In different SS/PBCH block burst sets, SS/PBCH blocks with a same relative position have a same offset relative to start positions of the SS/PBCH block burst sets in which the SS/PBCH blocks are respectively located. A value of n is obtained relative to the duration of the SS/PBCH block burst set. As described above, the duration of the SS/PBCH block burst set is 5 ms, and one slot is 1 ms. In this case, n may have five values.

Figure 2:
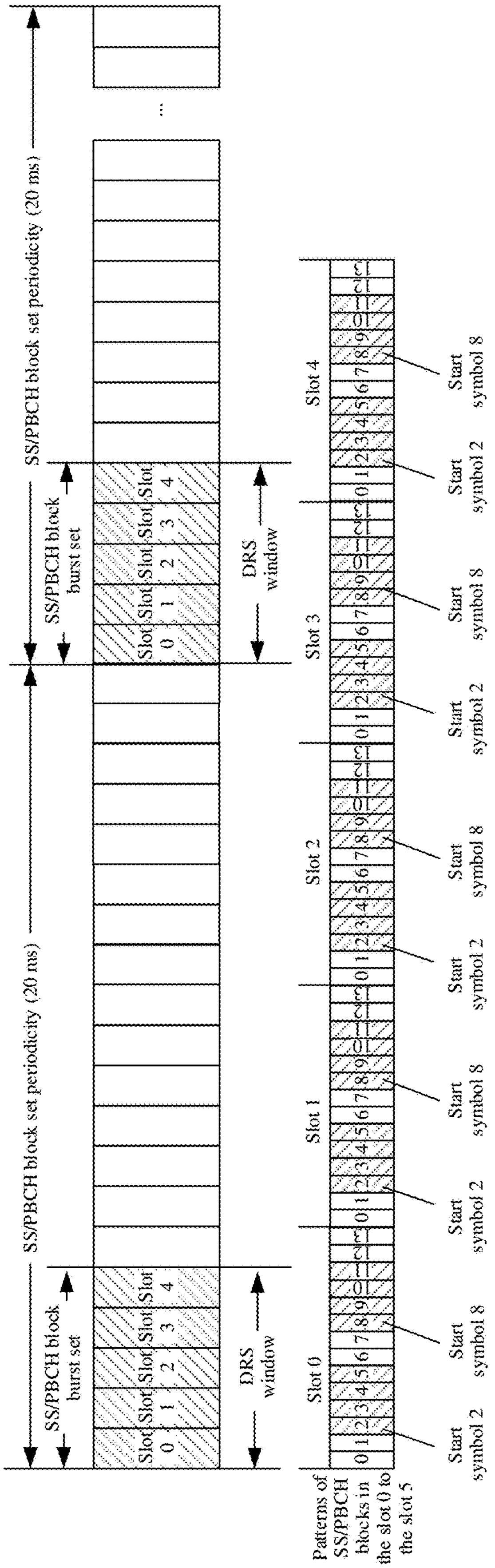
FIG. 2 is a schematic diagram of a pattern of an SS/PBCH block burst set in a case that a subcarrier spacing is 15 kHz according to an embodiment of this application.

As shown in FIG. 2, when the SCS is 15 kHz, one slot is 1 ms, and the length of the SS/PBCH block burst set is 5 ms, candidate slots of the SS/PBCH block burst set are 5 slots. Slot 0 (that is, a slot corresponding to n that is equal to 0) in FIG. 2 includes two SS/PBCH blocks. A start symbol of one SS/PBCH block is symbol 2, and a start symbol of the other SS/PBCH block is symbol 8. Slot 1 (that is, a slot corresponding to n that is equal to 1) includes two SS/PBCH blocks. A start symbol of one SS/PBCH block is symbol 2, and a start symbol of the other SS/PBCH block is symbol 8. A pattern of the SS/PBCH blocks in slot 0 is the same as a pattern of the SS/PBCH blocks in slot 1. Similarly, patterns of SS/PBCH blocks in slot 2, slot 3, and slot 4 are the same as the pattern of the SS/PBCH blocks in slot 0. In addition, FIG. 2 further shows that an SS/PBCH block burst set periodicity is 20 ms. It can be understood that, the SS/PBCH block burst set periodicity of 20 ms shown in FIG. 2 is merely an example. In actual application, the SS/PBCH block burst set periodicity may alternatively be 5 ms, 10 ms, 40 ms, 80 ms, 160 ms, or the like. This is not limited in this application. It can be understood that, the description of the SS/PBCH block burst set periodicity is also applicable below.

Further, when the SCS is 15 kHz, the network device uses a maximum of 10 positions to send the SS/PBCH blocks. If candidate indexes are used to represent the 10 positions, the SS/PBCH block burst set has 10 candidate indexes. It can be understood that, the foregoing candidate indexes may represent candidate positions and the like of the SS/PBCH blocks in the SS/PBCH block burst set. This is not limited in this application. In other words, the candidate indexes (candidate index) in the embodiments of this application may also be understood as candidate positions, transmission opportunities, or the like. For example, the transmission opportunities may be used to represent that the network device has 10 transmission opportunities to send one or more SS/PBCH blocks in the SS/PBCH block burst set. The following uses candidate indexes as an example to illustrate the method provided in the embodiments of this application.

As described above, when the SCS is 15 kHz, the network device may have a maximum of 10 candidate indexes for sending the SS/PBCH blocks in the SS/PBCH burst set. In other words, the network device may send the SS/PBCH blocks at positions corresponding to the 10 candidate indexes. In this case, the network device may represent the 10 candidate indexes of the SS/PBCH blocks by using 3-bit information used to represent a demodulation reference signal (demodulation reference signal, DMRS) sequence in the PBCH and 1-bit information $\bar{a}_{\bar{A}+7}$ in PBCH payload (payload) information. It can be understood that, the foregoing 10 candidate indexes of the SS/PBCH blocks may also be understood as follows: The network device may indicate the 10 candidate indexes of the SS/PBCH blocks by using information used to represent a DMRS sequence and information about PBCH payload. Further, the terminal device can learn, by using the 3-bit information used to represent the DMRS sequence in the PBCH and the 1-bit information $\bar{a}_{\bar{A}+7}$ in the PBCH payload information, that there are 10 candidate indexes.

After the network device sends the SS/PBCH block set, the terminal device receives the SS/PBCH blocks in a discovery burst transmission window (discovery burst transmission window, DRS window). For example, if the duration of the SS/PBCH block burst set sent by the network device is 5 ms, duration of the DRS window may also be 5 ms.

For another example, when the SCS is 30 kHz, and duration of the SS/PBCH block burst set sent by the network device is 5 ms, an expression of start symbols of the SS/PBCH blocks are {2, 8}+14n, and n is equal to 0, 1, 2, 3, 4, 5, 6, 7, 8, or 9.

When the SCS is 30 kHz, one slot is 0.5 ms, and the length of the SS/PBCH block burst set is 5 ms, the SS/PBCH block burst set may occupy 10 slots, and there are 20 candidate indexes of the SS/PBCH blocks in the SS/PBCH block burst set. It can be understood that, for a description of n, refer to the description in the case that the SCS is 15 kHz. Details are not described herein again.

As described above, when the SCS is 30 kHz, the network device has a maximum of 20 positions for sending the SS/PBCH blocks in the SS/PBCH block burst set. In other words, the network device may send the SS/PBCH blocks at the positions corresponding to the 20 candidate indexes. In this case, the network device may indicate the 20 candidate indexes of the SS/PBCH blocks by using 3-bit information used to represent a DMRS sequence in the PBCH and 2-bit information $\bar{a}_{\bar{A}+6}$ and $\bar{a}_{\bar{A}+7}$ in PBCH payload information. Further, the terminal device can learn, by using the 3-bit information used to represent the DMRS sequence in the PBCH and the 2-bit information $\bar{a}_{\bar{A}+6}$ and $\bar{a}_{\bar{A}+7}$ in the PBCH payload information, that there are 20 candidate indexes.

It can be understood that, for different SCSs, duration corresponding to one slot or a relationship between one slot and corresponding duration is not limited in this application.

For another example, when the SCS is 120 kHz, and duration of the SS/PBCH block burst set sent by the network device is 5 ms, an expression of start symbols of the SS/PBCH blocks are {4, 8, 16, 20}+28n, and n is equal to 0, 1, 2, 3, 5, 6, 7, 8, 10, 11, 12, 13, 15, 16, 17, or 18.

Because two slots occupy 28 OFDM symbols, 28 may represent that the SS/PBCH blocks are repeated in a unit of two slots. 4, 8, 16, and 20 may represent the start symbols of the SS/PBCH blocks in every two slots. In other words, a pattern of the SS/PBCH block burst set is repeated in a unit of two slots. Alternatively, with two slots as a unit, relative positions of the SS/PBCH blocks in the pattern of the SS/PBCH blocks are the same in every two slots.

The SS/PBCH block burst set may occupy 16×2=32 slots, and there are 64 candidate indexes of the SS/PBCH blocks in the SS/PBCH block burst set.

Figure 3:
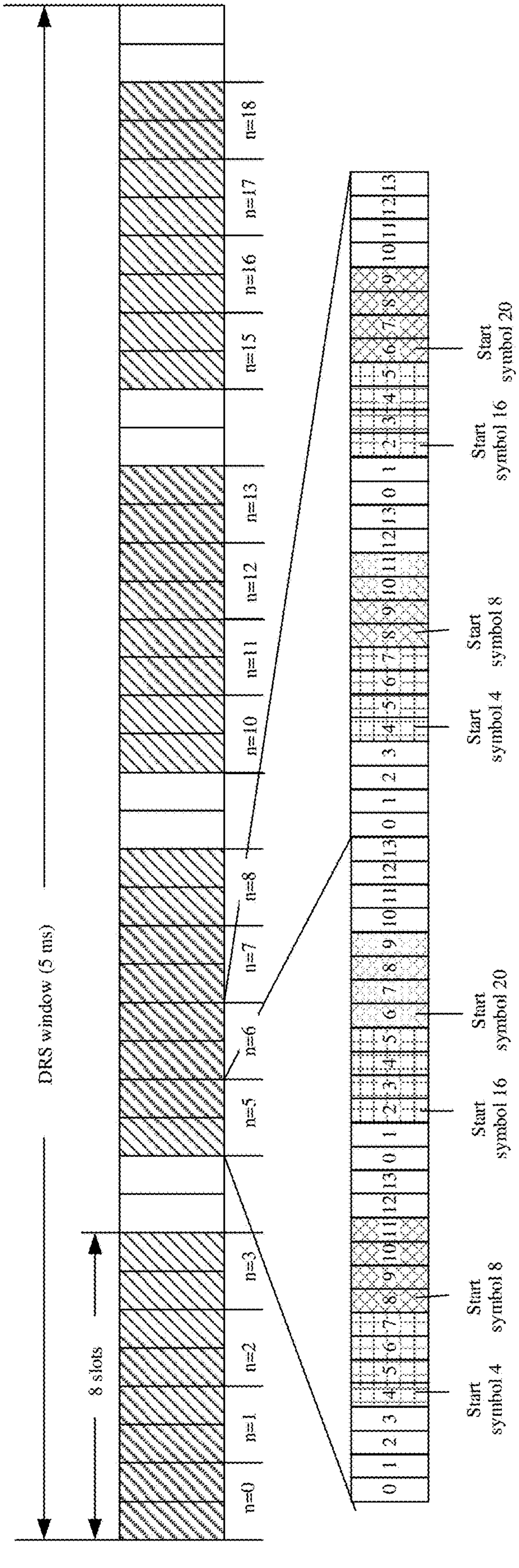
FIG. 3 is a schematic diagram of a pattern of an SS/PBCH block burst set in a case that a subcarrier spacing is 120 kHz according to an embodiment of this application.

Because the length of the SS/PBCH block set sent by the network device is 5 ms, and the terminal device may receive the SS/PBCH blocks in a DRS window, a length of the DRS window is 5 ms. As shown in FIG. 3, n in FIG. 3 may be understood as a value of n in the foregoing expression of the start symbols of the SS/PBCH blocks. When n is equal to 5 or 6 (that is, in every two slots), relative positions of the SS/PBCH blocks in the pattern of the SS/PBCH blocks are the same. It can be understood that, a length described in this application may also be understood as duration, and the duration is described in a unit of millisecond (ms). A unit of the duration is not limited in this application. For example, the unit of the duration may alternatively be microsecond (μm), second (s), or the like.

For another example, when the SCS is 240 kHz, and duration of the SS/PBCH block burst set sent by the network device is 5 ms, an expression of start symbols of the SS/PBCH blocks are {8, 12, 16, 20, 32, 36, 40, 44}+56n, and n is equal to 0, 1, 2, 3, 4, 5, 6, 7, or 8.

Because four slots occupy 56 OFDM symbols, 56 may represent that the SS/PBCH blocks are repeated in a unit of four slots. 8, 12, 16, 20, 32, 36, 40, and 44 may represent the start symbols of the SS/PBCH blocks in every four slots. In addition, the SS/PBCH block burst set may occupy 8×4=32 slots, and there are 64 candidate indexes of the SS/PBCH blocks in the SS/PBCH block burst set.

When the SCS is 120 kHz or 240 kHz, the network device may have a maximum of 64 positions for sending the SS/PBCH blocks in the SS/PBCH block burst set. In this case, the network device may represent the 64 candidate indexes of the SS/PBCH blocks by using 3-bit information used to represent a DMRS sequence in the PBCH and 3-bit information $\bar{a}_{\bar{A}+5}$, $\bar{a}_{\bar{A}+6}$, and $\bar{a}_{\bar{A}+7}$ in PBCH payload information. Further, the terminal device can learn, by using the 3-bit information used to represent the DMRS sequence in the PBCH and the 3-bit information $\bar{a}_{\bar{A}+5}$, $\bar{a}_{\bar{A}+6}$, and $\bar{a}_{\bar{A}+7}$ in the PBCH payload information, that there are 64 candidate indexes.

It can be understood that, the foregoing quantity of the SS/PBCH blocks is a maximum quantity of SS/PBCH blocks that can be sent by the network device. However, in actual application, at a corresponding subcarrier spacing, the network device may configure the SS/PBCH block burst set by using a related parameter (for example, ssb-PositionsIn-Burst) in a system information block (system information block, SIB) 1. For example, when the SCS is 15 kHz, and the related parameter in the SIB1 is set to 1011001011, a quantity of the plurality of SS/PBCH blocks included in the SS/PBCH block burst set is 8. "1" represents that an SS/PBCH block is sent in corresponding time domain, and "0" represents that no SS/PBCH block is sent in corresponding time domain. For another example, when the SCS is 120 kHz or 240 kHz, and the related parameter in the SIB1 is set to 01001110100000010101110010000001010011101011000100111100 10000001, a quantity of the SS/PBCH blocks included in the SS/PBCH block burst set is 26.

1-bit information $\bar{a}_{\bar{A}+4}$ in the PBCH payload information may be used to indicate a specific position of the SS/PBCH block burst set. In other words, the 1-bit information $\bar{a}_{\bar{A}+4}$ in the PBCH payload information may be used for a half radio frame (half radio frame) indication. Usually, transmission of the SS/PBCH blocks in the SS/PBCH block burst set needs to be completed within 5 ms. As shown in FIG. 2, when the SS/PBCH block burst set periodicity is 20 ms, the SS/PBCH block burst set may be within any 5 ms of the 20 ms. After the network device sends the SS/PBCH block burst set, the terminal device receives the SS/PBCH blocks in a discovery burst transmission window (discovery burst transmission window, DRS window). Because the network device transmits the SS/PBCH block burst set within 5 ms, a length of the DRS window may be less than or equal to 5 ms.

In view of this, the network device transmits the SS/PBCH block burst set within the SS/PBCH block set periodicity, and $\bar{a}_{\bar{A}+4}$ may be used to indicate that the SS/PBCH block burst set is within the first 5 ms. Correspondingly, the terminal device receives the SS/PBCH blocks in the DRS window. Alternatively, $\bar{a}_{\bar{A}+4}$ may be used to indicate that the SS/PBCH block burst set is within the second 5 ms. Correspondingly, the terminal device receives the SS/PBCH blocks and the like in the DRS window. By using $\bar{a}_{\bar{A}+4}$, the terminal device is enabled to determine the DRS window in time, and receive or listen to the SS/PBCH block burst set in the DRS window. Alternatively, the foregoing case may also be referred to as follows: It is assumed (assume) that the terminal device receives or listens to the SS/PBCH block burst set in the DRS window. A description of receiving or listening to the SS/PBCH block burst set by the terminal device is not limited in the embodiments of this application. Optionally, the terminal device may further receive, in the DRS window, information in the system information block (system information block, SIB) 1 corresponding to the SS/PBCH blocks and other system information or data information. This is not limited in this application.

It can be understood that, for ease of description, in this application, the information used to indicate the DMRS sequence and the PBCH payload information are referred to as indication information, and the indication information may be used to indicate the candidate indexes of the SS/PBCH blocks in the SS/PBCH block burst set of the terminal device.

It can be learned from the foregoing that, the indication information can indicate a maximum of 64 candidate indexes, but cannot indicate more candidate indexes. In a higher frequency band, the quantity of the SS/PBCH blocks in the SS/PBCH block burst set may be larger. In this case, the indication information indicating 64 candidate indexes cannot meet a requirement, and the network device needs more positions to send the SS/PBCH blocks in the SS/PBCH block burst set. In addition, the indication information cannot indicate more candidate indexes to the terminal device.

Therefore, this application provides a method for transmitting an SS/PBCH block. In the method, more candidate indexes can be indicated by using indication information. In addition, a network device may not be limited to 64 candidate indexes, and can send more SS/PBCH blocks.

Figure 4:
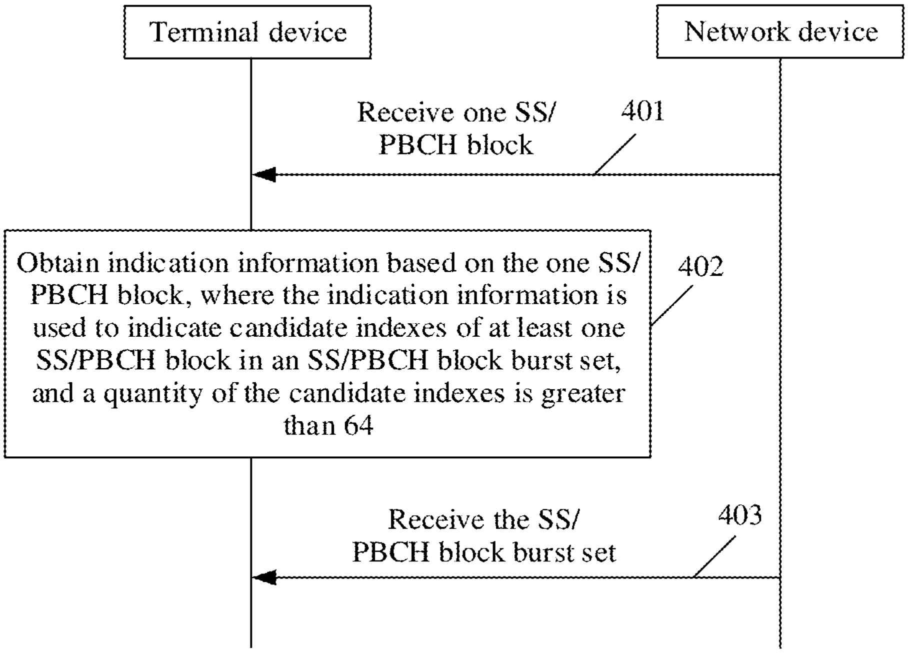
FIG. 4 is a schematic diagram of a method for transmitting an SS/PBCH block according to an embodiment of this application.

FIG. 4 is a schematic flowchart of a method for transmitting an SS/PBCH block according to this application. The method may be applied to the communication system shown in FIG. 1. As shown in FIG. 4, the method includes the following steps.

401. A terminal device receives one SS/PBCH block.

A network device may send SS/PBCH blocks in a manner of an SS/PBCH block burst set. One or more SS/PBCH blocks in the SS/PBCH block burst set include indication information. For the terminal device, the terminal device may blindly detect SS/PBCH blocks in a DRS window, and receive one SS/PBCH block in the SS/PBCH block burst set. In this way, the terminal device can demodulate the one SS/PBCH block to obtain the indication information described below. Optionally, the terminal device may alternatively blindly detect SS/PBCH blocks in a DRS window, and receive a plurality of SS/PBCH blocks. In this way, the terminal device can demodulate the plurality of SS/PBCH blocks to obtain the indication information described below. For example, the terminal device obtains a PSS through demodulation on the first SS/PBCH block, but cannot obtain an SSS through demodulation. In this case, the terminal device may demodulate another SS/PBCH block, to obtain the SSS.

402. The terminal device obtains the indication information based on the one SS/PBCH block, where the indication information is used to indicate candidate indexes of at least one SS/PBCH block in the SS/PBCH block burst set, and a quantity of the candidate indexes is greater than 64.

In the embodiments of this application, the at least one SS/PBCH block may also be understood as one or more SS/PBCH blocks, and the one or more SS/PBCH blocks may include the one SS/PBCH block in step 401. It can be understood that, the plurality of SS/PBCH blocks may be understood as two or more SS/PBCH blocks.

Optionally, the indication information includes information used to indicate (or represent) a DMRS sequence and information about PBCH payload. The DMRS series is the 3-bit DMRS sequence in the PBCH described above. The information about the PBCH payload is 4-bit information $\bar{a}_{\bar{A}+5}$, $\bar{a}_{\bar{A}+6}$, and $\bar{a}_{\bar{A}+7}$ in the PBCH payload information. Optionally, the indication information not only can be used to indicate 128 candidate indexes, but also can indicate more candidate indexes.

For example, the indication information may be further used to indicate 160 candidate indexes. For example, when the indication information obtained by the terminal device includes $\bar{a}_{\bar{A}+4}$, the terminal device can learn that there are 160 candidate indexes. Alternatively, the indication information may be further used to indicate more than 160 candidate indexes. For another example, the indication information may be further used to indicate 180 candidate indexes. Alternatively, the indication information may be further used to indicate more than 180 candidate indexes. For another example, the indication information may be further used to indicate 196 candidate indexes. Alternatively, the indication information may be further used to indicate more than 196 candidate indexes. For another example, the indication information may be further used to indicate 200 candidate indexes. Alternatively, the indication information may be further used to indicate more than 200 candidate indexes. For another example, the indication information may be further used to indicate 240 candidate indexes. Alternatively, the indication information may be further used to indicate more than 240 candidate indexes.

A specific quantity of candidate indexes indicated by the indication information may be configured by the network device, or may be specified by a protocol, a standard, or the like. This is not limited in the embodiments of this application. For example, the quantity of candidate indexes may be configured by using radio resource control (radio resource control, RRC) signaling.

In a possible implementation, the method shown in FIG. 4 may further include step 403.

403. The terminal device receives the SS/PBCH block burst set.

In the embodiments of this application, after receiving the SS/PBCH block burst set, the terminal device may determine, based on the indication information, whether to demodulate another SS/PBCH block. For example, by using the foregoing indication information, the terminal device can learn whether SS/PBCH blocks in different slots are the same. Optionally, after receiving the SS/PBCH block burst set, the terminal device may demodulate another SS/PBCH block in the SS/PBCH block burst set. Alternatively, the terminal device may not demodulate another SS/PBCH block in the SS/PBCH block burst set. Whether the terminal device demodulates another SS/PBCH block is not limited in the embodiments of this application.

Optionally, the terminal device may receive a part or a whole of the SS/PBCH block burst set. In other words, the terminal device may receive one or more SS/PBCH blocks in the SS/PBCH block burst set. It can be understood that, because the terminal device has received one SS/PBCH block in step 401, the terminal device may receive another SS/PBCH block in addition to the one SS/PBCH block in step 403. The one SS/PBCH block and the another SS/PBCH block are SS/PBCH blocks in the SS/PBCH block burst set.

In the embodiments of this application, the 1-bit information $\bar{a}_{\bar{A}+4}$ in the PBCH payload information may not indicate a specific position of the SS/PBCH block burst set. Optionally, the terminal device may listen to the SS/PBCH block burst set every 5 ms. As shown in FIG. 2, the terminal device may receive the SS/PBCH block burst set within any 5 ms. For example, the terminal device may receive or listen to the SS/PBCH block burst set within the first 5 ms, or may receive or listen to the SS/PBCH block burst set within the second 5 ms. It can be understood that, how the terminal device specifically listens to or receives the SS/PBCH block burst set is not limited in the embodiments of this application.

In the embodiments of this application, the indication information not only can indicate candidate indexes of at least one SS/PBCH block in the SS/PBCH block burst set, but also can indicate more candidate indexes, for example, indicate 128 or more candidate indexes. In addition, the network device can send more SS/PBCH blocks without being limited by 64 candidate indexes (or 64 candidate positions or 64 transmission opportunities). The terminal device can learn, by using the indication information, a range of a maximum quantity of SS/PBCH blocks sent by the network device. For example, in a higher frequency band, a quantity of SS/PBCH blocks in the SS/PBCH block burst set may be greater than 64. In this case, the indication information may indicate candidate indexes of more than 64 SS/PBCH blocks in the SS/PBCH block burst set.

Figure 5A:
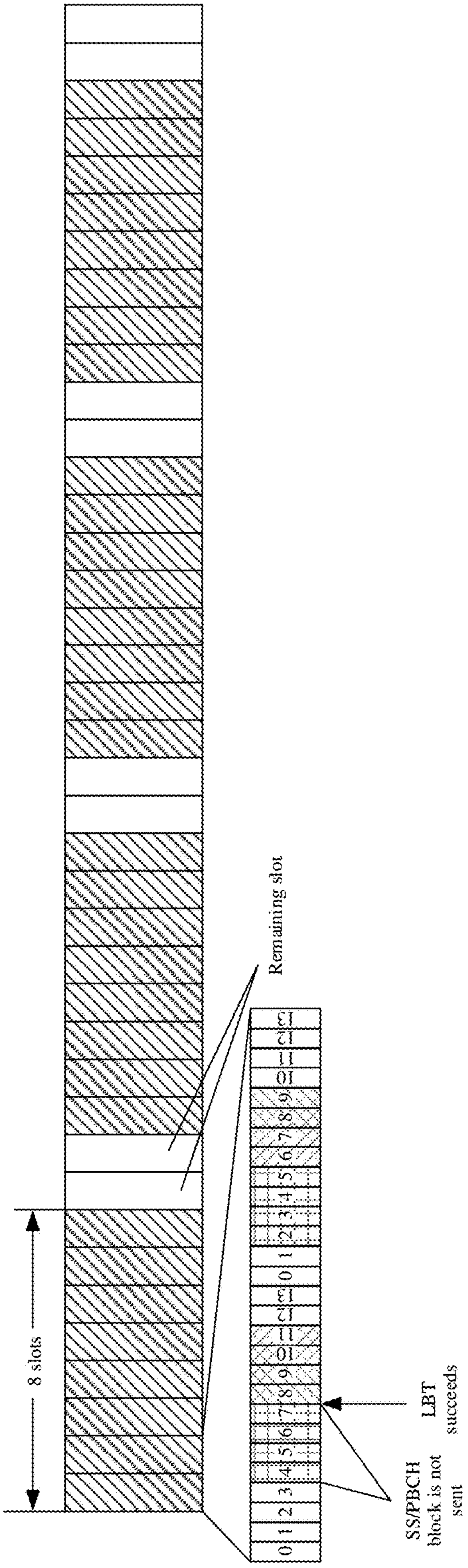
FIG. 5*a* is a schematic diagram of a pattern of an SS/PBCH block burst set in a case that a subcarrier spacing is 120 kHz according to an embodiment of this application.

In the embodiments of this application, the network device may send the SS/PBCH block burst set in a licensed frequency band or an unlicensed frequency band. In an unlicensed frequency band, before sending the SS/PBCH block burst set, the network device needs to perform listen before talk (listen before talk, LBT). LBT means that before using a channel, the network device needs to first obtain an interference status of a frequency band in which the channel is located. The network device can use the channel only when an interference energy (energy) value on the channel is less than or equal to a preset threshold. However, after performing LBT, the network device possibly cannot send a specified SS/PBCH block at a specified position (for example, the specified start symbol described above). In other words, when the network device performs an LBT operation, one or more SS/PBCH blocks may fail to be sent in time. As shown in FIG. 5*a*, before sending the SS/PBCH block burst set, the network device performs an LBT operation, and implements successful listening only on symbol 8 in the first slot. Therefore, SS/PBCH blocks on symbol 4 to symbol 7 cannot be successfully sent. In this case, the network device may send, in a remaining slot in FIG. 5*a*, an SS/PBCH block that is not sent in time.

Figure 5B:
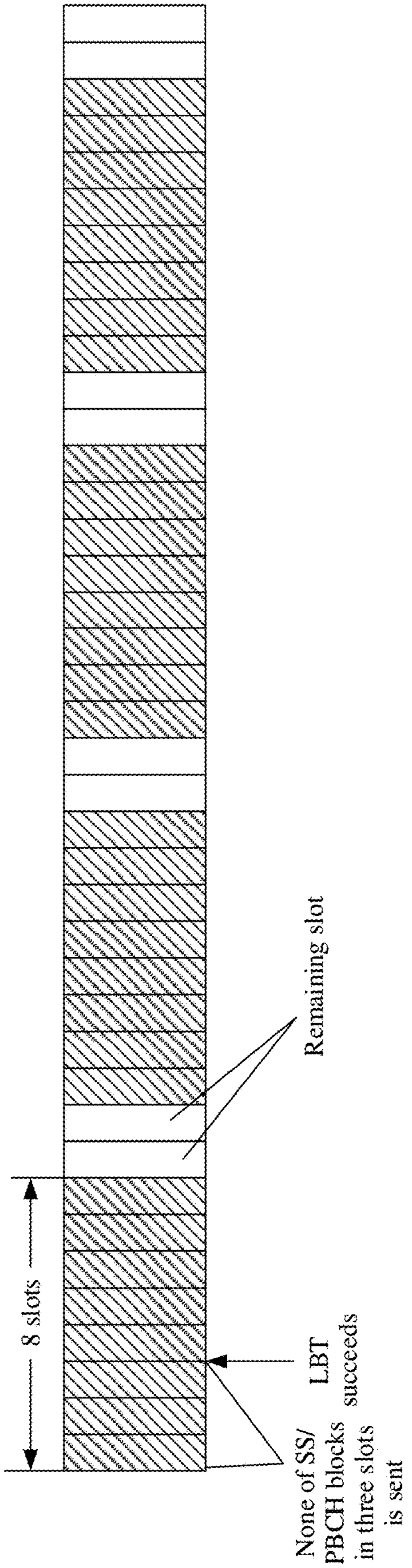
FIG. 5*b* is a schematic diagram of a pattern of an SS/PBCH block burst set in a case that a subcarrier spacing is 120 kHz according to an embodiment of this application.

However, there may be a larger quantity of SS/PBCH blocks that cannot be sent in time due to the LBT operation performed by the network device. Therefore, a quantity of remaining slots may be insufficient to send more SS/PBCH blocks. For example, when an SCS is 120 kHz, 5 ms corresponds to 40 slots, and two SS/PBCH blocks are sent in each slot, as shown in FIG. 5*b*. If the network device succeeds in LBT only in the fourth slot, SS/PBCH blocks (for example, six SS/PBCH blocks) in the first slot to the third slot are not sent in time. Because there are two remaining slots, the network device can send only four SS/PBCH blocks, and the remaining slots are insufficient to send the six SS/PBCH blocks. It can be understood that, in the embodiments of this application, "an SS/PBCH block that is not sent in time" may also be understood as "an SS/PBCH block that is not successfully sent", and "one or more SS/PBCH blocks that are not sent in time" may also be understood as "one or more SS/PBCH blocks that are not successfully sent".

Therefore, an embodiment of this application provides a method for transmitting an SS/PBCH block. The method can ensure that a network device has sufficient slots to send one or more SS/PBCH blocks that are not sent in time.

Figure 6:
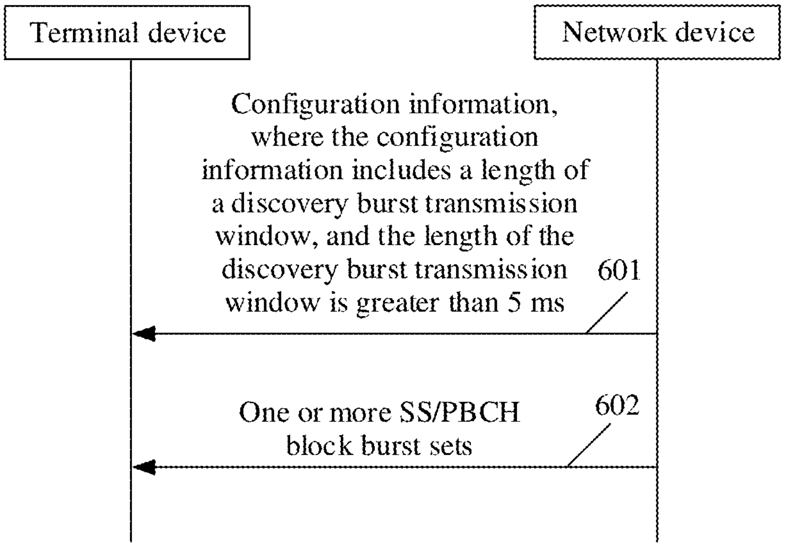
FIG. 6 is a schematic diagram of a method for transmitting an SS/PBCH block according to an embodiment of this application.

FIG. 6 is a schematic flowchart of a method for transmitting an SS/PBCH block according to an embodiment of this application. The method may be applied to the communication system shown in FIG. 1. As shown in FIG. 6, the method includes the following steps.

601. A network device sends configuration information to a terminal device, and correspondingly the terminal device receives the configuration information, where the configuration information includes a length of a discovery burst transmission window, and the length of the discovery burst transmission window is greater than 5 ms.

In this embodiment of this application, the network device may have more remaining slots to send one or more SS/PBCH blocks. It can be learned from the method shown in FIG. 4 that, the terminal device needs to receive SS/PBCH blocks in the DRS window. Therefore, with the length of the DRS window increased, the terminal device is enabled to receive more SS/PBCH blocks in the DRS window.

When the length of the DRS window is increased, a position of a remaining slot added in comparison with the method shown in FIG. 5*a* or FIG. 5*b* is not limited in this embodiment of this application. Optionally, the added remaining slot may be determined based on a corresponding subcarrier spacing and an expression of start symbols of the SS/PBCH blocks. For example, the added remaining slot may be the last several slots in the DRS window. For another example, the added remaining slot may alternatively be any slot in the DRS window or the like.

For example, as shown in FIG. 2, when an SCS is 15 kHz, and the length of the DRS window is greater than 5 ms, a maximum quantity of SS/PBCH blocks received by the terminal device in the DRS window may be greater than 10. For another example, as shown in FIG. 3, when the SCS is 120 kHz, and the length of the DRS window is greater than 5 ms, a maximum quantity of SS/PBCH blocks received by the terminal device in the DRS window may be greater than 64. In other words, the network device may have more slots to send SS/PBCH blocks. It can be understood that, in this embodiment of this application, the network device may send more SS/PBCH blocks. However, actually sent SS/PBCH blocks may be determined based on information in SIB1. This is not limited in this application. It can be understood that, this embodiment of this application is also applicable to a case with a wider subcarrier spacing, for example, a subcarrier spacing of 240 kHz, 480 kHz, or 960 kHz.

In a possible implementation, a quantity of candidate indexes of SS/PBCH blocks in an SS/PBCH block burst set may be 10, 20, or 64.

In a possible implementation, the quantity of the candidate indexes of SS/PBCH blocks in the SS/PBCH block burst set may alternatively be greater than 64. It can be learned from the background described in this application that, 1-bit information $\bar{a}_{\bar{A}+4}$ in PBCH payload information may be used to indicate a specific position of the SS/PBCH block burst set. That is, the 1-bit information $\bar{a}_{\bar{A}+4}$ in the PBCH payload information may be used to indicate a specific 5 ms within which the SS/PBCH block burst set falls. However, when the length of the DRS window is greater than 5 ms, the terminal device can learn the specific position of the SS/PBCH block burst set without needing the 1-bit information $\bar{a}_{\bar{A}+4}$. In this case, the 1-bit information $\bar{a}_{\bar{A}+4}$ in the PBCH payload information may be used to indicate other information, or indicate candidate indexes in combination with other information in the PBCH payload information, as described in the method shown in FIG. 4.

With reference to the methods shown in FIG. 4 and FIG. 6, the terminal device does not need to learn the specific position of the SS/PBCH block burst set by using the 1-bit information $\bar{a}_{\bar{A}+4}$, so that the indication information can indicate more candidate indexes. Further, even if the network device needs to transmit more SS/PBCH blocks, it can be ensured that the indication information can indicate more candidate indexes, and it can also be ensured that the network device has sufficient remaining slots to send one or more SS/PBCH blocks that are not sent in time.

Optionally, the length of the discovery burst transmission window may alternatively be greater than 0.5 ms and less than 1 ms. At a higher frequency, for example, when the SCS is 960 kHz, 1920 kHz, or even wider, the length of the DRS window may be greater than 0.5 ms and less than 1 ms. For example, when the SCS is 960 kHz, 64 slots may be included in 1 ms, and at least 64 SS/PBCH blocks may be transmitted in the 64 slots. Optionally, when the SCS is 960 kHz, 64 slots may be included in 1 ms, and 128 or more SS/PBCH blocks may alternatively be transmitted in the 64 slots. In other words, the network device can complete transmission of the SS/PBCH block burst set within 1 ms. Therefore, the terminal device can receive one or more SS/PBCH blocks within the length of the DRS window. In this case, the terminal device may receive or listen to the SS/PBCH block burst set within each 1 ms, that is, the terminal device may not need the 1-bit information $\bar{a}_{\bar{A}+4}$. In this case, with reference to the method shown in FIG. 4, the 1-bit information $\bar{a}_{\bar{A}+4}$ in the PBCH payload information may indicate candidate indexes in combination with other information in the PBCH payload information and information used to indicate a DMRS sequence, as described in the method shown in FIG. 4. In other words, at a higher frequency, with reference to the method shown in FIG. 4, when the length of the DRS window is greater than 0.5 ms and less than 1 ms, the network device not only can have more remaining slots to send one or more SS/PBCH blocks that are not sent in time, but also can indicate more candidate indexes by using the indication information.

Optionally, the length of the discovery burst transmission window may alternatively be greater than 1 ms and less than 2 ms. For example, when the SCS is 480 kHz, 32 slots may be included in 1 ms, and at least 32 SS/PBCH blocks may be transmitted in the 32 slots. Optionally, 64 SS/PBCH blocks may alternatively be transmitted in the 32 slots. If the length of the DRS window is greater than 5 ms, a resource may be wasted. Therefore, the length of the DRS window may be properly reduced. In this case, it is ensured that there are sufficient slots to send an SS/PBCH block that is not sent in time while resource waste is avoided.

In this embodiment of this application, the configuration information may be included in RRC signaling, or may be included in downlink control information (downlink control information, DCI). This is not limited in this application. Optionally, the configuration information may alternatively be included in a broadcast message. For example, when the terminal device initially accesses a cell, the network device may learn a subcarrier spacing used by the terminal device, and the network device can determine, based on the subcarrier spacing, the maximum quantity of SS/PBCH blocks and the length of the DRS window.

602. The network device sends one or more SS/PBCH block burst sets to the terminal device, and correspondingly the terminal device receives one or more SS/PBCH block burst sets in the DRS window.

Figure 7A:
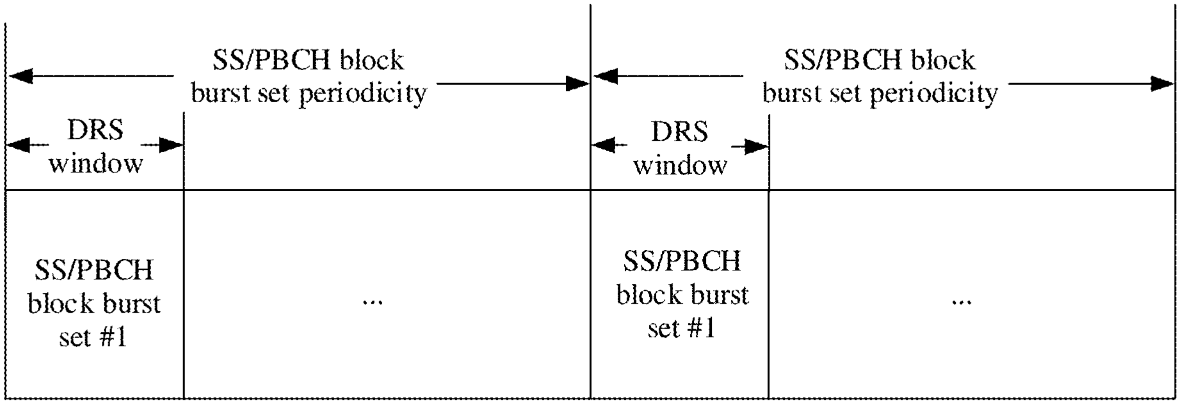
FIG. 7*a* is a schematic diagram of a relationship between a DRS window and an SS/PBCH block burst set according to an embodiment of this application.

In a possible implementation, the terminal device may receive one SS/PBCH block burst set in the DRS window. A method in which one SS/PBCH block burst set is included in the DRS window is shown in FIG. 7a. It can be understood that, for descriptions of slots (or start symbols or the like) occupied by the SS/PBCH block burst set, the length of the DRS window, and an SS/PBCH block burst set periodicity, refer to the foregoing descriptions. Details are not described herein again. In FIG. 7a, a DRS window period is the same as an SS/PBCH block periodicity.

In another possible implementation, the terminal device may alternatively receive a plurality of SS/PBCH block burst sets in the DRS window. A method in which a plurality of SS/PBCH block burst sets are included in the DRS window is described in detail below.
Method 1:

At least two of the plurality of SS/PBCH block burst sets occupy different slots, and positions of SS/PBCH blocks in the at least two SS/PBCH block burst sets are the same.

That positions of SS/PBCH blocks in the at least two SS/PBCH block burst sets are the same may also be understood as follows: relative positions of SS/PBCH blocks in different slots of the at least two SS/PBCH block burst sets are the same; or may also be understood as follows: relative positions of SS/PBCH blocks in patterns of the at least two SS/PBCH block burst sets are the same; or may also be understood as follows: in different SS/PBCH block burst sets, SS/PBCH blocks with a same relative position have a same offset relative to start positions of the SS/PBCH block burst sets in which the SS/PBCH blocks are respectively located. It can be understood that, the description of a position or a relative position is also applicable to other embodiments of this application. Optionally, the at least two SS/PBCH block burst sets configured by the network device by using a related parameter in the SIB1 are the same. Optionally, SS/PBCH blocks with a same relative position may carry same content.

Figure 7B:
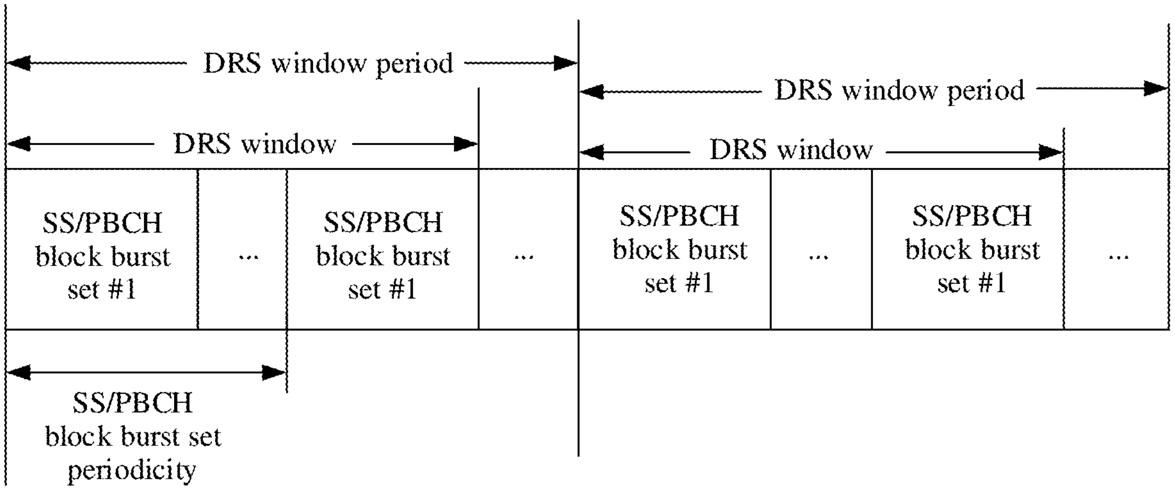
FIG. 7*b* is a schematic diagram of relationships between a DRS window and a plurality of SS/PBCH block burst sets according to an embodiment of this application.
Figure 7C:
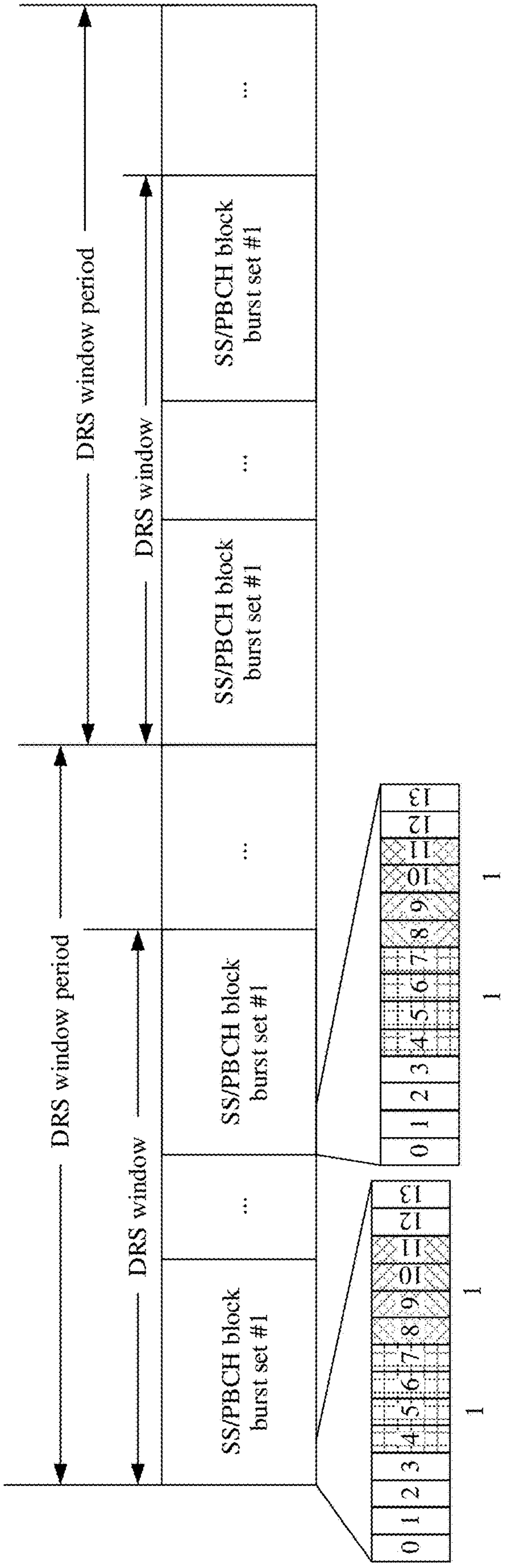
FIG. 7*c* is a schematic diagram of a relationship between a plurality of SS/PBCH block burst sets according to an embodiment of this application.

As shown in FIG. 7b, the DRS window may include two SS/PBCH block burst sets. In FIG. 7b, an SS/PBCH block burst set periodicity is different from a DRS window period. As shown in FIG. 7c, the two SS/PBCH block burst sets occupy different slots, and patterns of the first SS/PBCH block burst set and the second SS/PBCH block burst set are the same. It can be understood that, that patterns are the same described herein may be understood as follows: relative positions of SS/PBCH blocks are the same. Further, the SS/PBCH blocks may also carry same content.

For another example, a cell-level SS/PBCH block burst set configured by the network device by using a related parameter (for example, ssb-PositionsInBurst) in the SIB1 is 10110010 . . . . In this case, the two SS/PBCH block burst sets included in the DRS window are both 10110010 . . . .

For example, as shown in FIG. 7c, symbol indexes in the first slot that are occupied by the first SS/PBCH block burst set #1 in the DRS window are symbols 4 to 7 and symbols 8 to 11, and the information in the SIB1 is 11 . . . (0s are omitted). Symbol indexes in the first slot of the second SS/PBCH block burst set #1 are also symbols 4 to 7 and symbols 8 to 11, and the information in the SIB1 is 11 . . . (0s are omitted).

Optionally, when the DRS window includes three SS/PBCH block burst sets, corresponding slots may be the $m^{th}$ slot occupied by the first SS/PBCH block burst set, the $m^{th}$ slot occupied by the second SS/PBCH block burst set, and the $m^{th}$ slot occupied by the third SS/PBCH block burst set.

It can be learned from the method 1 described above that, when the DRS window includes a plurality of SS/PBCH block burst sets, expressions (which may also be understood as patterns) of start symbols of at least two of the plurality of SS/PBCH block burst sets are the same, and related parameters (for example, ssb-PositionsInBurst) in the SIB1 are the same. Optionally, SS/PBCH blocks with a same relative position may carry same content. It can be understood that, "the plurality of SS/PBCH block burst sets" may also be referred to as "one SS/PBCH block burst set", and "at least two SS/PBCH block burst sets" may also be understood as "at least two SS/PBCH block subsets".

Figure 7D:
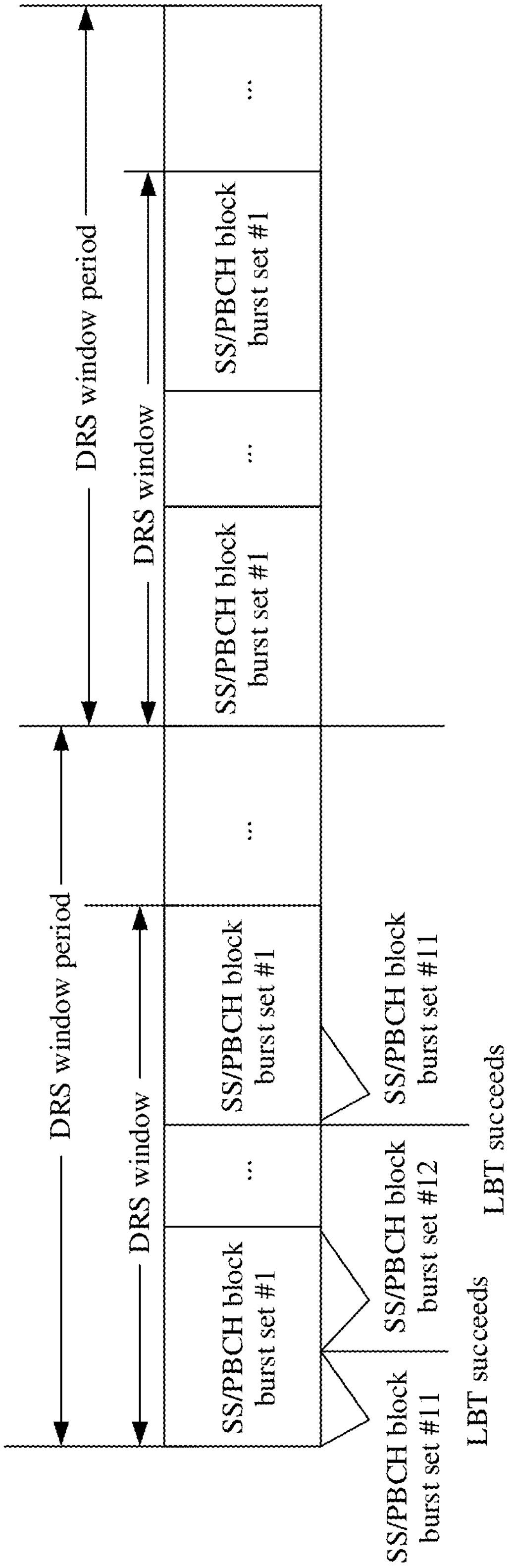
FIG. 7*d* is a schematic diagram of a relationship between a plurality of SS/PBCH block burst sets according to an embodiment of this application.

Further, before sending the SS/PBCH block burst sets, the network device needs to perform an LBT operation. Therefore, even if the SS/PBCH block burst sets configured by the network device by using the related parameter in the SIB1 are the same, or even if positions of SS/PBCH blocks in the at least two SS/PBCH block burst sets are the same, an SS/PBCH block that can be actually sent by the network device further needs to be determined based on an LBT result. For example, as shown in FIG. 7d, an SS/PBCH block burst set configured by the network device by using the related parameter in the SIB1 is 0100111010000001010111001000000101001110101 100010011110010000001. However, as shown in FIG. 7d, SS/PBCH blocks that are not sent in time are an SS/PBCH block burst set #11, which is 0100111010000001010111001000000101001110; and sent SS/PBCH blocks are an SS/PBCH block burst set #12. When sending the second SS/PBCH block burst set, the network device may send only the SS/PBCH block burst set #11. In other words, the first SS/PBCH block burst set sent by the network device is actually 0100111010000001010111001000000101001110, and the second SS/PBCH block burst set sent by the network device is actually 101100010011110010000001. Optionally, in actual application, the network device may determine a listening period of the LBT based on an actual situation. This ensures that after the LBT succeeds, the network device can send the SS/PBCH blocks that are not sent in time.

It can be understood that, in an example of FIG. 7d, the SS/PBCH block burst set #11 may also be referred to as a subset of the SS/PBCH block burst set #1, and the SS/PBCH block burst set #12 may also be referred to as a subset of the SS/PBCH block burst set #1.

In a possible implementation, after the terminal device obtains an actual sending status of the SS/PBCH block burst set based on the related parameter in the SIB1 configured by the network device, the terminal device may further perform the following operations based on the LBT result in a time window that is in the other time window within the DRS window and in which no SS/PBCH block is transmitted:

(1) Rate matching (rate matching): the terminal device neither receives nor sends any information in the time window in which no SS/PBCH block is transmitted. For example, the terminal device may not receive a physical downlink control channel (physical downlink control channel, PDCCH) and/or a physical downlink shared channel (physical downlink shared channel, PDSCH). For another example, the terminal device may further not send a physical uplink control channel (physical uplink control channel, PUCCH) and/or a physical uplink shared channel (physical uplink shared channel, PUSCH).

(2) The terminal device may receive a PDCCH and/or a PDSCH; or the terminal device may send a PUCCH and/or a PUSCH.

Figure 7E:
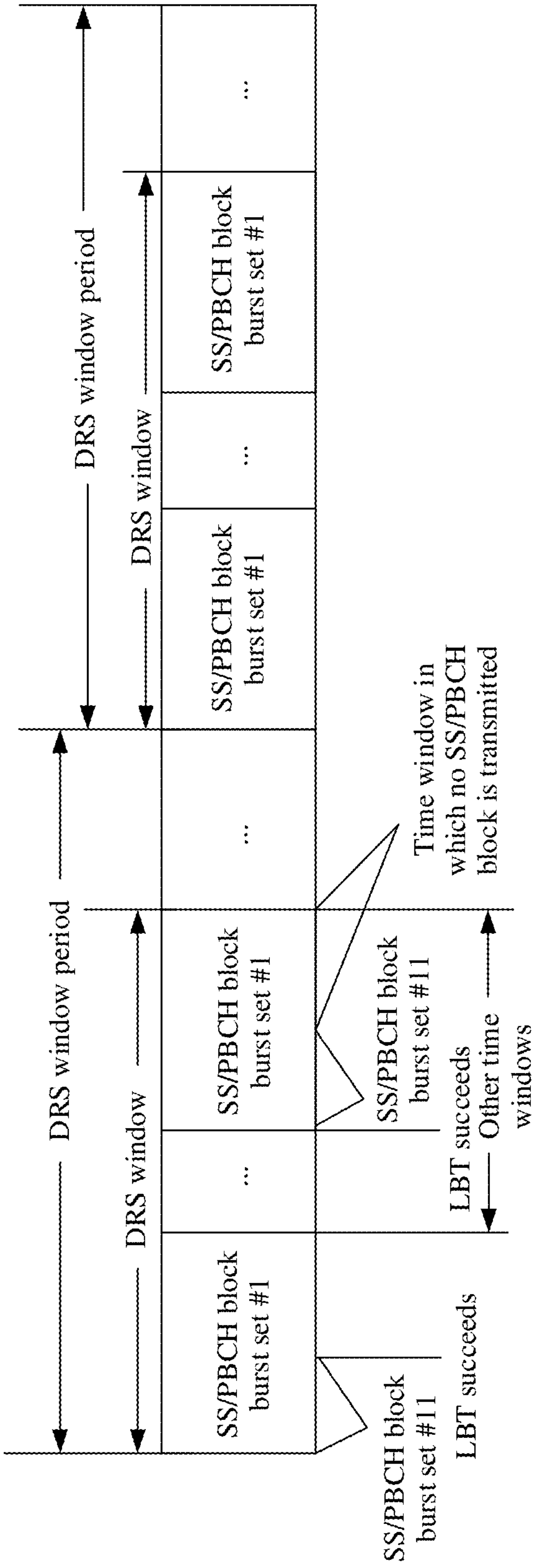
FIG. 7*e* is a schematic diagram of a relationship between a plurality of SS/PBCH block burst sets according to an embodiment of this application.

The other time window is a time window in the DRS window except a time window occupied by the first SS/PBCH block burst set sent after the LBT succeeds, as shown in FIG. 7*e*. The time window in which no SS/PBCH block is transmitted is a time window in the other time window except a time window occupied by the SS/PBCH block burst set. That is, the time window in which no SS/PBCH block is transmitted should have been used for sending one or more SS/PBCH blocks. However, the one or more SS/PBCH blocks are actually not sent.

Optionally, the network device may further send, to the terminal device, information used to indicate that transmission ends. The information used to indicate that transmission ends can enable the terminal device to learn a time at which no SS/PBCH block is sent in the DRS window. In examples of FIG. 7*d* and FIG. 7*e*, the terminal device can learn, based on the information used to indicate that transmission ends, that the network device no longer sends the SS/PBCH block burst set #12 after sending the SS/PBCH block burst set #11. Therefore, the terminal device may perform the foregoing operations in the time window that is in the other time window in the DRS window and in which no SS/PBCH block is transmitted.

Method 2:

At least two of the plurality of SS/PBCH block burst sets occupy different slots, and positions of SS/PBCH blocks in the at least two SS/PBCH block burst sets are different.

That positions of SS/PBCH blocks in the at least two SS/PBCH block burst sets are different may also be understood as follows: relative positions of SS/PBCH blocks in different slots of the at least two SS/PBCH block burst sets are the same; or may also be understood as follows: relative positions of SS/PBCH blocks in patterns of the at least two SS/PBCH block burst sets are the same. Optionally, the at least two SS/PBCH block burst sets configured by the network device by using a related parameter in the SIB1 may also be different.

Figure 8:
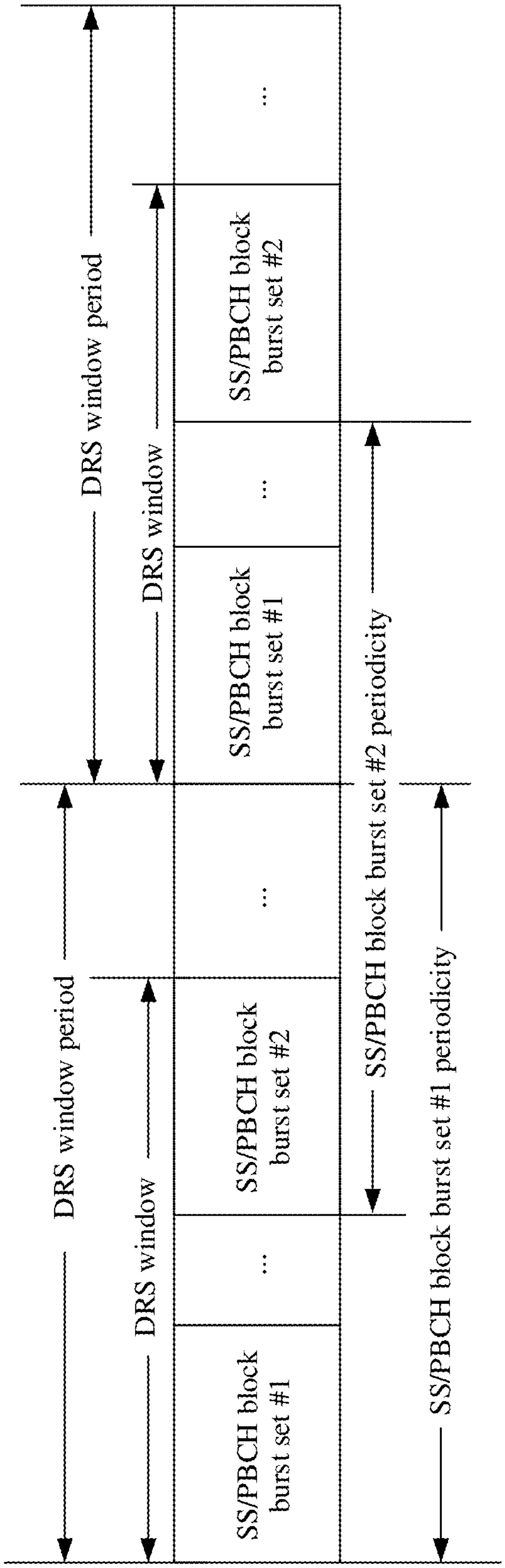
FIG. 8 is a schematic diagram of a relationship between a DRS window and an SS/PBCH block burst set according to an embodiment of this application.

As shown in FIG. 8, the DRS window includes an SS/PBCH block burst set #1 and an SS/PBCH block burst set #2. The SS/PBCH block burst set #1 configured by the network device by using the related parameter in the SIB1 is 10110010 . . . . The SS/PBCH block burst set #2 configured by the network device by using the related parameter in the SIB1 is 10101110 . . . . In other words, at least two of the plurality of SS/PBCH block burst sets are located in corresponding slots, and have different SS/PBCH blocks configured by the network device. It can be understood that, for specific descriptions of the corresponding slots, refer to the descriptions in the foregoing method 1. Details are not described herein again.

It can be learned from the method 2 described above that, when the DRS window includes a plurality of SS/PBCH block burst sets, expressions of start symbols of at least two of the plurality of SS/PBCH block burst sets are different, and/or related parameters in SIB1 are configured with different information. Optionally, the expressions of the start symbols of the at least two of the plurality of SS/PBCH block burst sets are different; or the related parameters in the SIB1 are configured with different information. Optionally, expressions of start symbols of at least three of the plurality of SS/PBCH block burst sets are different, and/or information in the SIB1 is different. Optionally, each of the plurality of SS/PBCH block burst sets has a different start symbol and/or a different SIB1. It can be understood that, for the related parameter in the SIB1, refer to the foregoing description. Details are not described herein again.

In a possible implementation, the at least two of the plurality of SS/PBCH block burst sets include different quantities of SS/PBCH blocks. For example, in FIG. 8, a quantity of SS/PBCH blocks included in the SS/PBCH block burst set #1 is different from a quantity of SS/PBCH blocks included in the SS/PBCH block burst set #2.

Optionally, the network device may further configure, by using system information, whether positions of SS/PBCH blocks in the plurality of SS/PBCH block burst sets are the same in different slots. In other words, the network device may configure, by using the system information, a relationship between the plurality of SS/PBCH block burst sets included in the DRS window. For example, with configuration of system information, the positions of the SS/PBCH blocks in the plurality of SS/PBCH block burst sets are the same in different slots. For another example, with configuration of system information, the positions of the SS/PBCH blocks in the plurality of SS/PBCH block burst sets are different in different slots. The system information may include a MIB or a SIB. Optionally, the relationship between the plurality of SS/PBCH block burst sets may be updated with an update of the system information.

Optionally, the method 2 described above is illustrated by using an example in which one DRS window includes a plurality of SS/PBCH block burst sets. Whether pluralities of SS/PBCH block burst sets included in different DRS windows are the same is not limited in this embodiment of this application. As shown in FIG. 8, SS/PBCH block burst sets included in two DRS windows are the same. Optionally, SS/PBCH block burst sets included in different DRS windows may alternatively be different. Further, at least one SS/PBCH block burst set varies with a different DRS window. For example, the first DRS window includes an SS/PBCH block burst set #1 and an SS/PBCH block burst set #2, and the second DRS window may include the SS/PBCH block burst set #1 and an SS/PBCH block burst set #4. Alternatively, the first DRS window includes an SS/PBCH block burst set #1 and an SS/PBCH block burst set #2, and the second DRS window may include an SS/PBCH block burst set #3 and an SS/PBCH block burst set #4.

Optionally, in the method 1 and the method 2, a DRS window period may be different from an SS/PBCH block burst set periodicity. Optionally, the configuration information may further include a DRS window period (DRS window period). For example, a parameter "discoveryBurstWindowPeriod" in RRC signaling is used to indicate the DRS window period. Optionally, the DRS window period may be different from at least one SS/PBCH block burst set periodicity included in the DRS window. Optionally, the DRS window period may be the same as at least one SS/PBCH block burst set periodicity included in the DRS window. A relationship between the DRS window period and the SS/PBCH block burst set periodicity is not limited in this embodiment of this application.

Optionally, for the method 1, the method shown in FIG. 6 is combined with the method shown in FIG. 4. SS/PBCH block burst sets sent by the network device in different duration are the same. In other words, in different duration (duration for transmitting the first SS/PBCH block burst set #1 by the network device and duration for transmitting the second SS/PBCH block burst set #1 by the network device, as shown in FIG. 7b), relative positions of SS/PBCH blocks in patterns of the SS/PBCH block burst sets are the same. Therefore, the network device can indicate candidate indexes of the SS/PBCH blocks in the SS/PBCH block burst sets by using only one piece of indication information. Correspondingly, because the plurality of SS/PBCH block burst sets included in the DRS window are the same, the terminal device can obtain the candidate indexes of the SS/PBCH blocks in the SS/PBCH block burst sets by receiving the one piece of indication information.

For the method 2, the method shown in FIG. 6 is combined with the method shown in FIG. 4. SS/PBCH block burst sets sent by the network device in different duration are different. In other words, in different duration (duration for transmitting the first SS/PBCH block burst set #1 by the network device and duration for transmitting the second SS/PBCH block burst set #2 by the network device, as shown in FIG. 8), relative positions of SS/PBCH blocks in patterns of the SS/PBCH block burst sets are different. Alternatively, in different duration, quantities of SS/PBCH blocks in patterns of the SS/PBCH block burst sets are different. Therefore, the network device can indicate candidate indexes of the SS/PBCH blocks in the SS/PBCH block burst sets by using a plurality of pieces of indication information. Correspondingly, because the plurality of SS/PBCH block burst sets included in the DRS window are different, the terminal device can obtain the candidate indexes of the SS/PBCH blocks in the plurality of SS/PBCH block burst sets by receiving the plurality of pieces of indication information. Optionally, quantities of the plurality of types of candidate indexes may be the same as a quantity of the SS/PBCH block burst sets included in the DRS window.

In a possible implementation, the method shown in FIG. 6 may further include the following:

The network device sends first information to the terminal device, and correspondingly the terminal device receives the first information. The first information is used to indicate a gap ($N_{gap}$) between two adjacent SS/PBCH block burst sets in the plurality of SS/PBCH block burst sets in the DRS window. The gap may be in a unit of a slot, a unit of a symbol, or the like. This is not limited in this embodiment of this application. The first information may be included in RRC signaling or included in a master information block (master information block, MIB) or a SIB. This is not limited in this embodiment of this application.

For example, when two SS/PBCH block burst sets exist in a same DRS window, the network device indicates, to the terminal device, a gap between the two SS/PBCH block burst sets by using the first information. The terminal device can be enabled to learn a specific position of the second SS/PBCH block burst set. For example, when the gap $N_{gap}$ is in a unit of a slot and $N_{gap}$ is equal to 10, the terminal device can learn that an expression of start symbols of the second SS/PBCH block burst set is 140(10×14)+{0, 4, 14, 20}+28n (n is equal to 0, 1, . . . , or 15). Optionally, when more (for example, three or four) SS/PBCH block burst sets exist in a same DRS window, a gap between two adjacent SS/PBCH block burst sets may be the same as or different from another gap between two adjacent SS/PBCH block burst sets.

The first information is used to enable the terminal device to learn a specific position of another SS/PBCH block burst set (an SS/PBCH block burst set other than the first SS/PBCH block burst set) in the DRS window.

In a possible implementation, the method shown in FIG. 6 may further include the following:

The network device sends second information to the terminal device, and the terminal device receives the second information. The second information is used to indicate whether the terminal device listens to another SS/PBCH block burst set in the DRS window. The another SS/PBCH block burst set is an SS/PBCH block burst set in the DRS window except the first SS/PBCH block burst set.

For example, the second information may indicate, in a form of a bitmap (bitmap), whether the terminal device needs to listen to a plurality of SS/PBCH block burst sets in the DRS window. Specifically, a length (a quantity of used bits) of the bitmap corresponds to a quantity of SS/PBCH block burst sets in the DRS window. For example, if the DRS window includes three SS/PBCH block burst sets, the second information may be 110. "1" is an SS/PBCH block burst set that needs to be listened to, and "0" is an SS/PBCH block burst set that does not need to be listened to. In this case, the second information may be used to indicate that the first SS/PBCH block burst set and the second SS/PBCH block burst set in the DRS window need to be listened to, and the third SS/PBCH block burst set in the DRS window does not need to be listened to.

For another example, the second information may further indicate, in a form of one bit, whether the terminal device needs to listen to another SS/PBCH block burst set in the DRS window. For example, when the second information is "1", it may indicate that the terminal device needs to listen to another SS/PBCH block burst set in the DRS window; or when the second information is "0", it may indicate that the terminal device does not need to listen to another SS/PBCH block burst set in the DRS window.

Optionally, the second information may be included in RRC signaling, or included in a MIB, or the like. This is not limited in this embodiment of this application. Optionally, the first information and the second information may be included in a same piece of RRC signaling or a same MIB. A specific relationship between the first information and the second information is not limited in this embodiment of this application.

In this embodiment of this application, the terminal device does not need to learn a specific position of an SS/PBCH block burst set by using the 1-bit information $\bar{a}_{\bar{A}+4}$, so that the indication information can indicate more candidate indexes. Further, even if the network device needs to transmit more SS/PBCH blocks, it can be ensured that the indication information can indicate more candidate indexes, and it can also be ensured that the network device has sufficient remaining slots to send one or more SS/PBCH blocks that are not sent in time.

It can be learned from the foregoing description that, when the SCS is 240 kHz, the expression of the start symbols of the SS/PBCH blocks may be {8, 12, 16, 20, 32, 36, 40, 44}+56n, and n is equal to 0, 1, 2, 3, 4, 5, 6, 7, or 8. It can be learned that, when a start symbol of an SS/PBCH block is {12, 40}+56n, the SS/PBCH block spans two slots. For example, when n is equal to 0, the start symbol of the SS/PBCH block may be symbol 12 or symbol 40. When the start symbol is symbol 12, symbol indexes of the SS/PBCH block are symbol 12 to symbol 15; or when the start symbol is symbol 40, symbol indexes of the SS/PBCH block are symbol 40 to symbol 43. Because one slot includes 14 symbols, symbol 12, symbol 13, symbol 14, and symbol 15 are not in a same slot, and symbol 40, symbol 41, symbol 42, and symbol 43 are not in a same slot, either.

Usually, when sending an SS/PBCH block, the network device further needs to consider a PDSCH having a quasi co-location (quasi co-location, QCL) relationship with the SS/PBCH block. For example, a beam (beam) used by the network device to send an SS/PBCH block is the same as a beam (beam) used by the network device to send a PDSCH. However, when one SS/PBCH block spans two slots, the terminal device cannot obtain an SS/PBCH block associated with a DMRS or another downlink reference signal (downlink reference signal, DL RS) in the PDSCH. For example, the another DL RS, for example, a channel state information reference signal (channel state information reference signal, CSI-RS), may be used for CSI acquisition, beam management (beam management, BM), or phase tracking. In view of this, for a case that the SCS is 240 kHz, this application further proposes a pattern (pattern) of an SS/PBCH block burst set.

Further, for a case with a wider subcarrier spacing, for example, a case that the SCS is 480 kHz, 960 kHz, or 1920 kHz, this application further proposes a pattern of an SS/PBCH block burst set. In addition, for a case that the SCS is 120 kHz, the network device may not have sufficient remaining slots to send one or more SS/PBCH blocks that are not sent in time. Therefore, for a case that the SCS is 120 kHz, this application further proposes a pattern of an SS/PBCH block burst set.

The following describes position distributions of SS/PBCH blocks for cases that the subcarrier spacings are respectively 120 kHz, 240 kHz, 480 kHz, 960 kHz, and 1920 kHz.

1. The subcarrier spacing is 120 kHz.

C1: Repetition in a Unit of Two Slots

If two SS/PBCH blocks are included in each slot, four SS/PBCH blocks may be included in every two slots. Therefore, start symbols of the SS/PBCH blocks meet the following conditions:

start symbol indexes of the SS/PBCH blocks in every two slots are less than 11, and the SS/PBCH blocks are located on symbols with even symbol indexes; and two adjacent SS/PBCH blocks are spaced by any one or more of 3, 5, 7, or 9 symbols.

Optionally, a length of a DRS window may be equal to 5 ms. For example, an expression of the start symbols of the SS/PBCH blocks may be {0, 4, 14, 20}+28n (n is equal to 0, 1, . . . , or 15).

Optionally, the method is combined with the method shown in FIG. 6. For example, when the length of the DRS window is 10 ms, a quantity of slots that may be included in 10 ms is 8×10=80. In this case, in the foregoing expression {0, 4, 14, 20}+28n of the start symbols of the SS/PBCH blocks, n may be equal to 0, 1, . . . , or 39. Further, for repetition in the unit of two slots, n has 40 values, and two SS/PBCH blocks are included in each slot. Therefore, a quantity of candidate indexes indicated by the indication information may be 40×2×2=160.

Figure 9A:
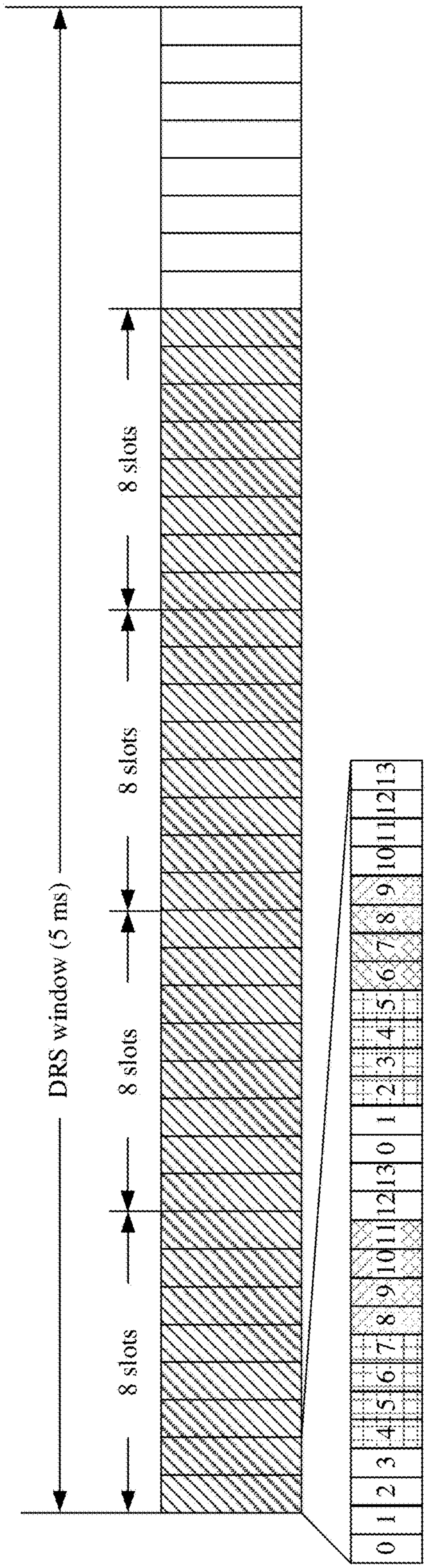
FIG. 9*a* is a schematic diagram of a pattern of an SS/PBCH block burst set in a case that a subcarrier spacing is 120 kHz according to an embodiment of this application.

As shown in FIG. 9*a*, an expression of the start symbols of the SS/PBCH blocks is {4, 8, 16, 20}+28n, and n may be equal to 0, 1, . . . , or 15. In FIG. 9*a*, two adjacent SS/PBCH blocks may be spaced by 3 symbols and/or 7 symbols. With reference to the methods shown in FIG. 9*a* and FIG. 4, n may be set to another value. With reference to the methods shown in FIG. 9*a* and FIG. 6, for example, the length of the DRS window may be greater than 5 ms. In this case, a quantity of remaining slots is increased. Therefore, when the network device performs an LBT operation, even if a quantity of SS/PBCH blocks that are not sent in time is relatively large, the remaining slots can meet a requirement of the network device.

C2: Repetition in a Unit of One Slot

If two SS/PBCH blocks are included in each slot, two SS/PBCH blocks may be included in every one slot. Therefore, start symbols of the SS/PBCH blocks meet the following conditions:

start symbol indexes of the SS/PBCH blocks in each slot are less than 11, and the SS/PBCH blocks are located on symbols with even symbol indexes; and two adjacent SS/PBCH blocks are spaced by any one or more of 3, 5, 7, or 9 symbols.

Optionally, when a length of a DRS window is 5 ms, for example, an expression of the start symbols of the SS/PBCH blocks may be {0, 4}+14n (n is equal to 0, 1, . . . , or 31).

Optionally, when the length of the DRS window is 10 ms, for example, in the foregoing expression {0, 4}+14n of the start symbols of the SS/PBCH blocks, n is equal to 0, 1, . . . , or 79. Further, a quantity of candidate indexes indicated by the indication information may be 160.

It can be understood that, the foregoing C1 and C2 both are illustrated by using a case that two SS/PBCH blocks are included in one slot. However, in another possible implementation, three SS/PBCH blocks may alternatively be included one slot. In this case, this application further illustrates another position distribution of SS/PBCH blocks.

C1: Repetition in a Unit of Two Slots

If three SS/PBCH blocks are included in each slot, six SS/PBCH blocks may be included in every two slots. Therefore, start symbols of the SS/PBCH blocks meet the following conditions:

start symbol indexes of the SS/PBCH blocks in every two slots are less than 11, and the SS/PBCH blocks are located on symbols with even symbol indexes; and two adjacent SS/PBCH blocks are spaced by any one or more of 3, 5, or 7 symbols.

Because three SS/PBCH blocks exist in each slot, when the subcarrier spacing is 120 kHz, a maximum quantity of SS/PBCH blocks that can be sent is 64. Therefore, a quantity of slots that can be occupied by the SS/PBCH blocks may be less than or equal to 11.

Considering that different subcarrier spacings have different time-domain positions, to ensure slot-level and/or symbol-level alignment, n may not be equal to 4 or 9. For example, n may be equal to 0, 1, 2, 3, 5, 6, 7, 8, 10, or 11. Optionally, when n is equal to 12, the start symbols of the SS/PBCH blocks may be even symbols whose symbol indexes are less than 11 in slot 21 and slot 22. In other words, when n is equal to 12, the 61$^{st}$ to 64$^{th}$ SS/PBCH blocks may be located on even symbols whose symbol indexes are less than 11 in slot 21 and/or slot 22. In this case, a quantity of candidate indexes of the SS/PBCH blocks in the SS/PBCH block burst set is 64.

With reference to the method shown in FIG. 4, when the quantity of the candidate indexes is greater than 64, n may be equal to 12, or may be equal to 13, or the like. It can be understood that, the foregoing value of n is merely an example. In specific implementation, a value of n may be determined based on a quantity of candidate indexes. Alternatively, the value of n may be defined by a related standard or protocol. Alternatively, a value of n may be configured by the network device, or the like. This is not limited in this embodiment of this application. It can be understood that, the foregoing description of n is also applicable to other parts of the embodiments of this application.

Optionally, when a length of a DRS window is 5 ms, for example, an expression of the start symbols of the SS/PBCH blocks may be {2, 6, 10, 16, 20, 24}+28n (n is equal to 0, 1, 2, 3, 5, 6, 7, 8, 10, or 11).

Optionally, when the length of the DRS window is 10 ms, in the foregoing expression, n may be equal to 0, 1, . . . , or 39. Further, a quantity of candidate indexes indicated by the indication information may be any one of 128, 160, 196, or 240.

In another possible implementation, the foregoing two adjacent SS/PBCH blocks are spaced by either of 3 and 5 symbols.

In this case, n may be equal to 0, 1, 2, 3, 4, 5, 6, 7, 8, 9, or 10. When n is equal to 11, the start symbols of the SS/PBCH blocks may be even symbols whose symbol indexes are less than 11 in slot 23. In other words, when n is equal to 11, the $64^{th}$ SS/PBCH block may be located on an even symbol whose symbol index is less than 11 in slot 23. In this case, a quantity of candidate indexes of the SS/PBCH blocks in the SS/PBCH block burst set is 64.

With reference to the method shown in FIG. 4, when the quantity of the candidate indexes is greater than 64, n may be equal to 11, 12, or the like.

Optionally, when a length of a DRS window is 5 ms, for example, an expression of the start symbols of the SS/PBCH blocks may be {2, 6, 10, 16, 20, 24}+28n (n is equal to 0, 1, 2, 3, 4, 5, 6, 7, 8, 9, or 10). When n is equal to 11, the start symbol of the SS/PBCH block may be symbol 2.

Optionally, when the length of the DRS window is 10 ms, in the foregoing expression, n may be equal to 0, 1, . . . , or 39. Further, a quantity of candidate indexes indicated by the indication information may be any one of 128, 160, 196, or 240.

Figure 9B:
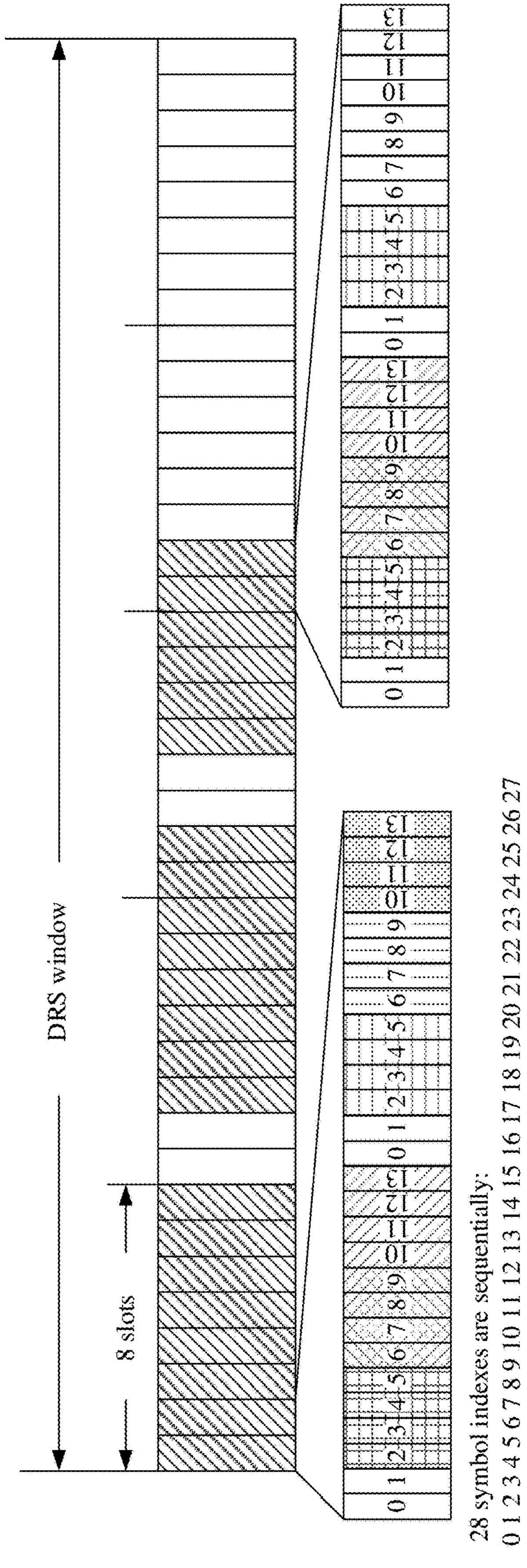
FIG. 9*b* is a schematic diagram of a pattern of an SS/PBCH block burst set in a case that a subcarrier spacing is 120 kHz according to an embodiment of this application.

As shown in FIG. 9*b*, an expression of the start symbols of the SS/PBCH blocks is {2, 6, 10, 16, 20, 24}+28n, and n is equal to 0, 1, 2, 3, 5, 6, 7, 8, 10, or 11. When n is equal to 12, the expression of the start symbols of the SS/PBCH blocks may be {2, 6, 10, 16}.

Figure 9C:
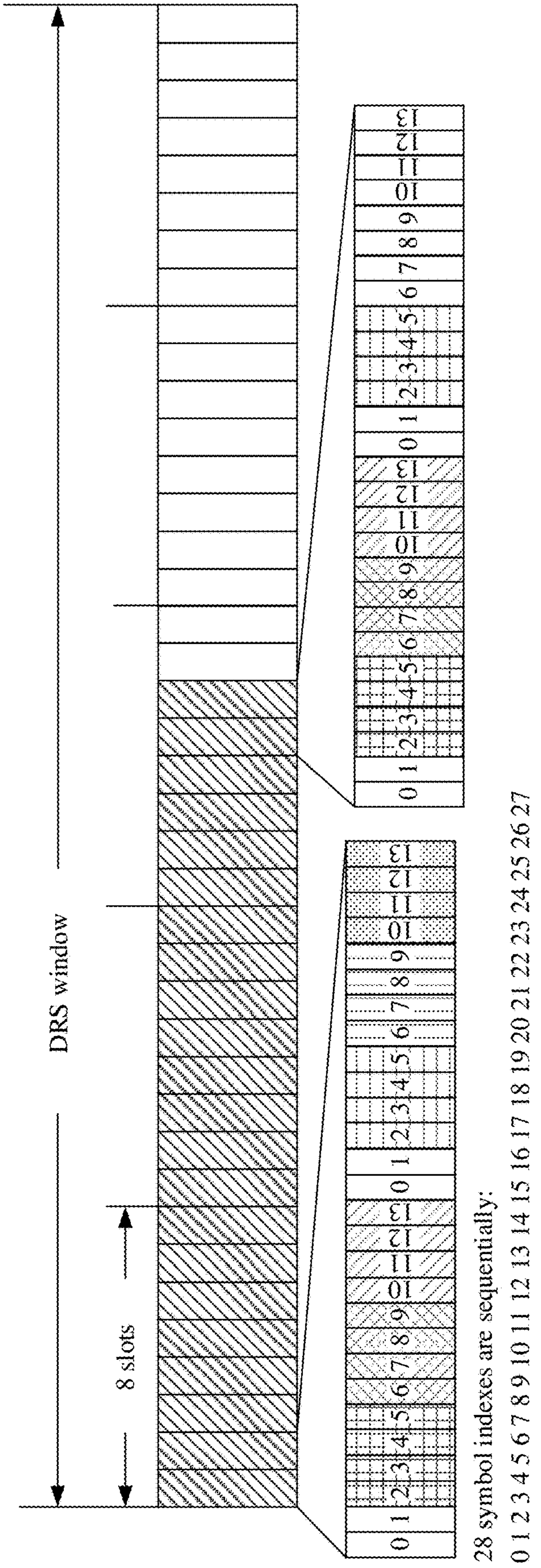
FIG. 9*c* is a schematic diagram of a pattern of an SS/PBCH block burst set in a case that a subcarrier spacing is 120 kHz according to an embodiment of this application.

As shown in FIG. 9*c*, an expression of the start symbols of the SS/PBCH blocks is {2, 6, 10, 16, 20, 24}+28n, and n is equal to 0, 1, 2, 3, 4, 5, 6, 7, 8, 9, or 10. When n is equal to 11, the expression of the start symbols of the SS/PBCH blocks may be {2, 6, 10, 16}.

It can be understood that, FIG. 9*a* to FIG. 9*c* are illustrated by using an example in which the symbol indexes are 0, 1, 2, 3, . . . , and 13. However, in some embodiments, the symbol indexes may alternatively start from 1, for example, the symbol indexes are 1, 2, . . . , and 14. In this case, the expression of the start symbols described in the embodiments of this application may vary with different symbol indexes.

C2: Repetition in a Unit of One Slot

If three SS/PBCH blocks are included in each slot, three SS/PBCH blocks may be included in every one slot. Therefore, start symbols of the SS/PBCH blocks meet the following conditions:

start symbol indexes of the SS/PBCH blocks in each slot are less than 11, and the SS/PBCH blocks are located on symbols with even symbol indexes; and two adjacent SS/PBCH blocks are spaced by any one or more of 3, 5, or 7 symbols.

In this case, n may be equal to any value from 0 to 24, and n is not equal to 8, 9, 18, or 19. When n is equal to 25, the start symbol of the SS/PBCH block may be symbol 2. In this case, a quantity of candidate indexes of the SS/PBCH blocks in the SS/PBCH block burst set is 64.

Optionally, when a length of a DRS window is 5 ms, for example, an expression of the start symbols of the SS/PBCH blocks may be {2, 6, 10}+14n (n is equal to 0, 1, 2, 3, 4, 5, 6, 7, 10, 11, 12, 13, 14, 15, 16, 17, 20, 21, 22, 23, 24). When n is equal to 25, the start symbol of the SS/PBCH block may be 2.

Optionally, when the length of the DRS window is 10 ms, in the foregoing expression, n may be equal to 0, 1, . . . , or 79. Further, a quantity of candidate indexes that can be indicated by the indication information may be any one of 128, 160, or 196.

In another possible implementation, the foregoing two adjacent SS/PBCH blocks are spaced by either of 3 and 5 symbols.

In this case, n may be equal to any value from 0 to 21. When n is equal to 11, the start symbols of the SS/PBCH blocks may be even symbols whose symbol indexes are less than 11 in a current slot.

Optionally, when a length of a DRS window is 5 ms, for example, an expression of the start symbols of the SS/PBCH blocks may be {2, 6, 10}+14n (n is equal to 0, 1, 2, 3, . . . , or 21). When n is equal to 22, the start symbol of the SS/PBCH block may be 2. In this case, a quantity of candidate indexes of the SS/PBCH blocks in the SS/PBCH block burst set is 64.

Optionally, when the length of the DRS window is 10 ms, in the foregoing expression, n may be equal to 0, 1, . . . , or 79. Further, a quantity of candidate indexes indicated by the indication information may be any one of 128, 160, 196, or 240.

It can be understood that, for an expression of the SS/PBCH blocks for a case that the SCS is $120\times2^{u}$ kHz, refer to a case that the SCS is 120 kHz, where u is equal to 1, 2, 3, 4, or 5 . . . , that is, u is an integer greater than or equal to 1.

2. The subcarrier spacing is 240 kHz.

C1: Repetition in a Unit of Four Slots

If two SS/PBCH blocks are included in each slot, eight SS/PBCH blocks may be included in every four slots. Therefore, start symbols of the SS/PBCH blocks meet the following conditions:

start symbol indexes of the SS/PBCH blocks in every four slots are less than 11, and the SS/PBCH blocks are located on symbols with even symbol indexes; and two adjacent SS/PBCH blocks are spaced by any one or more of 3, 5, 7, or 9 symbols.

For example, an expression of the start symbols of the SS/PBCH blocks may be {0, 4, 14, 20, 30, 36, 44, 50}+56n (n is equal to 0, 1, 2, 3, 5, 6, 7, or 8).

C2: Repetition in a Unit of Two Slots

If two SS/PBCH blocks are included in each slot, four SS/PBCH blocks may be included in every two slots. Therefore, start symbols of the SS/PBCH blocks meet the following conditions:

start symbol indexes of the SS/PBCH blocks in every two slots are less than 11, and the SS/PBCH blocks are located on symbols with even symbol indexes; and two adjacent SS/PBCH blocks are spaced by any one or more of 3, 5, 7, or 9 symbols.

For example, an expression of the start symbols of the SS/PBCH blocks may be {0, 4, 14, 20}+28n (n is equal to 0, 1, 2, 3, 5, 6, 7, 10, 11, 12, 13, 14, 15, 16, or 17).

C3: Repetition in a Unit of One Slot

If two SS/PBCH blocks are included in each slot, two SS/PBCH blocks may be included in every one slot. Therefore, start symbols of the SS/PBCH blocks meet the following conditions:

start symbol indexes of the SS/PBCH blocks in each slot are less than 11, and the SS/PBCH blocks are located on symbols with even symbol indexes; and two adjacent SS/PBCH blocks are spaced by any one or more of 3, 5, 7, or 9 symbols.

For example, an expression of the start symbols of the SS/PBCH blocks may be {0, 4}+14n (n is equal to 0, 1, 2, 3, 4, 5, 6, 7, 10, 11, 12, 13, 14, 15, 16, 21, . . . , or 34).

It can be understood that, the foregoing C1 and C2 both are illustrated by using a case that two SS/PBCH blocks are included in one slot. However, in another possible implementation, three SS/PBCH blocks may alternatively be included one slot. In this case, this application further illustrates another position distribution of SS/PBCH blocks.

C1: Repetition in a Unit of Four Slots

If three SS/PBCH blocks are included in each slot, 12 SS/PBCH blocks may be included in every four slots. Therefore, start symbols of the SS/PBCH blocks meet the following conditions:

start symbol indexes of the SS/PBCH blocks in every four slots are less than 11, and the SS/PBCH blocks are located on symbols with even symbol indexes; and two adjacent SS/PBCH blocks are spaced by any one or more of 3, 5, or 7 symbols.

For example, an expression of the start symbols of the SS/PBCH blocks may be {2, 6, 10, 16, 20, 24, 30, 34, 38, 42, 46, 50}+56n (n is equal to 0, 1, 2, 3, or 4).

C2: Repetition in a Unit of Two Slots

If three SS/PBCH blocks are included in each slot, six SS/PBCH blocks may be included in every two slots. Therefore, start symbols of the SS/PBCH blocks meet the following conditions:

start symbol indexes of the SS/PBCH blocks in every two slots are less than 11, and the SS/PBCH blocks are located on symbols with even symbol indexes; and two adjacent SS/PBCH blocks are spaced by either or both of 3 and 5 symbols.

For example, an expression of the start symbols of the SS/PBCH blocks may be {2, 6, 10, 16, 20, 24}+28n (n is equal to 0, 1, . . . , or 9). When n is equal to 10, the start symbols of the $61^{st}$ to $64^{th}$ SS/PBCH blocks may be even symbols whose start symbol indexes are less than 11 in slot 21 and slot 22. In this case, a quantity of candidate indexes of the SS/PBCH blocks in the SS/PBCH block burst set is 64.

C3: Repetition in a Unit of One Slot

If three SS/PBCH blocks are included in each slot, three SS/PBCH blocks may be included in every one slot. Therefore, start symbols of the SS/PBCH blocks meet the following conditions:

start symbol indexes of the SS/PBCH blocks in each slot are less than 11, and the SS/PBCH blocks are located on symbols with even symbol indexes; and two adjacent SS/PBCH blocks are spaced by any one or more of 3, 5, or 7 symbols.

For example, an expression of the start symbols of the SS/PBCH blocks may be {0, 4, 10}+14n (n is equal to 0, 1, 2, 3, 4, 5, . . . , or 20). When n is equal to 21, the start symbol of the $64^{th}$ SS/PBCH block may be an even symbol whose start symbol index is less than 11 in slot 21. In this case, a quantity of candidate indexes of the SS/PBCH blocks in the SS/PBCH block burst set is 64.

It can be understood that, when the subcarrier spacing is 240 kHz, a length of a DRS window is not limited in this embodiment of this application. For example, the length of the DRS window may be equal to 5 ms or the like.

3. The subcarrier spacing is 480 kHz.

C1: Repetition in a Unit of Eight Slots

If two SS/PBCH blocks are included in each slot, 16 SS/PBCH blocks may be included in every eight slots. Therefore, start symbols of the SS/PBCH blocks meet the following conditions:

start symbol indexes of the SS/PBCH blocks in every eight slots are less than 11, and the SS/PBCH blocks are located on symbols with even symbol indexes; and two adjacent SS/PBCH blocks are spaced by any one or more of 5, 7, or 9 symbols.

C2: Repetition in a Unit of Four Slots

If two SS/PBCH blocks are included in each slot, eight SS/PBCH blocks may be included in every four slots. Therefore, start symbols of the SS/PBCH blocks meet the following conditions:

start symbol indexes of the SS/PBCH blocks in every four slots are less than 11, and the SS/PBCH blocks are located on symbols with even symbol indexes; and two adjacent SS/PBCH blocks are spaced by any one or more of 5, 7, or 9 symbols.

C3: Repetition in a Unit of Two Slots

If two SS/PBCH blocks are included in each slot, four SS/PBCH blocks may be included in every two slots. Therefore, start symbols of the SS/PBCH blocks meet the following conditions:

start symbol indexes of the SS/PBCH blocks in every two slots are less than 11, and the SS/PBCH blocks are located on symbols with even symbol indexes; and two adjacent SS/PBCH blocks are spaced by any one or more of 5, 7, or 9 symbols.

C4: Repetition in a Unit of One Slot

If two SS/PBCH blocks are included in each slot, two SS/PBCH blocks may be included in every one slot. Therefore, start symbols of the SS/PBCH blocks meet the following conditions:

start symbol indexes of the SS/PBCH blocks in each slot are less than 11, and the SS/PBCH blocks are located on symbols with even symbol indexes; and two adjacent SS/PBCH blocks are spaced by any one or more of 5, 7, or 9 symbols.

4. The subcarrier spacing SCS is 960 kHz.

C1: Repetition in a Unit of 16 Slots

If two SS/PBCH blocks are included in each slot, 32 SS/PBCH blocks may be included in every 16 slots. Therefore, start symbols of the SS/PBCH blocks meet the following conditions:

start symbol indexes of the SS/PBCH blocks in every 16 slots are less than 11, and the SS/PBCH blocks are located on symbols with even symbol indexes; and two adjacent SS/PBCH blocks are spaced by any one or more of 5, 7, or 9 symbols.

For C2 to C5, refer to C1 to C4 for the case that the subcarrier spacing is 480 kHz. Details are not described herein again.

5. The subcarrier spacing is 1920 kHz.

C1: Repetition in a Unit of 32 Slots

If two SS/PBCH blocks are included in each slot, 64 SS/PBCH blocks may be included in every 32 slots. Therefore, start symbols of the SS/PBCH blocks meet the following conditions:

start symbol indexes of the SS/PBCH blocks in every 32 slots are less than 11, and the SS/PBCH blocks are located on symbols with even symbol indexes; and two adjacent SS/PBCH blocks are spaced by any one or more of 5, 7, or 9 symbols.

C2: Repetition in a Unit of 16 Slots

If two SS/PBCH blocks are included in each slot, 32 SS/PBCH blocks may be included in every 16 slots. Therefore, start symbols of the SS/PBCH blocks meet the following conditions:

start symbol indexes of the SS/PBCH blocks in every 16 slots are less than 11, and the SS/PBCH blocks are located on symbols with even symbol indexes; and two adjacent SS/PBCH blocks are spaced by any one or more of 5, 7, or 9 symbols.

For C3 to C6, refer to C1 to C4 for the case that the subcarrier spacing is 480 kHz. Details are not described herein again.

It can be understood that, for a description of n for the case that the SCS is 240 kHz, 480 kHz, 960 kHz, 1920 kHz, or the like, refer to the description of n for the case that the SCS is 120 kHz. Details are not described herein again.

This embodiment of this application provides the patterns of the SS/PBCH block burst set at different subcarrier spacings, enabling the terminal device to better obtain specific positions of the SS/PBCH blocks.

Figure 10A:
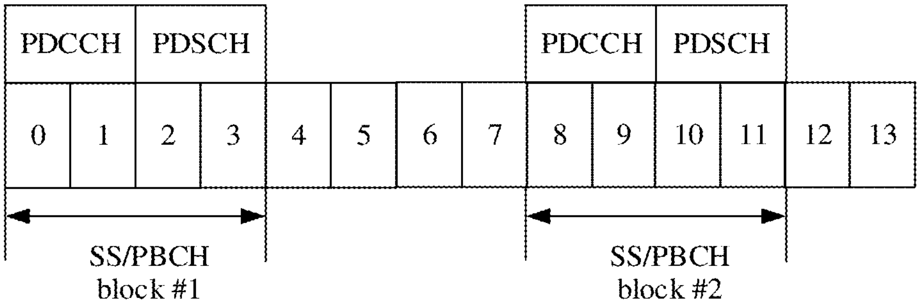
FIG. 10*a* is a schematic diagram of a relationship between an SS/PBCH block and a PDSCH according to an embodiment of this application.

Usually, the relationship between the SS/PBCH block and the PDSCH in QCL with the SS/PBCH block may be shown in FIG. 10*a*. One SS/PBCH block occupies four symbols, the PDSCH occupies two symbols, and the SS/PBCH block is frequency division multiplexed with the PDSCH. Specifically, time-domain resource allocation of the PDSCH is described in Table 1.

S may indicate a specific symbol that is in the four symbols occupied by the SS/PBCH block and on which the PDSCH starts to be transmitted. For example, if S is equal to 2, it may indicate that the PDSCH starts to be transmitted on a symbol that is in the four symbols occupied by the SS/PBCH block and whose symbol index is 2.

L may indicate a symbol length occupied by the PDSCH. For example, if L is equal to 2, it may indicate that the symbol length occupied by the PDSCH is 2, that is, the PDSCH occupies two symbols.

TABLE 1

| Row index (index) | DMRS-TypeA-Position (symbol position of a DMRS) | PDSCH mapping type (mapping type) | $K_0$ (slot gap) | S | L (length) |
|---|---|---|---|---|---|
| 1 (note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | | Reserved | | | |
| 7 | | Reserved | | | |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (note 1) | 2, 3 | Type B | 0 | 2 | 7 |
| 14 (note 1) | 2 | Type A | 0 | 2 | 12 |
| | 3 | Type A | 0 | 3 | 11 |
| 15 (note 1) | 2, 3 | Type A | 0 | 0 | 6 |
| 16 (note 1) | 2, 3 | Type A | 0 | 2 | 6 |

In some other embodiments of this application, the relationship between the SS/PBCH block and the PDSCH may further meet the following conditions:

the PDSCH occupies a symbol length of 1 or 3; and/or a start symbol of the PDSCH is the 2nd symbol or the 4th symbol in the four symbols occupied by the SS/PBCH block.

Figure 10B:
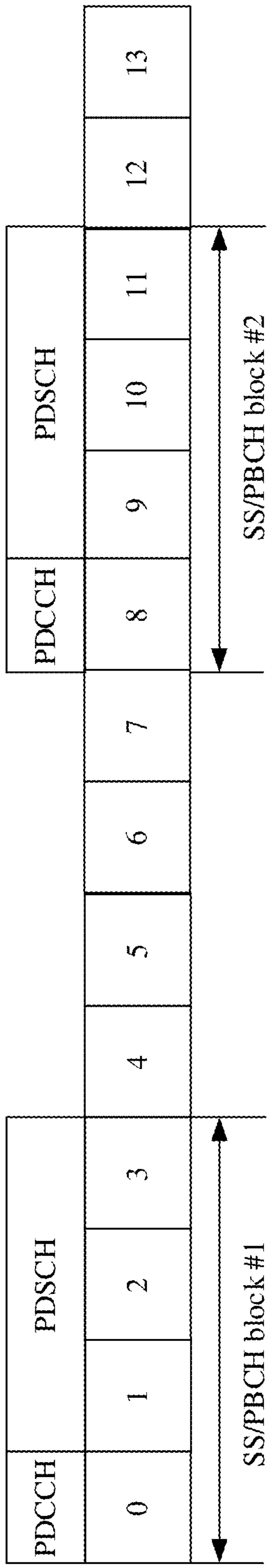
FIG. 10*b* is a schematic diagram of a relationship between an SS/PBCH block and a PDSCH according to an embodiment of this application.
Figure 10C:
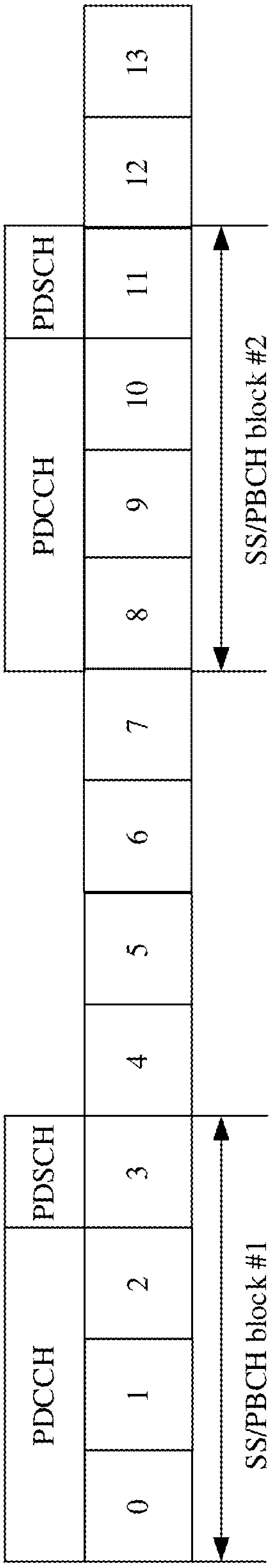
FIG. 10*c* is a schematic diagram of a relationship between an SS/PBCH block and a PDSCH according to an embodiment of this application.

For example, if $T_{SS/PBCH}$ represents a start symbol position occupied by the SS/PBCH block associated with the PDSCH, a start symbol position of the PDSCH may be any value from $T_{SS/PBCH}+1$ to $T_{SS/PBCH}+3$. Optionally, when the start symbol position of the PDSCH is $T_{SS/PBCH}$+the symbol length occupied by the PDSCH is 3, as shown in FIG. 10*b*. Optionally, when the start symbol position of the PDSCH is $T_{SS/PBCH}+3$, the symbol length occupied by the PDSCH is 1, as shown in FIG. 10*c*.

For example, time-domain resource allocation of the PDSCH is described in Table 2.

TABLE 2

| Row index | DMRS-TypeA-Position | PDSCH mapping type | $K_0$ | S | L |
|---|---|---|---|---|---|
| 1 (note 1) | 2, 3 | Type A/B | 0 | $\{T_{SS/PBCH}+1,$ | {1, 3} |
| 2 | 2, 3 | Type A/B | 0 | $T_{SS/PBCH}+3\}$ | |
| 3 | 2, 3 | Type A/B | 0 | | |
| 4 | 2, 3 | Type A/B | 0 | | |
| 5 | 2, 3 | Type A/B | 0 | | |

It can be understood that, a format of the PDSCH is not limited in this embodiment of this application. For example, the PDSCH can support the Type A format, and can also support the Type B format and the like.

Optionally, the method is combined with the method shown in FIG. 6. In this case, any SS/PBCH block in the SS/PBCH block burst set and a physical downlink shared channel PDSCH associated with the any SS/PBCH block meet the following conditions:

the PDSCH occupies a symbol length of 1 or 3; and/or a start symbol of the PDSCH is the 2nd symbol or the 4th symbol in four symbols occupied by the any SS/PBCH block.

In this embodiment of this application, in a high frequency band, with proper values of S and L, the terminal device can accurately obtain channel positions of a type0-PDCCH and a PDSCH in remaining minimum system information (remaining minimum system information, RMSI) corresponding to an SS/PBCH block, so that information included in the channels can be better obtained through demodulation. For example, the information included in the channels may include related information used to initiate random access, and for another example, may include initial bandwidth part (bandwidth part, BWP) information and the like. This is not limited in this application.

It can be understood that, the foregoing embodiments have respective focuses. For an implementation that is not described in detail in an embodiment, refer to other embodiments. Details are not described herein again. Further, the embodiments described in this specification may be independent solutions, or may be combined based on internal logic. These solutions all fall within the protection scope of this application. In other words, the foregoing embodiments may be combined with each other. For example, the foregoing methods in FIG. 4 and FIG. 6 may be combined. For another example, the related methods shown in FIG. 4 and FIG. 9*a* (or FIG. 9*b*, FIG. 9*c*, or the like) may be combined. For another example, the methods shown in FIG. 4 and FIG. 10*b* (or FIG. 10*c*) may be combined. For another example, the related methods shown in FIG. 4, FIG. 6, and FIG. 9*a* (or FIG. 9*b*, FIG. 9*c*, or the like) may be combined. For another example, the methods shown in FIG. 4, FIG. 6, and FIG. 10*b* (or FIG. 10*c*) may be combined. For another example, the methods shown in FIG. 4, FIG. 6, FIG. 9*a* (or FIG. 9*b*, FIG. 9*c*, or the like), and FIG. 10*b* (or FIG. 10*c*) may be combined.

The following describes a communication apparatus provided in the embodiments of this application.

Figure 11:
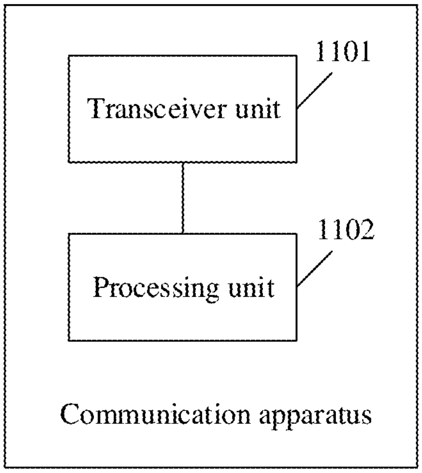
FIG. 11 is a schematic diagram of a structure of a communication apparatus according to an embodiment of this application.

FIG. 11 is a schematic diagram of a structure of a communication apparatus according to an embodiment of this application. The communication apparatus may be configured to perform operations performed by the terminal device in the foregoing method embodiments. For example, the communication apparatus may be configured to perform the method shown in FIG. 4 and/or the method shown in FIG. 6. As shown in FIG. 11, the communication apparatus includes a transceiver unit 1101 and a processing unit 1102.

The transceiver unit 1101 is configured to receive one SS/PBCH block.

The processing unit 1102 is configured to obtain indication information based on the one SS/PBCH block. The indication information is used to indicate candidate indexes of at least one SS/PBCH block in an SS/PBCH block burst set, a quantity of the candidate indexes is greater than 64, and the SS/PBCH block burst set is a set in which the foregoing one SS/PBCH block is located.

In a possible implementation, the indication information includes information used to indicate a demodulation reference signal DMRS sequence and information about PBCH payload. The DMRS sequence occupies 3 bits, and the PBCH payload occupies 4 bits.

In a possible implementation, the quantity of the candidate indexes is greater than or equal to 128.

In a possible implementation, the transceiver unit 1101 is further configured to receive the SS/PBCH block burst set.

In a possible implementation, the transceiver unit 1101 is further configured to receive configuration information. The configuration information includes a length of a discovery burst transmission window, the length of the discovery burst transmission window is greater than 5 ms, and the discovery burst transmission window is used by the terminal device to receive one or more SS/PBCH block burst sets.

Optionally, the processing unit 1102 may further control the transceiver unit 1101 to receive the configuration information.

Optionally, a pattern of one or more SS/PBCH block burst sets may be shown in FIG. 7*a* to FIG. 7*e* or in FIG. 8.

Optionally, patterns of one SS/PBCH block burst set may be shown in FIG. 9*a* to FIG. 9*c*.

Optionally, patterns of one of the plurality of SS/PBCH block burst sets may be shown in FIG. 9*a* to FIG. 9*c*.

In a possible implementation, at least two of the plurality of SS/PBCH block burst sets occupy different slots, and positions of SS/PBCH blocks in the at least two SS/PBCH block burst sets are the same; or at least two of the plurality of SS/PBCH block burst sets occupy different slots, and positions of SS/PBCH blocks in the at least two SS/PBCH block burst sets are different; or at least two of the plurality of SS/PBCH block burst sets include different quantities of SS/PBCH blocks.

In a possible implementation, when at least two of the plurality of SS/PBCH block burst sets occupy different slots, and positions of SS/PBCH blocks in the at least two SS/PBCH block burst sets are the same, the SS/PBCH block burst set sent by a network device to the terminal device is determined by the network device based on a listen before talk LBT result.

In a possible implementation, the configuration information further includes a discovery burst transmission window period, and the discovery burst transmission window period is different from an SS/PBCH block burst set periodicity.

In a possible implementation, a time-domain position occupied by one SS/PBCH block in the SS/PBCH block burst set meets the following conditions:

a start symbol of one SS/PBCH block in the SS/PBCH block burst set is any even symbol between the $1^{st}$ symbol and the $11^{th}$ symbol in one slot configured by the network device; and/or start symbols of two adjacent SS/PBCH blocks in the SS/PBCH block burst set are spaced by any one or more of 3, 5, 7, or 9 symbols.

In a possible implementation, the one SS/PBCH block and a physical downlink shared channel PDSCH associated with the one SS/PBCH block meet the following conditions:

the PDSCH occupies a symbol length of 1 or 3; and/or a start symbol of the PDSCH is the $2^{nd}$ symbol or the $4^{th}$ symbol in four symbols occupied by the one SS/PBCH block.

Optionally, a relationship between the PDSCH and the SS/PBCH block may be shown in FIG. 10*b* and FIG. 10*c*.

For example, the transceiver unit may be configured to perform step 401 and step 403 in FIG. 4. The transceiver unit may be further configured to perform step 601 and step 602 in FIG. 6. The processing unit may be configured to perform step 402 in FIG. 4.

It can be understood that, the methods performed by the foregoing units are merely examples. For a specific step performed by each unit, refer to the methods described above.

It should be understood that, when the communication apparatus is a terminal device or a component for implementing the foregoing functions in a terminal device, the processing unit 1102 may be one or more processors, and the transceiver unit 1101 may be a transceiver, or the transceiver unit 1101 may alternatively be a sending unit and a receiving unit. The sending unit may be a transmitter, the receiving unit may be a receiver, and the sending unit and the receiving unit are integrated in one component, for example, a transceiver.

When the communication apparatus is a circuit system such as a chip, the processing unit 1102 may be one or more processors, and the transceiver unit 1101 may be an input/output interface, which is also referred to as a communication interface, an interface circuit, an interface, or the like. Alternatively, the transceiver unit 1101 may be a sending unit and a receiving unit, the sending unit may be an output interface, the receiving unit may be an input interface, and the sending unit and the receiving unit are integrated in one unit, for example, an input/output interface.

The communication apparatus in this embodiment of this application can perform any function performed by the terminal device in the foregoing method embodiments. For specific executable steps and/or functions, refer to the detailed descriptions in the foregoing method embodiments. Only a brief description is provided herein, and details are not described again.

FIG. 11 is reused. FIG. 11 is a schematic diagram of a structure of a communication apparatus according to an embodiment of this application. The communication apparatus may be configured to perform operations performed by the network device in the foregoing method embodiments. For example, the communication apparatus may be configured to perform the method shown in FIG. 4 and/or the method shown in FIG. 6. As shown in FIG. 11, the communication apparatus includes a transceiver unit 1101 and a processing unit 1102.

The transceiver unit 1101 is configured to receive or send a signal.

The processing unit 1102 is configured to send an SS/PBCH block burst set to a terminal device by using the transceiver unit. One or more SS/PBCH blocks in the SS/PBCH block burst set include indication information. The indication information is used to indicate candidate indexes of at least one SS/PBCH block in the SS/PBCH block burst set, and a quantity of the candidate indexes is greater than 64.

In a possible implementation, the processing unit 1102 is further configured to send configuration information to the terminal device by using the transceiver unit. The configuration information includes a length of a discovery burst transmission window, the length of the discovery burst transmission window is greater than 5 ms, and the discovery burst transmission window is used by the terminal device to receive one or more SS/PBCH block burst sets.

It can be understood that, for descriptions of the indication information and the discovery burst transmission window, refer to the foregoing embodiments. Details are not described herein again.

It should be understood that, when the communication apparatus is a network device or a component for implementing the foregoing functions in a network device, the processing unit 1102 may be one or more processors, and the transceiver unit 1101 may be a transceiver, or the transceiver unit 1101 may alternatively be a sending unit and a receiving unit. The sending unit may be a transmitter, the receiving unit may be a receiver, and the sending unit and the receiving unit are integrated in one component, for example, a transceiver.

When the communication apparatus is a circuit system such as a chip, the processing unit 1102 may be one or more processors, and the transceiver unit 1101 may be an input/output interface, which is also referred to as a communication interface, an interface circuit, an interface, or the like. Alternatively, the transceiver unit 1101 may be a sending unit and a receiving unit, the sending unit may be an output interface, the receiving unit may be an input interface, and the sending unit and the receiving unit are integrated in one unit, for example, an input/output interface.

The communication apparatus in this embodiment of this application can perform any function performed by the network device in the foregoing method embodiments. For specific executable steps and/or functions, refer to the detailed descriptions in the foregoing method embodiments. Only a brief description is provided herein, and details are not described again.

Figure 12:
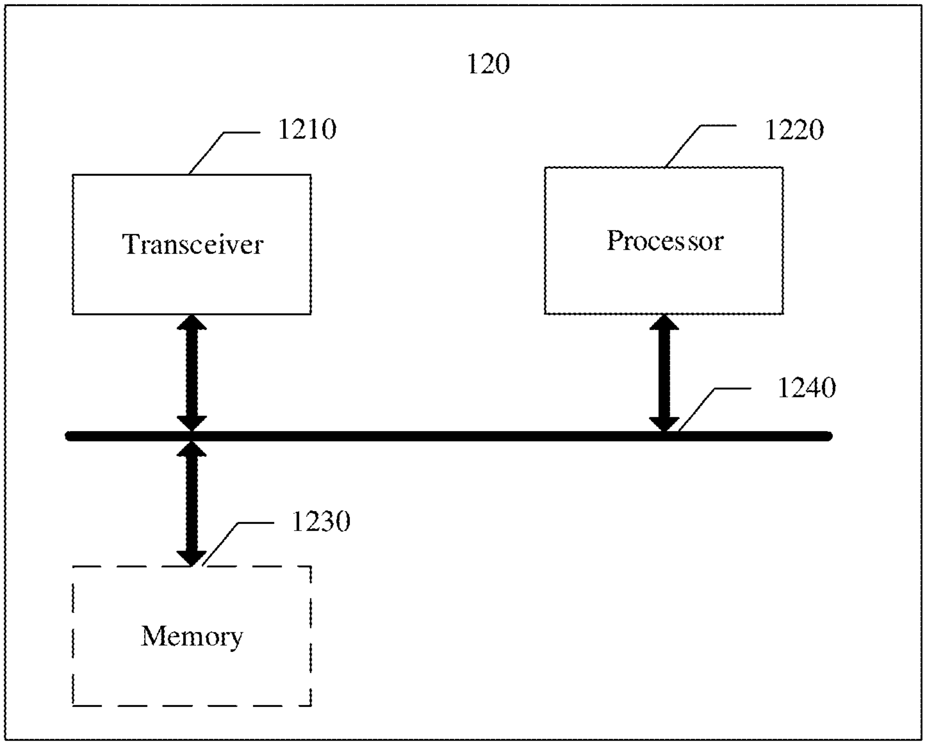
FIG. 12 is a schematic diagram of a structure of a communication apparatus according to an embodiment of this application.

In a possible implementation, the communication apparatus may be the terminal device in the foregoing method embodiments. In this case, the transceiver unit 1101 may be implemented by using a transceiver, and the processing unit 1102 may be implemented by using a processor. As shown in FIG. 12, a communication apparatus 120 includes one or more processors 1220 and a transceiver 1210. The processor and the transceiver may be configured to perform the functions, the operations, or the like performed by the foregoing terminal device.

For example, the transceiver may be configured to receive one SS/PBCH block. For another example, the transceiver may be configured to receive one or more SS/PBCH block burst sets or the like. For another example, the transceiver may be further configured to receive configuration information.

For example, the processor may be configured to obtain indication information based on the one SS/PBCH block.

In a possible implementation, the communication apparatus may be the network device in the foregoing method embodiments. In this case, the transceiver unit 1101 may be implemented by using a transceiver, and the processing unit 1102 may be implemented by using a processor. FIG. 12 is reused. As shown in FIG. 12, the communication apparatus 120 includes one or more processors 1220 and a transceiver 1210. The processor and the transceiver may be configured to perform the functions, the operations, or the like performed by the foregoing network device.

For example, the processor may send an SS/PBCH block burst set by using the transceiver. For another example, the processor may send configuration information and the like by using the transceiver.

In the foregoing implementations, optionally, a pattern of one or more SS/PBCH block burst sets may be shown in FIG. 7*a* to FIG. 7*e* or in FIG. 8.

Optionally, patterns of one SS/PBCH block burst set may be shown in FIG. 9*a* to FIG. 9*c*.

Optionally, patterns of one of the plurality of SS/PBCH block burst sets may be shown in FIG. 9*a* to FIG. 9*c*.

Optionally, a relationship between the PDSCH and the SS/PBCH block may be shown in FIG. 10*b* and FIG. 10*c*.

In various implementations of the communication apparatus shown in FIG. 12, the transceiver may include a receiver and a transmitter. The receiver is configured to perform a receiving function (or operation) and the transmitter is configured to perform a transmitting function (or operation). In addition, the transceiver is configured to communicate with another device/apparatus through a transmission medium. The processor 1220 sends and receives data and/or signaling by using the transceiver 1210, and is configured to implement the corresponding methods shown in FIG. 4 and FIG. 6 in the foregoing method embodiments.

Optionally, the communication apparatus 120 may further include one or more memories 1230, configured to store program instructions and/or data. The memory 1230 is coupled to the processor 1220. The coupling in this embodiment of this application is indirect coupling or a communication connection between apparatuses, units, or modules for information exchange between the apparatuses, the units, or the modules, and may be in electrical, mechanical, or other forms. The processor 1220 may coordinate with the memory 1230. The processor 1220 may execute the program instructions stored in the memory 1230. Optionally, at least one of the one or more memories may be included in the processor.

A specific connection medium between the transceiver 1210, the processor 1220, and the memory 1230 is not limited in this embodiment of this application. In this embodiment of this application, in FIG. 12, the memory 1230, the processor 1220, and the transceiver 1210 are connected by using a bus 1240. The bus is denoted by using a bold line in FIG. 12. A connection manner between other components is merely an example for description, and is not used as a limitation. The bus may be classified into an address bus, a data bus, a control bus, and the like. For ease of representation, only one bold line is used to represent the bus in FIG. 12, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, a discrete hardware component, or the like, and may implement or perform the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module, or the like.

It can be understood that, when the communication apparatus shown in FIG. 12 is a terminal device, the terminal device may further have more elements than those in FIG. 12. For example, the terminal device shown in FIG. 12 may further include an antenna. This is not limited in this embodiment of this application.

It can be understood that, when the communication apparatus shown in FIG. 12 is a network device, the network device may further have more elements and the like than those in FIG. 12. This is not limited in this embodiment of this application.

It can be understood that, the foregoing methods performed by the processor and the transceiver are merely examples. For specific steps performed by the processor and the transceiver, refer to the methods described above.

Figure 13:
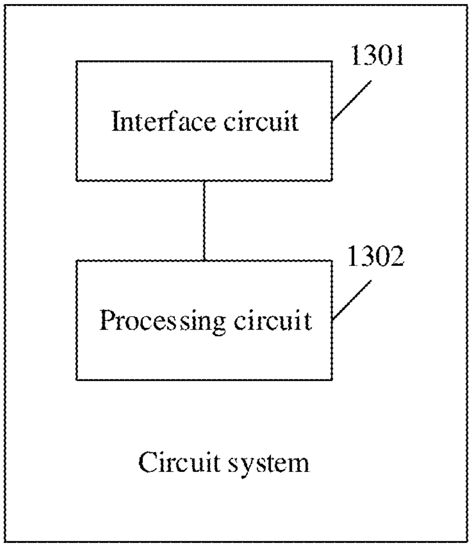
FIG. 13 is a schematic diagram of a structure of a circuit system according to an embodiment of this application.

In another possible implementation, the communication apparatus may be a circuit system in a terminal device. In this case, the processing unit 1102 may be implemented by using a processing circuit, and the transceiver unit 1101 may be implemented by using an interface circuit. As shown in FIG. 13, the communication apparatus may include a processing circuit 1302 and an interface circuit 1301. The processing circuit 1302 may be a chip, a logic circuit, an integrated circuit, a processing circuit, a system on chip (system on chip, SoC) chip, or the like. The interface circuit 1301 may be a communication interface, an input/output interface, or the like.

For example, the interface circuit may be configured to obtain one SS/PBCH block. For example, the interface circuit may be configured to obtain configuration information and the like. For another example, the interface circuit may be further configured to obtain one or more SS/PBCH block burst sets.

For another example, the processing circuit may be configured to obtain indication information based on the one SS/PBCH block.

Optionally, a pattern of one or more SS/PBCH block burst sets may be shown in FIG. 7*a* to FIG. 7*e* or in FIG. 8.

Optionally, patterns of one SS/PBCH block burst set may be shown in FIG. 9*a* to FIG. 9*c*.

Optionally, patterns of one of the plurality of SS/PBCH block burst sets may be shown in FIG. 9*a* to FIG. 9*c*.

Optionally, a relationship between the PDSCH and the SS/PBCH block may be shown in FIG. 10*b* and FIG. 10*c*.

In embodiments of this application, the processing circuit may be a general-purpose processor, a digital signal processor, an application-specific integrated circuit, a field programmable gate array or another programmable logic device, a discrete gate or transistor logic device, a discrete hardware component, or the like, and may implement or perform the methods, steps, and logical block diagrams disclosed in embodiments of this application.

It can be understood that, the methods performed by the interface circuit and the processing circuit described above are merely examples. For steps specifically performed by the interface circuit and the processing circuit, refer to the methods described above.

In several embodiments provided in this application, it should be understood that the disclosed system, apparatus, and method may be implemented in other manners. For example, the described apparatus embodiments are merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the technical effects of the solutions provided in the embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on this understanding, the technical solutions of this application essentially, or the part contributing to the conventional technology, or all or some of the technical solutions may be implemented in a form of a software product. The computer software product is stored in a readable storage medium, and includes several instructions for instructing a computer device (which may be, for example, a personal computer, a server, or a network device) to perform all or some of the steps of the methods described in embodiments of this application. The foregoing readable storage medium includes any medium that can store program code, such as a USB flash drive, a removable hard disk, a read-only memory (read-only memory, ROM), a random access memory (random access memory, RAM), a magnetic disk, or an optical disc.

In addition, this application further provides a computer program. The computer program is configured to implement an operation and/or processing performed by the terminal device in the method embodiments provided in this application.

This application further provides a computer-readable storage medium. The computer-readable storage medium stores computer code. When the computer code is run on a computer, the computer is enabled to perform an operation and/or processing performed by the terminal device in the method embodiments provided in this application.

This application further provides a computer program product. The computer program product includes computer code or a computer program. When the computer code or the computer program is run on a computer, an operation and/or processing performed by the terminal device in the method embodiments provided in this application are/is implemented.

This application further provides a wireless communication system. The wireless communication system includes the network device and the terminal device in the embodiments of this application.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

Based on the description in FIG. 4, for example, the indication information in step 402 includes the information used to indicate the DMRS series and the information about the PBCH payload, and based on the foregoing description, the information about the PBCH payload further includes information $\bar{a}_{\bar{A}+4}$ in the PBCH payload information.

The indication information in the embodiments of this application may be used to indicate 128, 256, 512, 1024, or 2048 candidate indexes. It can be understood that, the quantity of candidate indexes indicated by the indication information in the embodiments of this application is merely an example, and the quantity of candidate indexes may be another value or the like. Details are not described herein again. That is, the corresponding quantity of candidate indexes may be indicated by using the information used to indicate the DMRS sequence and the information about the PBCH payload.

A method for indicating candidate indexes by the indication information is as follows:

Optionally, the indication information uses 7 bits (bits) to represent a maximum of 128 candidate indexes, where the candidate indexes are all located in one burst set window or in a half frame; and includes the information used to indicate (or represent) the DMRS sequence and the information about the PBCH payload. The DMRS sequence is the 3-bit (bits) DMRS sequence in the PBCH described above. The information about the PBCH payload is 4-bit (bits) information $\bar{a}_{\bar{A}}$, $\bar{a}_{\bar{A}+5}$, $\bar{a}_{\bar{A}+6}$, and $\bar{a}_{\bar{A}+7}$, or $\bar{a}_{\bar{A}+1}$, $\bar{a}_{\bar{A}+5}$, $\bar{a}_{\bar{A}+6}$, and $\bar{a}_{\bar{A}+7}$, or $\bar{a}_{\bar{A}+2}$, $\bar{a}_{\bar{A}+5}$, $\bar{a}_{\bar{A}+6}$, and $\bar{a}_{\bar{A}+7}$, or $\bar{a}_{\bar{A}+3}$, $\bar{a}_{\bar{A}+5}$, $\bar{a}_{\bar{A}+6}$, and $\bar{a}_{\bar{A}+7}$ in the PBCH payload information. In this case, an update period of the information in the SIB1 is 80 ms. Any three bits (bits) of $\bar{a}_{\bar{A}}$, $\bar{a}_{\bar{A}+1}$, $\bar{a}_{\bar{A}+2}$, and $\bar{a}_{\bar{A}+3}$ in the PBCH payload are used to represent three least significant bits (bits) of a system frame number (system frame number, SFN) (least significant bits (least significant bit, LSB) of SFN).

Optionally, the indication information uses 8 bits (bits) to represent a maximum of 256 candidate indexes, where the candidate indexes are all located in one burst set window or in a half frame; and includes the information used to indicate (or represent) the DMRS sequence and the information about the PBCH payload. The DMRS sequence is the 3-bit (bits) DMRS sequence in the PBCH described above. The information about the PBCH payload is 5-bit (bits) information $\bar{a}_{\bar{A}}$, $\bar{a}_{\bar{A}+4}$, $\bar{a}_{\bar{A}+5}$, $\bar{a}_{\bar{A}+6}$, and $\bar{a}_{\bar{A}+7}$, or $\bar{a}_{\bar{A}+1}$, $\bar{a}_{\bar{A}+4}$, $\bar{a}_{\bar{A}+5}$, $\bar{a}_{\bar{A}+6}$, and $\bar{a}_{\bar{A}+7}$, or $\bar{a}_{\bar{A}+2}$, $\bar{a}_{\bar{A}+4}$, $\bar{a}_{\bar{A}+5}$, $\bar{a}_{\bar{A}+6}$, and $\bar{a}_{\bar{A}+7}$, or $\bar{a}_{\bar{A}+3}$, $\bar{a}_{\bar{A}+4}$, $\bar{a}_{\bar{A}+5}$, $\bar{a}_{\bar{A}+6}$, and $\bar{a}_{\bar{A}+7}$ in the PBCH payload information. In this case, an update period of the information in the SIB1 is 80 ms. Any three bits (bits) of $\bar{a}_{\bar{A}}$, $\bar{a}_{\bar{A}+1}$, $\bar{a}_{\bar{A}+2}$, and $\bar{a}_{\bar{A}+3}$ in the PBCH payload are used to represent three least significant bits (bits) of an SFN (LSB of SFN).

When the update period of the information in the SIB1 is 80 ms, the three bits (bits) used to indicate (or represent) the least significant bits (LSB) of the SFN are located in the PBCH payload information, and seven bits (bits) used to indicate most significant bits (most significant bit, MSB) of the SFN are located in a MIB.

For example, the network device may define third indication information. Therefore, the bits in the MIB that represent the SFN information may include a bit occupied by the third indication information and most significant bits (MSB), which are 6 bits (bits). That is, the third indication information occupies one bit, and is represented by using any one bit in a parameter pdcch-ConfigSIB1 in the MIB or a parameter with a similar function. The parameter pdcch-ConfigSIB1 in the MIB may be used to indicate configuration information of a type0 (type0)-PDCCH that has a quasi co-location (quasi co-location, QCL) relationship with an SSB. Optionally, when the update period of the information in the SIB1 is 40 ms, the third indication information occupies two bits, for example, is represented by using any two bits in the parameter pdcch-ConfigSIB1 in the MIB. Optionally, when the update period of the information in the SIB1 is 20 ms, the third indication information occupies three bits, and is represented by using any three bits in the parameter pdcch-ConfigSIB1 in the MIB. Optionally, when the update period of the information in the SIB1 is 10 ms, the third indication information occupies four bits, and is represented by using any four bits in the parameter pdcch-ConfigSIB1 in the MIB.

For example, the network device may further define fourth indication information. The fourth indication information represents a quantity of bits used to indicate $k_{ssb}$. The parameter $k_{ssb}$ represents a spacing between a subcarrier index #0 in an RB in which an SSB is located and a subcarrier index #0 in a CRB (common RB) overlapping the RB. When a subcarrier spacing between an SSB and a Type0-PDCCH that carries CORESET #0 and that has a QCL relationship with the SSB is {120 kHz, 240 kHz}, {240 kHz, 480 kHz}, or {480 kHz, 960 kHz}, the fourth indication information includes a 4-bit parameter ssb-SubcarrierOffset in the MIB and additional fifth indication information. The fifth indication information may be represented by using any one bit in the parameter pdcch-ConfigSIB1 in the MIB, or by using 1-bit information occupied by $\bar{a}_{\bar{A}}$, $\bar{a}_{\bar{A}+1}$, $\bar{a}_{\bar{A}+2}$, or $\bar{a}_{\bar{A}+3}$ in the PBCH payload. Alternatively, when a subcarrier spacing between an SSB and a Type0-PDCCH that carries CORESET #0 and that has a QCL relationship with the SSB is {120 kHz, 480 kHz} or {240 kHz, 960 kHz}, the fourth indication information includes a 4-bit parameter ssb-SubcarrierOffset in the MIB and additional fifth indication information. The fifth indication information may be represented by using any two bits in the parameter pdcch-ConfigSIB1 in the MIB, or by using 2-bit information occupied by $\bar{a}_{\bar{A}}$ and $\bar{a}_{\bar{A}+1}$, or $\bar{a}_{\bar{A}}$ and $\bar{a}_{\bar{A}+2}$, or $\bar{a}_{\bar{A}}$ and $\bar{a}_{\bar{A}+3}$, or $\bar{a}_{\bar{A}+1}$ and $\bar{a}_{\bar{A}+2}$, or $\bar{a}_{\bar{A}+1}$ and $\bar{a}_{\bar{A}+3}$, or $\bar{a}_{\bar{A}+2}$ and $\bar{a}_{\bar{A}+3}$ in the PBCH payload, or by using a total of two bits including any one bit in the parameter pdcch-ConfigSIB1 in the MIB and 1-bit information occupied by $\bar{a}_{\bar{A}}$, $\bar{a}_{\bar{A}+1}$, $\bar{a}_{\bar{A}+2}$, or $\bar{a}_{\bar{A}+3}$ in the PBCH payload. Alternatively, when a subcarrier spacing between an SSB and a Type0-PDCCH that carries CORESET #0 and that has a QCL relationship with the SSB is {120 kHz, 960 kHz}, the fourth indication information includes a 4-bit parameter ssb-SubcarrierOffset in the MIB and additional fifth indication information. The fifth indication information may be represented by using any three bits in the parameter pdcch-ConfigSIB1 in the MIB, or by using 3-bit information occupied by $\bar{a}_{\bar{A}}$, $\bar{a}_{\bar{A}+1}$, and $\bar{a}_{\bar{A}+2}$, or $\bar{a}_{\bar{A}}$, $\bar{a}_{\bar{A}+1}$, and $\bar{a}_{\bar{A}+3}$, or $\bar{a}_{\bar{A}}$, $\bar{a}_{\bar{A}+2}$, and $\bar{a}_{\bar{A}+3}$, or $\bar{a}_{\bar{A}+1}$, $\bar{a}_{\bar{A}+2}$, and $\bar{a}_{\bar{A}+3}$ in the PBCH payload, or by using a total of three bits including any one bit in the parameter pdcch-ConfigSIB1 in the MIB and 2-bit information occupied by $\bar{a}_{\bar{A}}$ and $\bar{a}_{\bar{A}+1}$, or $\bar{a}_{\bar{A}}$ and $\bar{a}_{\bar{A}+2}$, or $\bar{a}_{\bar{A}}$ and $\bar{a}_{\bar{A}+3}$, or $\bar{a}_{\bar{A}+1}$ and $\bar{a}_{\bar{A}+2}$, or $\bar{a}_{\bar{A}+1}$ and $\bar{a}_{\bar{A}+3}$, or $\bar{a}_{\bar{A}+2}$ and $\bar{a}_{\bar{A}+3}$ in the PBCH payload, or by using a total of three bits including any two bits in the parameter pdcch-ConfigSIB1 in the MIB and 1-bit information occupied by $\bar{a}_{\bar{A}}$, $\bar{a}_{\bar{A}+1}$, $\bar{a}_{\bar{A}+2}$, or $\bar{a}_{\bar{A}+3}$ in the PBCH payload.

Optionally, when a subcarrier spacing between an SSB and a Type0-PDCCH that carries CORESET #0 and that has a QCL relationship with the SSB is {120 kHz, 60 kHz}, {480 kHz, 240 kHz}, or {960 kHz, 480 kHz}, the fourth indication information is any three bits in a 4-bit parameter ssb-SubcarrierOffset in the MIB, for example, represents three most significant bits (MSB) or three least significant bits (LSB) in the parameter ssb-SubcarrierOffset. When a subcarrier spacing between an SSB and a Type0-PDCCH that carries CORESET #0 and that has a QCL relationship with the SSB is {240 kHz, 60 kHz}, {480 kHz, 120 kHz}, or {960 kHz, 240 kHz}, the fourth indication information is any two bits in a 4-bit parameter ssb-SubcarrierOffset in the MIB, for example, represents two most significant bits (MSB) or two least significant bits (LSB) in the parameter ssb-SubcarrierOffset. When a subcarrier spacing between an SSB and a Type0-PDCCH that carries CORESET #0 and that has a QCL relationship with the SSB is {480 kHz, 60 kHz} or {960 kHz, 120 kHz}, the fourth indication information is any one bit in a 4-bit parameter ssb-SubcarrierOffset in the MIB, for example, represents one most significant bit (MSB), one least significant bit (LSB), or one penultimate least significant bit (LSB) in the parameter ssb-SubcarrierOffset. When a subcarrier spacing between an SSB and a Type0-PDCCH that carries CORESET #0 and that has a QCL relationship with the SSB is {960 kHz, 60 kHz}, the fourth indication information is any one bit in a 4-bit parameter ssb-SubcarrierOffset in the MIB, for example, represents one most significant bit (MSB), one least significant bit (LSB), or one penultimate least significant bit (LSB) in the parameter ssb-SubcarrierOffset.

Optionally, a redundant bit in the indication parameter ssb-SubcarrierOffset may be used to indicate another parameter, for example, indicate a system frame number or a TRP index, or distinguish between a MIB1 and a MIB2.

The MIB1 is carried in a PBCH channel operating on a licensed frequency band, and the MIB2 is carried in a PBCH channel operating on a shared licensed frequency band. Alternatively, the MIB1 is carried in a PBCH channel operating on a shared unlicensed frequency band, and the MIB2 is carried in a PBCH channel operating on an unlicensed frequency band.

Optionally, the indication information uses 8 bits (bits) to represent a maximum of 256 candidate indexes, where the candidate indexes are all located in one burst set window or in a half frame; and includes the information used to indicate (or represent) the DMRS sequence and the information about the PBCH payload. The DMRS sequence is the 3-bit (bits) DMRS sequence in the PBCH described above. The information about the PBCH payload is 5-bit (bits) information $\bar{a}_{\bar{A}}$, $\bar{a}_{\bar{A}+1}$, $\bar{a}_{\bar{A}+5}$, $\bar{a}_{\bar{A}+6}$, and $\bar{a}_{\bar{A}+7}$, or $\bar{a}_{\bar{A}}$, $\bar{a}_{\bar{A}+2}$, $\bar{a}_{\bar{A}+5}$, $\bar{a}_{\bar{A}+6}$, and $\bar{a}_{\bar{A}+7}$, or $\bar{a}_{\bar{A}}$, $\bar{a}_{\bar{A}+3}$, $\bar{a}_{\bar{A}+5}$, $\bar{a}_{\bar{A}+6}$, and $\bar{a}_{\bar{A}+7}$, or $\bar{a}_{\bar{A}+1}$, $\bar{a}_{\bar{A}+2}$, $\bar{a}_{\bar{A}+5}$, $\bar{a}_{\bar{A}+6}$, and $\bar{a}_{\bar{A}+7}$, or $\bar{a}_{\bar{A}+1}$, $\bar{a}_{\bar{A}+3}$, $\bar{a}_{\bar{A}+5}$, $\bar{a}_{\bar{A}+6}$, and $\bar{a}_{\bar{A}+7}$, or $a_{\bar{A}+2}$, $\bar{a}_{\bar{A}+3}$, $\bar{a}_{\bar{A}+5}$, $\bar{a}_{\bar{A}+6}$, and $\bar{a}_{\bar{A}+7}$ in the PBCH payload information. In this case, an update period of the information in the SIB1 is 40 ms. Any two bits (bits) of $\bar{a}_{\bar{A}}$, $\bar{a}_{\bar{A}+1}$, $\bar{a}_{\bar{A}+2}$, and $\bar{a}_{\bar{A}+3}$ in the PBCH payload are used to represent two least significant bits (bits) of an SFN (LSB of SFN).

Optionally, the indication information uses 9 bits (bits) to represent a maximum of 512 candidate indexes, where the candidate indexes are all located in one burst set window or in a half frame; and includes the information used to indicate (or represent) the DMRS sequence and the information about the PBCH payload. The DMRS sequence is the 3-bit (bits) DMRS sequence in the PBCH described above. The information about the PBCH payload is 6-bit (bits) information $\bar{a}_{\bar{A}}$, $\bar{a}_{\bar{A}+1}$, $\bar{a}_{\bar{A}+4}$, $\bar{a}_{\bar{A}+5}$, $\bar{a}_{\bar{A}+6}$, and $\bar{a}_{\bar{A}+7}$, or $\bar{a}_{\bar{A}}$, $\bar{a}_{\bar{A}+2}$, $\bar{a}_{\bar{A}+4}$, $\bar{a}_{\bar{A}+5}$, $\bar{a}_{\bar{A}+6}$, and $\bar{a}_{\bar{A}+7}$, or $\bar{a}_{\bar{A}}$, $\bar{a}_{\bar{A}+3}$, $\bar{a}_{\bar{A}+4}$, $\bar{a}_{\bar{A}+5}$, $\bar{a}_{\bar{A}+6}$, and $\bar{a}_{\bar{A}+7}$, or $\bar{a}_{\bar{A}+1}$, $\bar{a}_{\bar{A}+2}$, $\bar{a}_{\bar{A}+4}$, $\bar{a}_{\bar{A}+5}$, $\bar{a}_{\bar{A}+6}$, and $\bar{a}_{\bar{A}+7}$, or $\bar{a}_{\bar{A}+1}$, $\bar{a}_{\bar{A}+3}$, $\bar{a}_{\bar{A}+4}$, $\bar{a}_{\bar{A}+5}$, $\bar{a}_{\bar{A}+6}$, and $\bar{a}_{\bar{A}+7}$, or $\bar{a}_{\bar{A}+2}$, $\bar{a}_{\bar{A}+3}$, $\bar{a}_{\bar{A}+4}$, $\bar{a}_{\bar{A}+5}$, $\bar{a}_{\bar{A}+6}$, and $\bar{a}_{\bar{A}+7}$ in the PBCH payload information. In this case, an update period of the information in the SIB1 is 40 ms. Any two bits (bits) of $\bar{a}_{\bar{A}}$, $\bar{a}_{\bar{A}+1}$, $\bar{a}_{\bar{A}+2}$, and $\bar{a}_{\bar{A}+3}$ in the PBCH payload are used to represent two least significant bits (bits) of an SFN (LSB of SFN).

Optionally, the indication information uses 9 bits (bits) to represent a maximum of 512 candidate indexes, where the candidate indexes are all located in one burst set window or in a half frame; and includes the information used to indicate (or represent) the DMRS sequence and the information about the PBCH payload. The DMRS sequence is the 3-bit (bits) DMRS sequence in the PBCH described above. The information about the PBCH payload is 6-bit (bits) information $\bar{a}_{\bar{A}}$, $\bar{a}_{\bar{A}+1}$, $\bar{a}_{\bar{A}+2}$, $\bar{a}_{\bar{A}+5}$, $\bar{a}_{\bar{A}+6}$, and $\bar{a}_{\bar{A}+7}$, or $\bar{a}_{\bar{A}}$, $\bar{a}_{\bar{A}+1}$, $\bar{a}_{\bar{A}+3}$, $\bar{a}_{\bar{A}+5}$, $\bar{a}_{\bar{A}+6}$, and $\bar{a}_{\bar{A}+7}$, or $\bar{a}_{\bar{A}}$, $\bar{a}_{\bar{A}+2}$, $\bar{a}_{\bar{A}+3}$, $\bar{a}_{\bar{A}+5}$, $\bar{a}_{\bar{A}+6}$, and $\bar{a}_{\bar{A}+7}$, or $\bar{a}_{\bar{A}+1}$, $\bar{a}_{\bar{A}+2}$, $\bar{a}_{\bar{A}+3}$, $\bar{a}_{\bar{A}+5}$, $\bar{a}_{\bar{A}+6}$, and $\bar{a}_{\bar{A}+7}$ in the PBCH payload information. In this case, an update period of the information in the SIB1 is 20 ms. Any one bit (bits) of $\bar{a}_{\bar{A}}$, $\bar{a}_{\bar{A}+1}$, $\bar{a}_{\bar{A}+2}$, and $\bar{a}_{\bar{A}+3}$ in the PBCH payload is used to represent one least significant bit (bits) of an SFN (LSB of SFN).

Optionally, the indication information uses 10 bits (bits) to represent a maximum of 1024 candidate indexes, where the candidate indexes are all located in one burst set window or in a half frame; and includes the information used to indicate (or represent) the DMRS sequence and the information about the PBCH payload. The DMRS sequence is the 3-bit (bits) DMRS sequence in the PBCH described above. The information about the PBCH payload is 7-bit (bits) information $\bar{a}_{\bar{A}}$, $\bar{a}_{\bar{A}+1}$, $\bar{a}_{\bar{A}+2}$, $\bar{a}_{\bar{A}+4}$, $\bar{a}_{\bar{A}+5}$, $\bar{a}_{\bar{A}+6}$, and $\bar{a}_{\bar{A}+7}$, or $\bar{a}_{\bar{A}}$, $\bar{a}_{\bar{A}+1}$, $\bar{a}_{\bar{A}+3}$, $\bar{a}_{\bar{A}+4}$, $\bar{a}_{\bar{A}+5}$, $\bar{a}_{\bar{A}+6}$, and $\bar{a}_{\bar{A}+7}$, or $\bar{a}_{\bar{A}}$, $\bar{a}_{\bar{A}+2}$, $\bar{a}_{\bar{A}+3}$, $\bar{a}_{\bar{A}+4}$, $\bar{a}_{\bar{A}+5}$, $\bar{a}_{\bar{A}+6}$, and $\bar{a}_{\bar{A}+7}$, or $\bar{a}_{\bar{A}+1}$, $\bar{a}_{\bar{A}+2}$, $\bar{a}_{\bar{A}+3}$, $\bar{a}_{\bar{A}+4}$, $\bar{a}_{\bar{A}+5}$, $\bar{a}_{\bar{A}+6}$, and $\bar{a}_{\bar{A}+7}$ in the PBCH payload information. In this case, an update period of the information in the SIB1 is 20 ms. Any one bit (bits) of $\bar{a}_{\bar{A}}$, $\bar{a}_{\bar{A}+1}$, $\bar{a}_{\bar{A}+2}$, and $\bar{a}_{\bar{A}+3}$ in the PBCH payload is used to represent one least significant bit (bits) of an SFN (LSB of SFN).

Optionally, the indication information uses 10 bits (bits) to represent a maximum of 1024 candidate indexes, where the candidate indexes are all located in one burst set window or in a half frame; and includes the information used to indicate (or represent) the DMRS sequence and the information about the PBCH payload. The DMRS sequence is the 3-bit (bits) DMRS sequence in the PBCH described above. The information about the PBCH payload is 7-bit (bits) information $\bar{a}_{\bar{A}}$, $\bar{a}_{\bar{A}+1}$, $\bar{a}_{\bar{A}+2}$, $\bar{a}_{\bar{A}+3}$, $\bar{a}_{\bar{A}+5}$, $\bar{a}_{\bar{A}+6}$, or $\bar{a}_{\bar{A}+7}$ in the PBCH payload information. In this case, an update period of the information in the SIB1 is 10 ms.

Optionally, the indication information uses 11 bits (bits) to represent a maximum of 2048 candidate indexes, where the candidate indexes are all located in one burst set window or in a half frame; and includes the information used to indicate (or represent) the DMRS sequence and the information about the PBCH payload. The DMRS sequence is the 3-bit (bits) DMRS sequence in the PBCH described above. The information about the PBCH payload is 8-bit (bits) information $\bar{a}_{\bar{A}}$, $\bar{a}_{\bar{A}+1}$, $\bar{a}_{\bar{A}+2}$, $\bar{a}_{\bar{A}+3}$, $\bar{a}_{\bar{A}+4}$, $\bar{a}_{\bar{A}+5}$, $\bar{a}_{\bar{A}+6}$, or $\bar{a}_{\bar{A}+7}$ in the PBCH payload information. In this case, an update period of the information in the SIB1 is 10 ms.

In this application, the foregoing describes the condition met by a start symbol of an SSB (the SS/PBCH block described above) when the subcarrier spacing is 480 kHz or 960 kHz. The following describes in detail an index of the start symbol of the SSB. It can be understood that, the SS/PBCH block described above in this application may also be referred to as a candidate SSB, and the start symbol may also be referred to as the first symbol or the like. A specific name is not limited in the embodiments of this application. It can be understood that, the candidate SSB described in this application refers to a candidate position for sending the SSB. It can be understood that, a specific value of n described in this application may be determined by a length of a DRS window. Alternatively, a specific value of n described in this application may be determined by a length of a DRS window and an uplink-downlink slot configuration. In other words, a value corresponding to a slot used for uplink service transmission needs to be skipped for a specific value of n described in this application.

For example, when a subcarrier spacing of an SSB is 480 kHz or 960 kHz, for a licensed frequency band, an index of the first symbol of a candidate SSB (candidate SS/PBCH blocks) may meet any one of the following conditions:

{0, 6}+14n (n is equal to 0, 1, 2, . . . , or 31); {0, 8}+14n (n is equal to 0, 1, 2, . . . , or 31); {0, 10}+14n (n is equal to 0, 1, 2, . . . , or 31); {2, 8}+14n (n is equal to 0, 1, 2, . . . , or 31); {2, 10}+14n (n is equal to 0, 1, 2, . . . , or 31); and {4, 10}+14n (n is equal to 0, 1, 2, . . . , or 31). It can be understood that, each expression described herein is illustrated based on repetition in a unit of one slot. That is, under any one of the conditions described above, each of the foregoing described slots may include two candidate SSBs. For example, an index of the first symbol of a candidate SSB meets: {0, 6}+14n (n is equal to 0, 1, 2, . . . , or 31). When n is equal to 0, symbol 0 of the first slot is an index of the first symbol of one candidate SSB, and symbol 6 of the first slot may be an index of the first symbol of the other candidate SSB. For another example, when n is equal to 1, symbol 0 of the second slot is an index of the first symbol of one candidate SSB, and symbol 6 of the second slot is an index of the first symbol of the other candidate SSB. It can be understood that, this application is based on repetition in a unit of one slot, the foregoing description of the index of the first symbol is also illustrate by using an example in which one slot includes 14 symbols. However, in this application, the indexes may alternatively be numbered in ascending order. For example, alternatively, when n is equal to 1, an index of the first symbol of one candidate SSB may be 14, and an index of the first symbol of the other candidate SSB may be 20.

Alternatively, an index of the first symbol of a candidate SSB may meet any one of the following conditions:

{0, 6, 14, 20}+28n (n is equal to 0, 1, 2, . . . , or 15);
{0, 6, 14, 22}+28n (n is equal to 0, 1, 2, . . . , or 15);
{0, 6, 14, 24}+28n (n is equal to 0, 1, 2, . . . , or 15);
{0, 6, 16, 22}+28n (n is equal to 0, 1, 2, . . . , or 15);
{0, 6, 16, 24}+28n (n is equal to 0, 1, 2, . . . , or 15);
{0, 6, 18, 24}+28n (n is equal to 0, 1, 2, . . . , or 15);
{0, 8, 14, 20}+28n (n is equal to 0, 1, 2, . . . , or 15);
{0, 8, 14, 22}+28n (n is equal to 0, 1, 2, . . . , or 15);
{0, 8, 14, 24}+28n (n is equal to 0, 1, 2, . . . , or 15);
{0, 8, 16, 22}+28n (n is equal to 0, 1, 2, . . . , or 15);
{0, 8, 16, 24}+28n (n is equal to 0, 1, 2, . . . , or 15);
{0, 8, 18, 24}+28n (n is equal to 0, 1, 2, . . . , or 15);
{0, 10, 14, 20}+28n (n is equal to 0, 1, 2, . . . , or 15);
{0, 10, 14, 22}+28n (n is equal to 0, 1, 2, . . . , or 15);
{0, 10, 14, 24}+28n (n is equal to 0, 1, 2, . . . , or 15);
{0, 10, 16, 22}+28n (n is equal to 0, 1, 2, . . . , or 15);
{0, 10, 16, 24}+28n (n is equal to 0, 1, 2, . . . , or 15);
{0, 10, 18, 24}+28n (n is equal to 0, 1, 2, . . . , or 15);
{2, 8, 14, 20}+28n (n is equal to 0, 1, 2, . . . , or 15);
{2, 8, 14, 22}+28n (n is equal to 0, 1, 2, . . . , or 15);
{2, 8, 14, 24}+28n (n is equal to 0, 1, 2, . . . , or 15);
{2, 8, 16, 22}+28n (n is equal to 0, 1, 2, . . . , or 15);
{2, 8, 16, 24}+28n (n is equal to 0, 1, 2, . . . , or 15);
{2, 8, 18, 24}+28n (n is equal to 0, 1, 2, . . . , or 15);
{2, 10, 14, 20}+28n (n is equal to 0, 1, 2, . . . , or 15);
{2, 10, 14, 22}+28n (n is equal to 0, 1, 2, . . . , or 15);
{2, 10, 14, 24}+28n (n is equal to 0, 1, 2, . . . , or 15);
{2, 10, 16, 22}+28n (n is equal to 0, 1, 2, . . . , or 15);
{2, 10, 16, 24}+28n (n is equal to 0, 1, 2, . . . , or 15);
{2, 10, 18, 24}+28n (n is equal to 0, 1, 2, . . . , or 15);
{4, 10, 14, 20}+28n (n is equal to 0, 1, 2, . . . , or 15);
{4, 10, 14, 22}+28n (n is equal to 0, 1, 2, . . . , or 15);
{4, 10, 14, 24}+28n (n is equal to 0, 1, 2, . . . , or 15);
{4, 10, 16, 22}+28n (n is equal to 0, 1, 2, . . . , or 15);
{4, 10, 16, 24}+28n (n is equal to 0, 1, 2, . . . , or 15); and
{4, 10, 18, 24}+28n (n is equal to 0, 1, 2, . . . , or 15). It can be understood that, each expression described herein is illustrated based on repetition in a unit of two slots. That is, every two of the foregoing slots may include four candidate SSBs. In this case, symbol indexes may be 0 to 27. That is, an index of the first symbol of a candidate SSB is represented in a unit of every two slots. For example, an index of the first symbol of a candidate SSB meets: {0, 6, 14, 20}+28n (n is equal to 0, 1, 2, . . . , or 15). When n is equal to 0, in every two slots (which may also be understood as the first slot and the second slot), symbol 0 is an index of the first symbol of one candidate SSB, symbol 6 is an index of the first symbol of one candidate SSB, symbol 14 is an index of the first symbol of one candidate SSB, and symbol 20 is an index of the first symbol of one candidate SSB. For another example, when n is equal to 1, in every two slots (which may also be understood as the third slot and the fourth slot), symbol 0 is an index (also referred to as index 28 if symbols included in each slot are sorted in ascending order) of the first symbol of one candidate SSB, symbol 6 is an index (also referred to as index 34) of the first symbol of one candidate SSB, symbol 14 is an index (also referred to as index 42) of the first symbol of one candidate SSB, and symbol 20 is an index (also referred to as index 48) of the first symbol of one candidate SSB. It can be understood that, the description of the indexes herein is also applicable to the following description. To avoid repetition, details are not described below again.

Alternatively, an index of the first symbol of a candidate SSB meets any one of the following conditions:

{a, b, c, d, e, f, g, h}+56n (n is equal to 0, 1, 2, . . . , or 7).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet: {2, 8, 16, 22, 30, 36, 44, 50}+56n (n is equal to 0, 1, 2, . . . , or 7). When n is equal to 0, in every eight slots, symbol 2 is an index of the first symbol of one candidate SSB, and symbol 8 may be an index of the first symbol of one candidate SSB. For another example, when n is equal to 2, an index of the first symbol of a candidate SSB may be 114, which may also be referred to as symbol 2 in every eight slots (that is, the third symbol in a unit of eight slots).

For another example, an index of the first symbol of a candidate SSB may meet {2, 10, 16, 24, 30, 38, 44, 52}+56n (n is equal to 0, 1, 2, . . . , or 7).

For another example, an index of the first symbol of a candidate SSB may meet {0, 8, 14, 22, 28, 36, 42, 50}+56n (n is equal to 0, 1, 2, . . . , or 7).

It can be understood that, a specific formula described herein is merely an example, and examples of specific values of a to h described above are not enumerated one by one. It can be understood that, each expression described herein is illustrated based on repetition in a unit of eight slots.

For example, when a subcarrier spacing of an SSB is 480 kHz, for a system operating on an unlicensed frequency band (or a system operating on a shared frequency band), a length of a DRS window is 2 ms, there are 112 positions for candidate SSBs, and an index of the first symbol of a candidate SSB (candidate SS/PBCH blocks) meets any one of the following conditions:

{0, 6}+14n (n is equal to 0, 1, 2, . . . , 31, 40, . . . , or 63); {0, 8}+14n (n is equal to 0, 1, 2, . . . , 31, 40, . . . , or 63); {0, 10}+14n (n is equal to 0, 1, 2, . . . , 31, 40, . . . , or 63); {2, 8}+14n (n is equal to 0, 1, 2, . . . , 31, 40, . . . , or 63); {2, 10}+14n (n is equal to 0, 1, 2, . . . , 31, 40, . . . , or 63); and {4, 10}+14n (n is equal to 0, 1, 2, . . . , 31, 40, . . . , or 63).

Alternatively, an index of the first symbol of a candidate SSB may meet any one of the following conditions:

{0, 6, 14, 20}+28n (n is equal to 0, 1, 2, . . . , 15, 20, . . . , or 31);
{0, 6, 14, 22}+28n (n is equal to 0, 1, 2, . . . , 15, 20, . . . , or 31);
{0, 6, 14, 24}+28n (n is equal to 0, 1, 2, . . . , 15, 20, . . . , or 31);
{0, 6, 16, 22}+28n (n is equal to 0, 1, 2, . . . , 15, 20, . . . , or 31);
{0, 6, 16, 24}+28n (n is equal to 0, 1, 2, . . . , 15, 20, . . . , or 31);
{0, 6, 18, 24}+28n (n is equal to 0, 1, 2, . . . , 15, 20, . . . , or 31);
{0, 8, 14, 20}+28n (n is equal to 0, 1, 2, . . . , 15, 20, . . . , or 31);
{0, 8, 14, 22}+28n (n is equal to 0, 1, 2, . . . , 15, 20, . . . , or 31);
{0, 8, 14, 24}+28n (n is equal to 0, 1, 2, . . . , 15, 20, . . . , or 31);
{0, 8, 16, 22}+28n (n is equal to 0, 1, 2, . . . , 15, 20, . . . , or 31);
{0, 8, 16, 24}+28n (n is equal to 0, 1, 2, . . . , 15, 20, . . . , or 31);
{0, 8, 18, 24}+28n (n is equal to 0, 1, 2, . . . , 15, 20, . . . , or 31);
{0, 10, 14, 20}+28n (n is equal to 0, 1, 2, . . . , 15, 20, . . . , or 31);
{0, 10, 14, 22}+28n (n is equal to 0, 1, 2, . . . 15, 20, . . . , or 31);
{0, 10, 14, 24}+28n (n is equal to 0, 1, 2, . . . 15, 20, . . . , or 31);
{0, 10, 16, 22}+28n (n is equal to 0, 1, 2, . . . 15, 20, . . . , or 31);
{0, 10, 16, 24}+28n (n is equal to 0, 1, 2, . . . 15, 20, . . . , or 31);
{0, 10, 18, 24}+28n (n is equal to 0, 1, 2, . . . , 15, 20, . . . , or 31);
{2, 8, 14, 20}+28n (n is equal to 0, 1, 2, . . . , 15, 20, . . . , or 31);
{2, 8, 14, 22}+28n (n is equal to 0, 1, 2, . . . , 15, 20, . . . , or 31);
{2, 8, 14, 24}+28n (n is equal to 0, 1, 2, . . . , 15, 20, . . . , or 31);
{2, 8, 16, 22}+28n (n is equal to 0, 1, 2, . . . , 15, 20, . . . , or 31);
{2, 8, 16, 24}+28n (n is equal to 0, 1, 2, . . . , 15, 20, . . . , or 31);
{2, 8, 18, 24}+28n (n is equal to 0, 1, 2, . . . , 15, 20, . . . , or 31);
{2, 10, 14, 20}+28n (n is equal to 0, 1, 2, . . . , 15, 20, . . . , or 31);
{2, 10, 14, 22}+28n (n is equal to 0, 1, 2, . . . , 15, 20, . . . , or 31);
{2, 10, 14, 24}+28n (n is equal to 0, 1, 2, . . . , 15, 20, . . . , or 31);
{2, 10, 16, 22}+28n (n is equal to 0, 1, 2, . . . , 15, 20, . . . , or 31);
{2, 10, 16, 24}+28n (n is equal to 0, 1, 2, . . . , 15, 20, . . . , or 31);
{2, 10, 18, 24}+28n (n is equal to 0, 1, 2, . . . , 15, 20, . . . , or 31);
{4, 10, 14, 20}+28n (n is equal to 0, 1, 2, . . . , 15, 20, . . . , or 31);
{4, 10, 14, 22}+28n (n is equal to 0, 1, 2, . . . , 15, 20, . . . , or 31);
{4, 10, 14, 24}+28n (n is equal to 0, 1, 2, . . . , 15, 20, . . . , or 31);
{4, 10, 16, 22}+28n (n is equal to 0, 1, 2, . . . , 15, 20, . . . , or 31);
{4, 10, 16, 24}+28n (n is equal to 0, 1, 2, . . . , 15, 20, . . . , or 31); and
{4, 10, 18, 24}+28n (n is equal to 0, 1, 2, . . . , 15, 20, . . . , or 31).

Alternatively, an index of the first symbol of a candidate SSB (candidate SS/PBCH blocks) meets any one of the following conditions:

{a, b, c, d, e, f, g, h}+56n (n is equal to 0, 1, 2, . . . , 7, 10, . . . , or 15).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 7, 10, . . . , or 15).

For another example, an index of the first symbol of a candidate SSB may meet {2, 10, 16, 24, 30, 38, 44, 52}+56n (n is equal to 0, 1, 2, . . . , 7, 10, . . . , or 15).

For another example, an index of the first symbol of a candidate SSB may meet {0, 8, 14, 22, 28, 36, 42, 50}+56n (n is equal to 0, 1, 2, . . . , 7, 10, . . . , or 15).

For example, when a subcarrier spacing of an SSB is 480 kHz, for a system operating on an unlicensed frequency band (or a system operating on a shared frequency band), a length of a DRS window is 2.25 ms, there are 128 positions for candidate SSBs, and an index of the first symbol of a candidate SSB (candidate SS/PBCH blocks) meets the following conditions:

{0, 6}+14n (n is equal to 0, 1, 2, . . . , 31, 40, . . . , or 71), {0, 8}+14n (n is equal to 0, 1, 2, . . . , 31, 40, . . . , or 71); {0, 10}+14n (n is equal to 0, 1, 2, . . . , 31, 40, . . . , or 71); {2, 8}+14n (n is equal to 0, 1, 2, . . . , 31, 40, . . . , or 71); {2, 10}+14n (n is equal to 0, 1, 2, . . . , 31, 40, . . . , or 71); and {4, 10}+14n (n is equal to 0, 1, 2, . . . , 31, 40, . . . , or 71).

Alternatively, an index of the first symbol of a candidate SSB may meet any one of the following conditions:

{0, 6, 14, 20}+28n (n is equal to 0, 1, 2, . . . , 15, 20, . . . , or 35);
{0, 6, 14, 22}+28n (n is equal to 0, 1, 2, . . . , 15, 20, . . . , or 35);
{0, 6, 14, 24}+28n (n is equal to 0, 1, 2, . . . , 15, 20, . . . , or 35);

{0, 6, 16, 22}+28n (n is equal to 0, 1, 2, . . . , 15, 20, . . . , or 35);
{0, 6, 16, 24}+28n (n is equal to 0, 1, 2, . . . , 15, 20, . . . , or 35);
{0, 6, 18, 24}+28n (n is equal to 0, 1, 2, . . . , 15, 20, . . . , or 35);
{0, 8, 14, 20}+28n (n is equal to 0, 1, 2, . . . , 15, 20, . . . , or 35);
{0, 8, 14, 22}+28n (n is equal to 0, 1, 2, . . . , 15, 20, . . . , or 35);
{0, 8, 14, 24}+28n (n is equal to 0, 1, 2, . . . , 15, 20, . . . , or 35);
{0, 8, 16, 22}+28n (n is equal to 0, 1, 2, . . . , 15, 20, . . . , or 35);
{0, 8, 16, 24}+28n (n is equal to 0, 1, 2, . . . , 15, 20, . . . , or 35);
{0, 8, 18, 24}+28n (n is equal to 0, 1, 2, . . . , 15, 20, . . . , or 35);
{0, 10, 14, 20}+28n (n is equal to 0, 1, 2, . . . , 15, 20, . . . , or 35);
{0, 10, 14, 22}+28n (n is equal to 0, 1, 2, . . . , 15, 20, . . . , or 35);
{0, 10, 14, 24}+28n (n is equal to 0, 1, 2, . . . , 15, 20, . . . , or 35);
{0, 10, 16, 22}+28n (n is equal to 0, 1, 2, . . . , 15, 20, . . . , or 35);
{0, 10, 16, 24}+28n (n is equal to 0, 1, 2, . . . , 15, 20, . . . , or 35);
{0, 10, 18, 24}+28n (n is equal to 0, 1, 2, . . . , 15, 20, . . . , or 35);
{2, 8, 14, 20}+28n (n is equal to 0, 1, 2, . . . , 15, 20, . . . , or 35);
{2, 8, 14, 22}+28n (n is equal to 0, 1, 2, . . . , 15, 20, . . . , or 35);
{2, 8, 14, 24}+28n (n is equal to 0, 1, 2, . . . , 15, 20, . . . , or 31);
{2, 8, 16, 22}+28n (n is equal to 0, 1, 2, . . . , 15, 20, . . . , or 35);
{2, 8, 16, 24}+28n (n is equal to 0, 1, 2, . . . , 15, 20, . . . , or 35);
{2, 8, 18, 24}+28n (n is equal to 0, 1, 2, . . . , 15, 20, . . . , or 35);
{2, 10, 14, 20}+28n (n is equal to 0, 1, 2, . . . , 15, 20, . . . , or 35);
{2, 10, 14, 22}+28n (n is equal to 0, 1, 2, . . . , 15, 20, . . . , or 35);
{2, 10, 14, 24}+28n (n is equal to 0, 1, 2, . . . , 15, 20, . . . , or 35);
{2, 10, 16, 22}+28n (n is equal to 0, 1, 2, . . . , 15, 20, . . . , or 35);
{2, 10, 16, 24}+28n (n is equal to 0, 1, 2, . . . , 15, 20, . . . , or 35);
{2, 10, 18, 24}+28n (n is equal to 0, 1, 2, . . . , 15, 20, . . . , or 35);
{4, 10, 14, 20}+28n (n is equal to 0, 1, 2, . . . , 15, 20, . . . , or 35);
{4, 10, 14, 22}+28n (n is equal to 0, 1, 2, . . . , 15, 20, . . . , or 35);
{4, 10, 14, 24}+28n (n is equal to 0, 1, 2, . . . , 15, 20, . . . , or 35);
{4, 10, 16, 22}+28n (n is equal to 0, 1, 2, . . . , 15, 20, . . . , or 35);
{4, 10, 16, 24}+28n (n is equal to 0, 1, 2, . . . , 15, 20, . . . , or 35); and
{4, 10, 18, 24}+28n (n is equal to 0, 1, 2, . . . , 15, 20, . . . , or 35).

Alternatively, an index of the first symbol of a candidate SSB (candidate SS/PBCH blocks) meets any one of the following conditions:

{a, b, c, d, e, f, g, h}+56n (n is equal to 0, 1, 2, . . . , 7, 10, . . . , or 17).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 7, 10, . . . , or 17).

For another example, an index of the first symbol of a candidate SSB may meet {2, 10, 16, 24, 30, 38, 44, 52}+56n (n is equal to 0, 1, 2, . . . , 7, 10, . . . , or 17).

For another example, an index of the first symbol of a candidate SSB may meet {0, 8, 14, 22, 28, 36, 42, 50}+56n (n is equal to 0, 1, 2, . . . , 7, 10, . . . , or 17).

There are 128 positions for candidate SSBs, and a length of a DRS window may be 2.25 ms. For example, a parameter "discoveryBurstWindowLength" or "discoveryBurstWindowLength-r16" or "discoveryBurstWindowLength-r17" may be used to indicate the length of the DRS window, for example, discoveryBurstWindowLength-r17 ENUMERATED {ms0dot5, ms1, ms2, ms2dot25, ms3, ms4, ms5}. For example, when a value of the parameter discoveryBurstWindowLength-r17 is ms2dot25, it may indicate that the length of the DRS window is 2.25 ms.

For example, when a subcarrier spacing of an SSB is 480 kHz, for a system operating on an unlicensed frequency band (or a system operating on a shared frequency band), a length of a DRS window is 3 ms, there are 160 positions for candidate SSBs, and an index of the first symbol of a candidate SSB (candidate SS/PBCH blocks) meets the following conditions:

{0, 6}+14n (n is equal to 0, 1, 2, . . . , 31, 40, . . . , 71, 80, . . . , or 95); {0, 8}+14n (n is equal to 0, 1, 2, . . . , 31, 40, . . . , 71, 80, . . . , or 95); {0, 10}+14n (n is equal to 0, 1, 2, . . . , 31, 40, . . . , 71, 80, . . . , or 95); {2, 8}+14n (n is equal to 0, 1, 2, . . . , 31, 40, . . . , 71, 80, . . . , or 95); {2, 10}+14n (n is equal to 0, 1, 2, . . . , 31, 40, . . . , 71, 80, . . . , or 95); and {4, 10}+14n (n is equal to 0, 1, 2, . . . , 31, 40, . . . , 71, 80, . . . , or 95).

Alternatively, an index of the first symbol of a candidate SSB may meet any one of the following conditions:

{0, 6, 14, 20}+28n (n is equal to 0, 1, 2, . . . , 15, 20, . . . , 35, 40, . . . , or 47);
{0, 6, 14, 22}+28n (n is equal to 0, 1, 2, . . . 15, 20, . . . , 35, 40, . . . , or 47);
{0, 6, 14, 24}+28n (n is equal to 0, 1, 2, . . . , 15, 20, . . . , 35, 40, . . . , or 47);
{0, 6, 16, 22}+28n (n is equal to 0, 1, 2, . . . , 15, 20, . . . , 35, 40, . . . , or 47);
{0, 6, 16, 24}+28n (n is equal to 0, 1, 2, . . . 15, 20, . . . , 35, 40, . . . , or 47);
{0, 6, 18, 24}+28n (n is equal to 0, 1, 2, . . . , 15, 20, . . . , 35, 40, . . . , or 47);
{0, 8, 14, 20}+28n (n is equal to 0, 1, 2, . . . , 15, 20, . . . , 35, 40, . . . , or 47);
{0, 8, 14, 22}+28n (n is equal to 0, 1, 2, . . . , 15, 20, . . . , 35, 40, . . . , or 47);
{0, 8, 14, 24}+28n (n is equal to 0, 1, 2, . . . , 15, 20, . . . , 35, 40, . . . , or 47);
{0, 8, 16, 22}+28n (n is equal to 0, 1, 2, . . . , 15, 20, . . . , 35, 40, . . . , or 47);

{0, 8, 16, 24}+28n (n is equal to 0, 1, 2, . . . , 15, 20, . . . , 35, 40, . . . , or 47);
{0, 8, 18, 24}+28n (n is equal to 0, 1, 2, . . . , 15, 20, . . . , 35, 40, . . . , or 47);
{0, 10, 14, 20}+28n (n is equal to 0, 1, 2, . . . 15, 20, . . . , 35, 40, . . . , or 47);
{0, 10, 14, 22}+28n (n is equal to 0, 1, 2, . . . 15, 20, . . . , 35, 40, . . . , or 47);
{0, 10, 14, 24}+28n (n is equal to 0, 1, 2, . . . 15, 20, . . . , 35, 40, . . . , or 47);
{0, 10, 16, 22}+28n (n is equal to 0, 1, 2, . . . 15, 20, . . . , 35, 40, . . . , or 47);
{0, 10, 16, 24}+28n (n is equal to 0, 1, 2, . . . 15, 20, . . . , 35, 40, . . . , or 47);
{0, 10, 18, 24}+28n (n is equal to 0, 1, 2, . . . , 15, 20, . . . , 35, 40, . . . , or 47);
{2, 8, 14, 20}+28n (n is equal to 0, 1, 2, . . . , 15, 20, . . . , 35, 40, . . . , or 47);
{2, 8, 14, 22}+28n (n is equal to 0, 1, 2, . . . , 15, 20, . . . , 35, 40, . . . , or 47);
{2, 8, 14, 24}+28n (n is equal to 0, 1, 2, . . . , 15, 20, . . . , 35, 40, . . . , or 47);
{2, 8, 16, 22}+28n (n is equal to 0, 1, 2, . . . , 15, 20, . . . , 35, 40, . . . , or 47);
{2, 8, 16, 24}+28n (n is equal to 0, 1, 2, . . . , 15, 20, . . . , 35, 40, . . . , or 47);
{2, 8, 18, 24}+28n (n is equal to 0, 1, 2, . . . , 15, 20, . . . , 35, 40, . . . , or 47);
{2, 10, 14, 20}+28n (n is equal to 0, 1, 2, . . . , 15, 20, . . . , 35, 40, . . . , or 47);
{2, 10, 14, 22}+28n (n is equal to 0, 1, 2, . . . , 15, 20, . . . , 35, 40, . . . , or 47);
{2, 10, 14, 24}+28n (n is equal to 0, 1, 2, . . . , 15, 20, . . . , 35, 40, . . . , or 47);
{2, 10, 16, 22}+28n (n is equal to 0, 1, 2, . . . , 15, 20, . . . , 35, 40, . . . , or 47);
{2, 10, 16, 24}+28n (n is equal to 0, 1, 2, . . . , 15, 20, . . . , 35, 40, . . . , or 47);
{2, 10, 18, 24}+28n (n is equal to 0, 1, 2, . . . , 15, 20, . . . , 35, 40, . . . , or 47);
{4, 10, 14, 20}+28n (n is equal to 0, 1, 2, . . . , 15, 20, . . . , 35, 40, . . . , or 47);
{4, 10, 14, 22}+28n (n is equal to 0, 1, 2, . . . , 15, 20, . . . , 35, 40, . . . , or 47);
{4, 10, 14, 24}+28n (n is equal to 0, 1, 2, . . . , 15, 20, . . . , 35, 40, . . . , or 47);
{4, 10, 16, 22}+28n (n is equal to 0, 1, 2, . . . , 15, 20, . . . , 35, 40, . . . , or 47);
{4, 10, 16, 24}+28n (n is equal to 0, 1, 2, . . . , 15, 20, . . . , 35, 40, . . . , or 47); and
{4, 10, 18, 24}+28n (n is equal to 0, 1, 2, . . . , 15, 20, . . . , 35, 40, . . . , or 47).

Alternatively, an index of the first symbol of a candidate SSB (candidate SS/PBCH blocks) meets any one of the following conditions:

{a, b, c, d, f, g, h}+56n (n is equal to 0, 1, 2, . . . , 7, 10, . . . , 17, 20, . . . , or 23).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 7, 10, . . . , 17, 20, . . . , or 23).

For another example, an index of the first symbol of a candidate SSB may meet {2, 10, 16, 24, 30, 38, 44, 52}+56n (n is equal to 0, 1, 2, . . . , 7, 10, . . . , 17, 20, . . . , or 23).

For another example, an index of the first symbol of a candidate SSB may meet {0, 8, 14, 22, 28, 36, 42, 50}+56n (n is equal to 0, 1, 2, . . . , 7, 10, . . . , 17, 20, . . . , or 23).

For example, when a subcarrier spacing of an SSB is 480 kHz, for a system operating on an unlicensed frequency band (or a system operating on a shared frequency band), a length of a DRS window is 3.5 ms, there are 192 positions for candidate SSBs, and an index of the first symbol of a candidate SSB (candidate SS/PBCH blocks) meets the following conditions:

{0, 6}+14n (n is equal to 0, 1, 2, . . . , 31, 40, . . . , 71, 80, . . . , or 111); {0, 8}+14n (n is equal to 0, 1, 2, . . . , 31, 40, . . . , 71, 80, . . . , or 111); {0, 10}+14n (n is equal to 0, 1, 2, . . . , 31, 40, . . . , 71, 80, . . . , or 111); {2, 8}+14n (n is equal to 0, 1, 2, . . . , 31, 40, . . . , 71, 80, . . . , or 111); {2, 10}+14n (n is equal to 0, 1, 2, . . . , 31, 40, . . . , 71, 80, . . . , or 111); and {4, 10}+14n (n is equal to 0, 1, 2, . . . , 31, 40, . . . , 71, 80, . . . , or 111).

Alternatively, an index of the first symbol of a candidate SSB may meet any one of the following conditions:

{0, 6, 14, 20}+28n (n is equal to 0, 1, 2, . . . , 15, 20, . . . , 35, 40, . . . , or 55);
{0, 6, 14, 22}+28n (n is equal to 0, 1, 2, . . . , 15, 20, . . . , 35, 40, . . . , or 55);
{0, 6, 14, 24}+28n (n is equal to 0, 1, 2, . . . , 15, 20, . . . , 35, 40, . . . , or 55);
{0, 6, 16, 22}+28n (n is equal to 0, 1, 2, . . . , 15, 20, . . . , 35, 40, . . . , or 55);
{0, 6, 16, 24}+28n (n is equal to 0, 1, 2, . . . , 15, 20, . . . , 35, 40, . . . , or 55);
{0, 6, 18, 24}+28n (n is equal to 0, 1, 2, . . . , 15, 20, . . . , 35, 40, . . . , or 55);
{0, 8, 14, 20}+28n (n is equal to 0, 1, 2, . . . , 15, 20, . . . , 35, 40, . . . , or 55);
{0, 8, 14, 22}+28n (n is equal to 0, 1, 2, . . . , 15, 20, . . . , 35, 40, . . . , or 55);
{0, 8, 14, 24}+28n (n is equal to 0, 1, 2, . . . , 15, 20, . . . , 35, 40, . . . , or 55);
{0, 8, 16, 22}+28n (n is equal to 0, 1, 2, . . . , 15, 20, . . . , 35, 40, . . . , or 55);
{0, 8, 16, 24}+28n (n is equal to 0, 1, 2, . . . , 15, 20, . . . , 35, 40, . . . , or 55);
{0, 8, 18, 24}+28n (n is equal to 0, 1, 2, . . . , 15, 20, . . . , 35, 40, . . . , or 55);
{0, 10, 14, 20}+28n (n is equal to 0, 1, 2, . . . , 15, 20, . . . , 35, 40, . . . , or 55);
{0, 10, 14, 22}+28n (n is equal to 0, 1, 2, . . . , 15, 20, . . . , 35, 40, . . . , or 55);
{0, 10, 14, 24}+28n (n is equal to 0, 1, 2, . . . , 15, 20, . . . , 35, 40, . . . , or 55);
{0, 10, 16, 22}+28n (n is equal to 0, 1, 2, . . . , 15, 20, . . . , 35, 40, . . . , or 55);
{0, 10, 16, 24}+28n (n is equal to 0, 1, 2, . . . , 15, 20, . . . , 35, 40, . . . , or 55);
{0, 10, 18, 24}+28n (n is equal to 0, 1, 2, . . . , 15, 20, . . . , 35, 40, . . . , or 55);
{2, 8, 14, 20}+28n (n is equal to 0, 1, 2, . . . , 15, 20, . . . , 35, 40, . . . , or 55);
{2, 8, 14, 22}+28n (n is equal to 0, 1, 2, . . . , 15, 20, . . . , 35, 40, . . . , or 55);
{2, 8, 14, 24}+28n (n is equal to 0, 1, 2, . . . , 15, 20, . . . , 35, 40, . . . , or 55);
{2, 8, 16, 22}+28n (n is equal to 0, 1, 2, . . . , 15, 20, . . . , 35, 40, . . . , or 55);
{2, 8, 16, 24}+28n (n is equal to 0, 1, 2, . . . , 15, 20, . . . , 35, 40, . . . , or 55);

{2, 8, 18, 24}+28n (n is equal to 0, 1, 2, . . . , 15, 20, . . . , 35, 40, . . . , or 55);

{2, 10, 14, 20}+28n (n is equal to 0, 1, 2, . . . , 15, 20, . . . , 35, 40, . . . , or 55);

{2, 10, 14, 22}+28n (n is equal to 0, 1, 2, . . . , 15, 20, . . . , 35, 40, . . . , or 55);

{2, 10, 14, 24}+28n (n is equal to 0, 1, 2, . . . , 15, 20, . . . , 35, 40, . . . , or 55);

{2, 10, 16, 22}+28n (n is equal to 0, 1, 2, . . . , 15, 20, . . . , 35, 40, . . . , or 55);

{2, 10, 16, 24}+28n (n is equal to 0, 1, 2, . . . , 15, 20, . . . , 35, 40, . . . , or 55);

{2, 10, 18, 24}+28n (n is equal to 0, 1, 2, . . . , 15, 20, . . . , 35, 40, . . . , or 55);

{4, 10, 14, 20}+28n (n is equal to 0, 1, 2, . . . , 15, 20, . . . , 35, 40, . . . , or 55);

{4, 10, 14, 22}+28n (n is equal to 0, 1, 2, . . . , 15, 20, . . . , 35, 40, . . . , or 55);

{4, 10, 14, 24}+28n (n is equal to 0, 1, 2, . . . , 15, 20, . . . , 35, 40, . . . , or 55);

{4, 10, 16, 22}+28n (n is equal to 0, 1, 2, . . . , 15, 20, . . . , 35, 40, . . . , or 55);

{4, 10, 16, 24}+28n (n is equal to 0, 1, 2, . . . , 15, 20, . . . , 35, 40, . . . , or 55); and {4, 10, 18, 24}+28n (n is equal to 0, 1, 2, . . . , 15, 20, . . . , 35, 40, . . . , or 55).

Alternatively, an index of the first symbol of a candidate SSB (candidate SS/PBCH blocks) meets any one of the following conditions:

{a, b, c, d, e, f, g, h}+56n (n is equal to 0, 1, 2, . . . , 7, 10, . . . , 17, 20, . . . , or 27).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 7, 10, . . . , 17, 20, . . . , or 27).

For another example, an index of the first symbol of a candidate SSB may meet {2, 10, 16, 24, 30, 38, 44, 52}+56n (n is equal to 0, 1, 2, . . . , 7, 10, . . . , 17, 20, . . . , or 27).

For another example, an index of the first symbol of a candidate SSB may meet {0, 8, 14, 22, 28, 36, 42, 50}+56n (n is equal to 0, 1, 2, . . . , 7, 10, . . . , 17, 20, . . . , or 27).

There are 192 positions for candidate SSBs, and a length of a DRS window is 3.5 ms. For example, a parameter "discoveryBurstWindowLength" or "discoveryBurstWindowLength-r16" or "discoveryBurstWindowLength-r17" may be used to indicate the length of the DRS window, for example, discoveryBurstWindowLength-r17 ENUMERATED {ms0dot5, ms1, ms2, ms3, ms3dot5, ms4, ms5}. For example, when a value of the parameter discoveryBurstWindowLength-r17 is ms3dot5, it may indicate that the length of the DRS window is 3.5 ms.

For example, when a subcarrier spacing of an SSB is 480 kHz, for a system operating on an unlicensed frequency band (or a system operating on a shared frequency band), a length of a DRS window is 4 ms, there are 208 positions for candidate SSBs, and an index of the first symbol of a candidate SSB (candidate SS/PBCH blocks) meets any one of the following conditions:

{0, 6}+14n (n is equal to 0, 1, 2, . . . , 31, 40, . . . , 71, 80, . . . , 111, 120, . . . , or 127);

{0, 8}+14n (n is equal to 0, 1, 2, . . . , 31, 40, . . . , 71, 80, . . . , 111, 120, . . . , or 127);

{0, 10}+14n (n is equal to 0, 1, 2, . . . , 31, 40, . . . , 71, 80, . . . , 111, 120, . . . , or 127);

{2, 8}+14n (n is equal to 0, 1, 2, . . . , 31, 40, . . . , 71, 80, . . . , 111, 120, . . . , or 127);

{2, 10}+14n (n is equal to 0, 1, 2, . . . , 31, 40, . . . , 71, 80, . . . , 111, 120, . . . , or 127);

{4, 10}+14n (n is equal to 0, 1, 2, . . . , 31, 40, . . . , 71, 80, . . . , 111, 120, . . . , or 127);

{0, 6, 14, 20}+28n (n is equal to 0, 1, 2, . . . , 15, 20, . . . , 35, 40, . . . , 55, 60, . . . , or 63);

{0, 6, 14, 22}+28n (n is equal to 0, 1, 2, . . . , 15, 20, . . . , 35, 40, . . . , 55, 60, . . . , or 63);

{0, 6, 14, 24}+28n (n is equal to 0, 1, 2, . . . , 15, 20, . . . , 35, 40, . . . , 55, 60, . . . , or 63);

{0, 6, 16, 22}+28n (n is equal to 0, 1, 2, . . . , 15, 20, . . . , 35, 40, . . . , 55, 60, . . . , or 63);

{0, 6, 16, 24}+28n (n is equal to 0, 1, 2, . . . , 15, 20, . . . , 35, 40, . . . , 55, 60, . . . , or 63);

{0, 6, 18, 24}+28n (n is equal to 0, 1, 2, . . . , 15, 20, . . . , 35, 40, . . . , 55, 60, . . . , or 63);

{0, 8, 14, 20}+28n (n is equal to 0, 1, 2, . . . , 15, 20, . . . , 35, 40, . . . , 55, 60, . . . , or 63);

{0, 8, 14, 22}+28n (n is equal to 0, 1, 2, . . . , 15, 20, . . . , 35, 40, . . . , 55, 60, . . . , or 63);

{0, 8, 14, 24}+28n (n is equal to 0, 1, 2, . . . , 15, 20, . . . , 35, 40, . . . , 55, 60, . . . , or 63);

{0, 8, 16, 22}+28n (n is equal to 0, 1, 2, . . . , 15, 20, . . . , 35, 40, . . . , 55, 60, . . . , or 63);

{0, 8, 16, 24}+28n (n is equal to 0, 1, 2, . . . , 15, 20, . . . , 35, 40, . . . , 55, 60, . . . , or 63);

{0, 8, 18, 24}+28n (n is equal to 0, 1, 2, . . . , 15, 20, . . . , 35, 40, . . . , 55, 60, . . . , or 63);

{0, 10, 14, 20}+28n (n is equal to 0, 1, 2, . . . , 15, 20, . . . , 35, 40, . . . , 55, 60, . . . , or 63);

{0, 10, 14, 22}+28n (n is equal to 0, 1, 2, . . . , 15, 20, . . . , 35, 40, . . . , 55, 60, . . . , or 63);

{0, 10, 14, 24}+28n (n is equal to 0, 1, 2, . . . , 15, 20, . . . , 35, 40, . . . , 55, 60, . . . , or 63);

{0, 10, 16, 22}+28n (n is equal to 0, 1, 2, . . . , 15, 20, . . . , 35, 40, . . . , 55, 60, . . . , or 63);

{0, 10, 16, 24}+28n (n is equal to 0, 1, 2, . . . , 15, 20, . . . , 35, 40, . . . , 55, 60, . . . , or 63);

{0, 10, 18, 24}+28n (n is equal to 0, 1, 2, . . . , 15, 20, . . . , 35, 40, . . . , 55, 60, . . . , or 63);

{2, 8, 14, 20}+28n (n is equal to 0, 1, 2, . . . , 15, 20, . . . , 35, 40, . . . , 55, 60, . . . , or 63);

{2, 8, 14, 22}+28n (n is equal to 0, 1, 2, . . . , 15, 20, . . . , 35, 40, . . . , 55, 60, . . . , or 63);

{2, 8, 14, 24}+28n (n is equal to 0, 1, 2, . . . , 15, 20, . . . , 35, 40, . . . , 55, 60, . . . , or 63);

{2, 8, 16, 22}+28n (n is equal to 0, 1, 2, . . . , 15, 20, . . . , 35, 40, . . . , 55, 60, . . . , or 63);

{2, 8, 16, 24}+28n (n is equal to 0, 1, 2, . . . , 15, 20, . . . , 35, 40, . . . , 55, 60, . . . , or 63);

{2, 8, 18, 24}+28n (n is equal to 0, 1, 2, . . . , 15, 20, . . . , 35, 40, . . . , 55, 60, . . . , or 63);

{2, 10, 14, 20}+28n (n is equal to 0, 1, 2, . . . , 15, 20, . . . , 35, 40, . . . , 55, 60, . . . , or 63);

{2, 10, 14, 22}+28n (n is equal to 0, 1, 2, . . . , 15, 20, . . . , 35, 40, . . . , 55, 60, . . . , or 63);

{2, 10, 14, 24}+28n (n is equal to 0, 1, 2, . . . , 15, 20, . . . , 35, 40, . . . , 55, 60, . . . , or 63);

{2, 10, 16, 22}+28n (n is equal to 0, 1, 2, . . . , 15, 20, . . . , 35, 40, . . . , 55, 60, . . . , or 63);

{2, 10, 16, 24}+28n (n is equal to 0, 1, 2, . . . , 15, 20, . . . , 35, 40, . . . , 55, 60, . . . , or 63);

{2, 10, 18, 24}+28n (n is equal to 0, 1, 2, . . . , 15, 20, . . . , 35, 40, . . . , 55, 60, . . . , or 63);

{4, 10, 14, 20}+28n (n is equal to 0, 1, 2, . . . , 15, 20, . . . , 35, 40, . . . , 55, 60, . . . , or 63);

{4, 10, 14, 22}+28n (n is equal to 0, 1, 2, . . . , 15, 20, . . . , 35, 40, . . . , 55, 60, . . . , or 63);

{4, 10, 14, 24}+28n (n is equal to 0, 1, 2, . . . , 15, 20, . . . , 35, 40, . . . , 55, 60, . . . , or 63);

{4, 10, 16, 22}+28n (n is equal to 0, 1, 2, . . . , 15, 20, . . . , 35, 40, . . . , 55, 60, . . . , or 63);

{4, 10, 16, 24}+28n (n is equal to 0, 1, 2, . . . , 15, 20, . . . , 35, 40, . . . , 55, 60, . . . , or 63); and {4, 10, 18, 24}+28n (n is equal to 0, 1, 2, . . . , 15, 20, . . . , 35, 40, . . . , 55, 60, . . . , or 63).

Alternatively, an index of the first symbol of a candidate SSB (candidate SS/PBCH blocks) meets any one of the following conditions:

{a, b, c, d, e, f, g, h}+56n (n is equal to 0, 1, 2, . . . , 7, 10, . . . , 17, 20, . . . , 27, 30, or 31).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 7, 10, . . . , 17, 20, . . . , 27, 30, or 31).

For another example, an index of the first symbol of a candidate SSB may meet {2, 10, 16, 24, 30, 38, 44, 52}+56n (n is equal to 0, 1, 2, . . . , 7, 10, . . . , 17, 20, . . . , 27, 30, or 31).

For another example, an index of the first symbol of a candidate SSB may meet {0, 8, 14, 22, 28, 36, 42, 50}+56n (n is equal to 0, 1, 2, . . . , 7, 10, . . . , 17, 20, . . . , 27, 30, or 31).

For example, when a subcarrier spacing of an SSB is 480 kHz, for a system operating on an unlicensed frequency band (or a system operating on a shared frequency band), a length of a DRS window is 5 ms, there are 256 positions for candidate SSBs, and an index of the first symbol of a candidate SSB (candidate SS/PBCH blocks) meets any one of the following conditions:

{0, 6}+14n (n is equal to 0, 1, 2, . . . , 31, 40, . . . , 71, 80, . . . , 111, 120, . . . , or 151);

{0, 8}+14n (n is equal to 0, 1, 2, . . . , 31, 40, . . . , 71, 80, . . . , 111, 120, . . . , or 151);

{0, 10}+14n (n is equal to 0, 1, 2, . . . , 31, 40, . . . , 71, 80, . . . , 111, 120, . . . , or 151);

{2, 8}+14n (n is equal to 0, 1, 2, . . . , 31, 40, . . . , 71, 80, . . . , 111, 120, . . . , or 151);

{2, 10}+14n (n is equal to 0, 1, 2, . . . , 31, 40, . . . , 71, 80, . . . , 111, 120, . . . , or 151);

{4, 10}+14n (n is equal to 0, 1, 2, . . . , 31, 40, . . . , 71, 80, . . . , 111, 120, . . . , or 151);

{0, 6, 14, 20}+28n (n is equal to 0, 1, 2, . . . , 15, 20, . . . , 35, 40, . . . , 55, 60, . . . , or 75);

{0, 6, 14, 22}+28n (n is equal to 0, 1, 2, . . . , 15, 20, . . . , 35, 40, . . . , 55, 60, . . . , or 75);

{0, 6, 14, 24}+28n (n is equal to 0, 1, 2, . . . , 15, 20, . . . , 35, 40, . . . , 55, 60, . . . , or 75);

{0, 6, 16, 22}+28n (n is equal to 0, 1, 2, . . . , 15, 20, . . . , 35, 40, . . . , 55, 60, . . . , or 75);

{0, 6, 16, 24}+28n (n is equal to 0, 1, 2, . . . , 15, 20, . . . , 35, 40, . . . , 55, 60, . . . , or 75);

{0, 6, 18, 24}+28n (n is equal to 0, 1, 2, . . . , 15, 20, . . . , 35, 40, . . . , 55, 60, . . . , or 75);

{0, 8, 14, 20}+28n (n is equal to 0, 1, 2, . . . , 15, 20, . . . , 35, 40, . . . , 55, 60, . . . , or 75);

{0, 8, 14, 22}+28n (n is equal to 0, 1, 2, . . . , 15, 20, . . . , 35, 40, . . . , 55, 60, . . . , or 75);

{0, 8, 14, 24}+28n (n is equal to 0, 1, 2, . . . , 15, 20, . . . , 35, 40, . . . , 55, 60, . . . , or 75);

{0, 8, 16, 22}+28n (n is equal to 0, 1, 2, . . . , 15, 20, . . . , 35, 40, . . . , 55, 60, . . . , or 75);

{0, 8, 16, 24}+28n (n is equal to 0, 1, 2, . . . , 15, 20, . . . , 35, 40, . . . , 55, 60, . . . , or 75);

{0, 8, 18, 24}+28n (n is equal to 0, 1, 2, . . . , 15, 20, . . . , 35, 40, . . . , 55, 60, . . . , or 75);

{0, 10, 14, 20}+28n (n is equal to 0, 1, 2, . . . , 15, 20, . . . , 35, 40, . . . , 55, 60, . . . , or 75);

{0, 10, 14, 22}+28n (n is equal to 0, 1, 2, . . . , 15, 20, . . . , 35, 40, . . . , 55, 60, . . . , or 75);

{0, 10, 14, 24}+28n (n is equal to 0, 1, 2, . . . , 15, 20, . . . , 35, 40, . . . , 55, 60, . . . , or 75);

{0, 10, 16, 22}+28n (n is equal to 0, 1, 2, . . . , 15, 20, . . . , 35, 40, . . . , 55, 60, . . . , or 75);

{0, 10, 16, 24}+28n (n is equal to 0, 1, 2, . . . , 15, 20, . . . , 35, 40, . . . , 55, 60, . . . , or 75);

{0, 10, 18, 24}+28n (n is equal to 0, 1, 2, . . . , 15, 20, . . . , 35, 40, . . . , 55, 60, . . . , or 75);

{2, 8, 14, 20}+28n (n is equal to 0, 1, 2, . . . , 15, 20, . . . , 35, 40, . . . , 55, 60, . . . , or 75);

{2, 8, 14, 22}+28n (n is equal to 0, 1, 2, . . . , 15, 20, . . . , 35, 40, . . . , 55, 60, . . . , or 75);

{2, 8, 14, 24}+28n (n is equal to 0, 1, 2, . . . , 15, 20, . . . , 35, 40, . . . , 55, 60, . . . , or 75);

{2, 8, 16, 22}+28n (n is equal to 0, 1, 2, . . . , 15, 20, . . . , 35, 40, . . . , 55, 60, . . . , or 75);

{2, 8, 16, 24}+28n (n is equal to 0, 1, 2, . . . , 15, 20, . . . , 35, 40, . . . , 55, 60, . . . , or 75);

{2, 8, 18, 24}+28n (n is equal to 0, 1, 2, . . . , 15, 20, . . . , 35, 40, . . . , 55, 60, . . . , or 75);

{2, 10, 14, 20}+28n (n is equal to 0, 1, 2, . . . , 15, 20, . . . , 35, 40, . . . , 55, 60, . . . , or 75);

{2, 10, 14, 22}+28n (n is equal to 0, 1, 2, . . . , 15, 20, . . . , 35, 40, . . . , 55, 60, . . . , or 75);

{2, 10, 14, 24}+28n (n is equal to 0, 1, 2, . . . , 15, 20, . . . , 35, 40, . . . , 55, 60, . . . , or 75);

{2, 10, 16, 22}+28n (n is equal to 0, 1, 2, . . . , 15, 20, . . . , 35, 40, . . . , 55, 60, . . . , or 75);

{2, 10, 16, 24}+28n (n is equal to 0, 1, 2, . . . , 15, 20, . . . , 35, 40, . . . , 55, 60, . . . , or 75);

{2, 10, 18, 24}+28n (n is equal to 0, 1, 2, . . . , 15, 20, . . . , 35, 40, . . . , 55, 60, . . . , or 75);

{4, 10, 14, 20}+28n (n is equal to 0, 1, 2, . . . , 15, 20, . . . , 35, 40, . . . , 55, 60, . . . , or 75);

{4, 10, 14, 22}+28n (n is equal to 0, 1, 2, . . . , 15, 20, . . . , 35, 40, . . . , 55, 60, . . . , or 75);

{4, 10, 14, 24}+28n (n is equal to 0, 1, 2, . . . , 15, 20, . . . , 35, 40, . . . , 55, 60, . . . , or 75);

{4, 10, 16, 22}+28n (n is equal to 0, 1, 2, . . . , 15, 20, . . . , 35, 40, . . . , 55, 60, . . . , or 75);

{4, 10, 16, 24}+28n (n is equal to 0, 1, 2, . . . , 15, 20, . . . , 35, 40, . . . , 55, 60, . . . , or 75); and {4, 10, 18, 24}+28n (n is equal to 0, 1, 2, . . . , 15, 20, . . . , 35, 40, . . . , 55, 60, . . . , or 75).

Alternatively, an index of the first symbol of a candidate SSB (candidate SS/PBCH blocks) meets any one of the following conditions:

{a, b, c, d, e, f, g, h}+56n (n is equal to 0, 1, 2, . . . , 7, 10, . . . , 17, 20, . . . , 27, 30, . . . , 37).

A value of a is 0, 2, or 4; a value of b is 6, 8, or 10; a value of c is 14, 16, or 18; a value of d is 20, 22, or 24; a value of e is 28, 30, or 32; a value off is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 7, 10, . . . , 17, 20, . . . , 27, 30, . . . , 37).

For another example, an index of the first symbol of a candidate SSB may meet {2, 10, 16, 24, 30, 38, 44, 52}+56n (n is equal to 0, 1, 2, . . . , 7, 10, . . . , 17, 20, . . . , 27, 30, . . . , 37).

For another example, an index of the first symbol of a candidate SSB may meet {0, 8, 14, 22, 28, 36, 42, 50}+56n (n is equal to 0, 1, 2, . . . , 7, 10, . . . , 17, 20, . . . , 27, 30, . . . , 37).

For example, when a subcarrier spacing of an SSB is 960 kHz, for a system operating on an unlicensed frequency band (or a system operating on a shared frequency band), a length of a DRS window is 1 ms, there are 128 positions for candidate SSBs, and an index of the first symbol of a candidate SSB (candidate SS/PBCH blocks) meets any one of the following conditions:

{0, 6}+14n (n is equal to 0, 1, 2, . . . , or 63);
{0, 8}+14n (n is equal to 0, 1, 2, . . . , or 63);
{0, 10}+14n (n is equal to 0, 1, 2, . . . , or 63);
{2, 8}+14n (n is equal to 0, 1, 2, . . . , or 63);
{2, 10}+14n (n is equal to 0, 1, 2, . . . , or 63);
{4, 10}+14n (n is equal to 0, 1, 2, . . . , or 63);
{0, 6, 14, 20}+28n (n is equal to 0, 1, 2, . . . , or 31);
{0, 6, 14, 22}+28n (n is equal to 0, 1, 2, . . . , or 31);
{0, 6, 14, 24}+28n (n is equal to 0, 1, 2, . . . , or 31);
{0, 6, 16, 22}+28n (n is equal to 0, 1, 2, . . . , or 31);
{0, 6, 16, 24}+28n (n is equal to 0, 1, 2, . . . , or 31);
{0, 6, 18, 24}+28n (n is equal to 0, 1, 2, . . . , or 31);
{0, 8, 14, 20}+28n (n is equal to 0, 1, 2, . . . , or 31);
{0, 8, 14, 22}+28n (n is equal to 0, 1, 2, . . . , or 31);
{0, 8, 14, 24}+28n (n is equal to 0, 1, 2, . . . , or 31);
{0, 8, 16, 22}+28n (n is equal to 0, 1, 2, . . . , or 31);
{0, 8, 16, 24}+28n (n is equal to 0, 1, 2, . . . , or 31);
{0, 8, 18, 24}+28n (n is equal to 0, 1, 2, . . . , or 31);
{0, 10, 14, 20}+28n (n is equal to 0, 1, 2, . . . , or 31);
{0, 10, 14, 22}+28n (n is equal to 0, 1, 2, . . . , or 31);
{0, 10, 14, 24}+28n (n is equal to 0, 1, 2, . . . , or 31);
{0, 10, 16, 22}+28n (n is equal to 0, 1, 2, . . . , or 31);
{0, 10, 16, 24}+28n (n is equal to 0, 1, 2, . . . , or 31);
{0, 10, 18, 24}+28n (n is equal to 0, 1, 2, . . . , or 31);
{2, 8, 14, 20}+28n (n is equal to 0, 1, 2, . . . , or 31);
{2, 8, 14, 22}+28n (n is equal to 0, 1, 2, . . . , or 31);
{2, 8, 14, 24}+28n (n is equal to 0, 1, 2, . . . , or 31);
{2, 8, 16, 22}+28n (n is equal to 0, 1, 2, . . . , or 31);
{2, 8, 16, 24}+28n (n is equal to 0, 1, 2, . . . , or 31);
{2, 8, 18, 24}+28n (n is equal to 0, 1, 2, . . . , or 31);
{2, 10, 14, 20}+28n (n is equal to 0, 1, 2, . . . , or 31);
{2, 10, 14, 22}+28n (n is equal to 0, 1, 2, . . . , or 31);
{2, 10, 14, 24}+28n (n is equal to 0, 1, 2, . . . , or 31);
{2, 10, 16, 22}+28n (n is equal to 0, 1, 2, . . . , or 31);
{2, 10, 16, 24}+28n (n is equal to 0, 1, 2, . . . , or 31);
{2, 10, 18, 24}+28n (n is equal to 0, 1, 2, . . . , or 31);
{4, 10, 14, 20}+28n (n is equal to 0, 1, 2, . . . , or 31);
{4, 10, 14, 22}+28n (n is equal to 0, 1, 2, . . . , or 31);
{4, 10, 14, 24}+28n (n is equal to 0, 1, 2, . . . , or 31);
{4, 10, 16, 22}+28n (n is equal to 0, 1, 2, . . . , or 31);
{4, 10, 16, 24}+28n (n is equal to 0, 1, 2, . . . , or 31); and
{4, 10, 18, 24}+28n (n is equal to 0, 1, 2, . . . , or 31).

Alternatively, an index of the first symbol of a candidate SSB (candidate SS/PBCH blocks) meets any one of the following conditions:

{a, b, c, d, e, f, g, h}+56n, (n is equal to 0, 1, 2, . . . , or 15).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , or 15).

For another example, an index of the first symbol of a candidate SSB may meet {2, 10, 16, 24, 30, 38, 44, 52}+56n (n is equal to 0, 1, 2, . . . , or 15).

For another example, an index of the first symbol of a candidate SSB may meet {0, 8, 14, 22, 28, 36, 42, 50}+56n (n is equal to 0, 1, 2, . . . , or 15).

For example, when a subcarrier spacing of an SSB is 960 kHz, for a system operating on an unlicensed frequency band (or a system operating on a shared frequency band), a length of a DRS window is 2 ms, there are 224 positions for candidate SSBs, and an index of the first symbol of a candidate SSB (candidate SS/PBCH blocks) meets any one of the following conditions:

{0, 6}+14n (n is equal to 0, 1, 2, . . . , 63, 80, . . . , or 127);
{0, 8}+14n (n is equal to 0, 1, 2, . . . , 63, 80, . . . , or 127);
{0, 10}+14n (n is equal to 0, 1, 2, . . . , 63, 80, . . . , or 127);
{2, 8}+14n (n is equal to 0, 1, 2, . . . , 63, 80, . . . , or 127);
{2, 10}+14n (n is equal to 0, 1, 2, . . . , 63, 80, . . . , or 127); and
{4, 10}+14n (n is equal to 0, 1, 2, . . . , 63, 80, . . . , or 127).

Alternatively, an index of the first symbol of a candidate SSB may meet any one of the following conditions:

{0, 6, 14, 20}+28n (n is equal to 0, 1, 2, . . . , 31, 40, . . . , or 63);
{0, 6, 14, 22}+28n (n is equal to 0, 1, 2, . . . , 31, 40, . . . , or 63);
{0, 6, 14, 24}+28n (n is equal to 0, 1, 2, . . . , 31, 40, . . . , or 63);
{0, 6, 16, 22}+28n (n is equal to 0, 1, 2, . . . , 31, 40, . . . , or 63);
{0, 6, 16, 24}+28n (n is equal to 0, 1, 2, . . . , 31, 40, . . . , or 63);
{0, 6, 18, 24}+28n (n is equal to 0, 1, 2, . . . , 31, 40, . . . , or 63);
{0, 8, 14, 20}+28n (n is equal to 0, 1, 2, . . . , 31, 40, . . . , or 63);
{0, 8, 14, 22}+28n (n is equal to 0, 1, 2, . . . , 31, 40, . . . , or 63);
{0, 8, 14, 24}+28n (n is equal to 0, 1, 2, . . . , 31, 40, . . . , or 63);
{0, 8, 16, 22}+28n (n is equal to 0, 1, 2, . . . , 31, 40, . . . , or 63);
{0, 8, 16, 24}+28n (n is equal to 0, 1, 2, . . . , 31, 40, . . . , or 63);
{0, 8, 18, 24}+28n (n is equal to 0, 1, 2, . . . , 31, 40, . . . , or 63);
{0, 10, 14, 20}+28n (n is equal to 0, 1, 2, . . . , 31, 40, . . . , or 63);
{0, 10, 14, 22}+28n (n is equal to 0, 1, 2, . . . , 31, 40, . . . , or 63);
{0, 10, 14, 24}+28n (n is equal to 0, 1, 2, . . . , 31, 40, . . . , or 63);
{0, 10, 16, 22}+28n (n is equal to 0, 1, 2, . . . , 31, 40, . . . , or 63);
{0, 10, 16, 24}+28n (n is equal to 0, 1, 2, . . . , 31, 40, . . . , or 63);
{0, 10, 18, 24}+28n (n is equal to 0, 1, 2, . . . , 31, 40, . . . , or 63);
{2, 8, 14, 20}+28n (n is equal to 0, 1, 2, . . . , 31, 40, . . . , or 63);

{2, 8, 14, 22}+28n (n is equal to 0, 1, 2, . . . , 31, 40, . . . , or 63);

{2, 8, 14, 24}+28n (n is equal to 0, 1, 2, . . . , 31, 40, . . . , or 63);

{2, 8, 16, 22}+28n (n is equal to 0, 1, 2, . . . , 31, 40, . . . , or 63);

{2, 8, 16, 24}+28n (n is equal to 0, 1, 2, . . . , 31, 40, . . . , or 63);

{2, 8, 18, 24}+28n (n is equal to 0, 1, 2, . . . , 31, 40, . . . , or 63);

{2, 10, 14, 20}+28n (n is equal to 0, 1, 2, . . . , 31, 40, . . . , or 63);

{2, 10, 14, 22}+28n (n is equal to 0, 1, 2, . . . , 31, 40, . . . , or 63);

{2, 10, 14, 24}+28n (n is equal to 0, 1, 2, . . . , 31, 40, . . . , or 63);

{2, 10, 16, 22}+28n (n is equal to 0, 1, 2, . . . , 31, 40, . . . , or 63);

{2, 10, 16, 24}+28n (n is equal to 0, 1, 2, . . . , 31, 40, . . . , or 63);

{2, 10, 18, 24}+28n (n is equal to 0, 1, 2, . . . , 31, 40, . . . , or 63);

{4, 10, 14, 20}+28n (n is equal to 0, 1, 2, . . . , 31, 40, . . . , or 63);

{4, 10, 14, 22}+28n (n is equal to 0, 1, 2, . . . , 31, 40, . . . , or 63);

{4, 10, 14, 24}+28n (n is equal to 0, 1, 2, . . . , 31, 40, . . . , or 63);

{4, 10, 16, 22}+28n (n is equal to 0, 1, 2, . . . , 31, 40, . . . , or 63);

{4, 10, 16, 24}+28n (n is equal to 0, 1, 2, . . . , 31, 40, . . . , or 63); and

{4, 10, 18, 24}+28n (n is equal to 0, 1, 2, . . . , 31, 40, . . . , or 63).

Alternatively, an index of the first symbol of a candidate SSB (candidate SS/PBCH blocks) meets any one of the following conditions:

{a, b, c, d, e, f, g, h}+56n (n is equal to 0, 1, 2, . . . , 15, 20, . . . , or 31).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 15, 20, . . . , or 31).

For another example, an index of the first symbol of a candidate SSB may meet: {2, 10, 16, 24, 30, 38, 44, 52}+56n (n is equal to 0, 1, 2, . . . , 15, 20, . . . , or 31).

For another example, an index of the first symbol of a candidate SSB may meet: {0, 8, 14, 22, 28, 36, 42, 50}+56n (n is equal to 0, 1, 2, . . . , 15, 20, . . . , or 31).

For example, when a subcarrier spacing of an SSB is 960 kHz, for a system operating on an unlicensed frequency band (or a system operating on a shared frequency band), a length of a DRS window is 2.25 ms, there are 256 positions for candidate SSBs, and an index of the first symbol of a candidate SSB (candidate SS/PBCH blocks) meets any one of the following conditions:

{0, 6}+14n (n is equal to 0, 1, 2, . . . , 63, 80, . . . , or 143);

{0, 8}+14n (n is equal to 0, 1, 2, . . . , 63, 80, . . . , or 143);

{0, 10}+14n (n is equal to 0, 1, 2, . . . , 63, 80, . . . , or 143);

{2, 8}+14n (n is equal to 0, 1, 2, . . . , 63, 80, . . . , or 143);

{2, 10}+14n (n is equal to 0, 1, 2, . . . , 63, 80, . . . , or 143);

{4, 10}+14n (n is equal to 0, 1, 2, . . . , 63, 80, . . . , or 143);

{0, 6, 14, 20}+28n (n is equal to 0, 1, 2, . . . , 31, 40, . . . , or 71);

{0, 6, 14, 22}+28n (n is equal to 0, 1, 2, . . . , 31, 40, . . . , or 71);

{0, 6, 14, 24}+28n (n is equal to 0, 1, 2, . . . , 31, 40, . . . , or 71);

{0, 6, 16, 22}+28n (n is equal to 0, 1, 2, . . . , 31, 40, . . . , or 71);

{0, 6, 16, 24}+28n (n is equal to 0, 1, 2, . . . , 31, 40, . . . , or 71);

{0, 6, 18, 24}+28n (n is equal to 0, 1, 2, . . . , 31, 40, . . . , or 71);

{0, 8, 14, 20}+28n (n is equal to 0, 1, 2, . . . , 31, 40, . . . , or 71);

{0, 8, 14, 22}+28n (n is equal to 0, 1, 2, . . . , 31, 40, . . . , or 71);

{0, 8, 14, 24}+28n (n is equal to 0, 1, 2, . . . , 31, 40, . . . , or 71);

{0, 8, 16, 22}+28n (n is equal to 0, 1, 2, . . . , 31, 40, . . . , or 71);

{0, 8, 16, 24}+28n (n is equal to 0, 1, 2, . . . , 31, 40, . . . , or 71);

{0, 8, 18, 24}+28n (n is equal to 0, 1, 2, . . . , 31, 40, . . . , or 71);

{0, 10, 14, 20}+28n (n is equal to 0, 1, 2, . . . , 31, 40, . . . , or 71);

{0, 10, 14, 22}+28n (n is equal to 0, 1, 2, . . . , 31, 40, . . . , or 71);

{0, 10, 14, 24}+28n (n is equal to 0, 1, 2, . . . , 31, 40, . . . , or 71);

{0, 10, 16, 22}+28n (n is equal to 0, 1, 2, . . . , 31, 40, . . . , or 71);

{0, 10, 16, 24}+28n (n is equal to 0, 1, 2, . . . , 31, 40, . . . , or 71);

{0, 10, 18, 24}+28n (n is equal to 0, 1, 2, . . . , 31, 40, . . . , or 71);

{2, 8, 14, 20}+28n (n is equal to 0, 1, 2, . . . , 31, 40, . . . , or 71);

{2, 8, 14, 22}+28n (n is equal to 0, 1, 2, . . . , 31, 40, . . . , or 71);

{2, 8, 14, 24}+28n (n is equal to 0, 1, 2, . . . , 31, 40, . . . , or 71);

{2, 8, 16, 22}+28n (n is equal to 0, 1, 2, . . . , 31, 40, . . . , or 71);

{2, 8, 16, 24}+28n (n is equal to 0, 1, 2, . . . , 31, 40, . . . , or 71);

{2, 8, 18, 24}+28n (n is equal to 0, 1, 2, . . . , 31, 40, . . . , or 71);

{2, 10, 14, 20}+28n (n is equal to 0, 1, 2, . . . , 31, 40, . . . , or 71);

{2, 10, 14, 22}+28n (n is equal to 0, 1, 2, . . . , 31, 40, . . . , or 71);

{2, 10, 14, 24}+28n (n is equal to 0, 1, 2, . . . , 31, 40, . . . , or 71);

{2, 10, 16, 22}+28n (n is equal to 0, 1, 2, . . . , 31, 40, . . . , or 71);

{2, 10, 16, 24}+28n (n is equal to 0, 1, 2, . . . , 31, 40, . . . , or 71);

{2, 10, 18, 24}+28n (n is equal to 0, 1, 2, . . . , 31, 40, . . . , or 71);

{4, 10, 14, 20}+28n (n is equal to 0, 1, 2, . . . , 31, 40, . . . , or 71);

{4, 10, 14, 22}+28n (n is equal to 0, 1, 2, . . . , 31, 40, . . . , or 71);

{4, 10, 14, 24}+28n (n is equal to 0, 1, 2, . . . , 31, 40, . . . , or 71);

{4, 10, 16, 22}+28n (n is equal to 0, 1, 2, . . . , 31, 40, . . . , or 71);

{4, 10, 16, 24}+28n (n is equal to 0, 1, 2, . . . , 31, 40, . . . , or 71); and

{4, 10, 18, 24}+28n (n is equal to 0, 1, 2, . . . , 31, 40, . . . , or 71).

Alternatively, an index of the first symbol of a candidate SSB (candidate SS/PBCH blocks) meets any one of the following conditions:

{a, b, c, d, e, f, g, h}+56n (n is equal to 0, 1, 2, . . . , 15, 20, . . . , or 35).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 15, 20, . . . , or 35).

For another example, an index of the first symbol of a candidate SSB may meet {2, 10, 16, 24, 30, 38, 44, 52}+56n (n is equal to 0, 1, 2, . . . , 15, 20, . . . , or 35).

For another example, an index of the first symbol of a candidate SSB may meet {0, 8, 14, 22, 28, 36, 42, 50}+56n (n is equal to 0, 1, 2, . . . , 15, 20, . . . , or 35).

There are 256 positions for candidate SSBs, and a length of a DRS window is 2.25 ms. For example, a parameter "discoveryBurstWindowLength" or "discoveryBurstWindowLength-r16" or "discoveryBurstWindowLength-r17" may be used to indicate the length of the DRS window, for example, discoveryBurstWindowLength-r17 ENUMERATED {ms0dot5, ms1, ms2, ms2dot25, ms3, ms4, ms5}. For example, when a value of the parameter discoveryBurstWindowLength-r17 is ms2dot25, it may indicate that the length of the DRS window is 2.25 ms.

For example, when a subcarrier spacing of an SSB is 960 kHz, there are 320 positions for candidate SSBs, and a length of a DRS window is 3 ms. For a system operating on an unlicensed frequency band (or a system operating on a shared frequency band), an index of the first symbol of a candidate SSB (candidate SS/PBCH blocks) meets any one of the following conditions:

{0, 6}+14n (n is equal to 0, 1, 2, . . . , 63, 80, . . . , 143, 160, . . . , or 191);

{0, 8}+14n (n is equal to 0, 1, 2, . . . , 63, 80, . . . , 143, 160, . . . , or 191);

{0, 10}+14n (n is equal to 0, 1, 2, . . . , 63, 80, . . . , 143, 160, . . . , or 191);

{2, 8}+14n (n is equal to 0, 1, 2, . . . , 63, 80, . . . , 143, 160, . . . , or 191);

{2, 10}+14n (n is equal to 0, 1, 2, . . . , 63, 80, . . . , 143, 160, . . . , or 191);

{4, 10}+14n (n is equal to 0, 1, 2, . . . , 63, 80, . . . , 143, 160, . . . , or 191);

{0, 6, 14, 20}+28n (n is equal to 0, 1, 2, . . . , 31, 40, . . . , 71, 80, . . . , or 95);

{0, 6, 14, 22}+28n (n is equal to 0, 1, 2, . . . , 31, 40, . . . , 71, 80, . . . , or 95);

{0, 6, 14, 24}+28n (n is equal to 0, 1, 2, . . . , 31, 40, . . . , 71, 80, . . . , or 95);

{0, 6, 16, 22}+28n (n is equal to 0, 1, 2, . . . , 31, 40, . . . , 71, 80, . . . , or 95);

{0, 6, 16, 24}+28n (n is equal to 0, 1, 2, . . . , 31, 40, . . . , 71, 80, . . . , or 95);

{0, 6, 18, 24}+28n (n is equal to 0, 1, 2, . . . , 31, 40, . . . , 71, 80, . . . , or 95);

{0, 8, 14, 20}+28n (n is equal to 0, 1, 2, . . . , 31, 40, . . . , 71, 80, . . . , or 95);

{0, 8, 14, 22}+28n (n is equal to 0, 1, 2, . . . , 31, 40, . . . , 71, 80, . . . , or 95);

{0, 8, 14, 24}+28n (n is equal to 0, 1, 2, . . . , 31, 40, . . . , 71, 80, . . . , or 95);

{0, 8, 16, 22}+28n (n is equal to 0, 1, 2, . . . , 31, 40, . . . , 71, 80, . . . , or 95);

{0, 8, 16, 24}+28n (n is equal to 0, 1, 2, . . . , 31, 40, . . . , 71, 80, . . . , or 95);

{0, 8, 18, 24}+28n (n is equal to 0, 1, 2, . . . , 31, 40, . . . , 71, 80, . . . , or 95);

{0, 10, 14, 20}+28n (n is equal to 0, 1, 2, . . . , 31, 40, . . . , 71, 80, . . . , or 95);

{0, 10, 14, 22}+28n (n is equal to 0, 1, 2, . . . , 31, 40, . . . , 71, 80, . . . , or 95);

{0, 10, 14, 24}+28n (n is equal to 0, 1, 2, . . . , 31, 40, . . . , 71, 80, . . . , or 95);

{0, 10, 16, 22}+28n (n is equal to 0, 1, 2, . . . , 31, 40, . . . , 71, 80, . . . , or 95);

{0, 10, 16, 24}+28n (n is equal to 0, 1, 2, . . . , 31, 40, . . . , 71, 80, . . . , or 95);

{0, 10, 18, 24}+28n (n is equal to 0, 1, 2, . . . , 31, 40, . . . , 71, 80, . . . , or 95);

{2, 8, 14, 20}+28n (n is equal to 0, 1, 2, . . . , 31, 40, . . . , 71, 80, . . . , or 95);

{2, 8, 14, 22}+28n (n is equal to 0, 1, 2, . . . , 31, 40, . . . , 71, 80, . . . , or 95);

{2, 8, 14, 24}+28n (n is equal to 0, 1, 2, . . . , 31, 40, . . . , 71, 80, . . . , or 95);

{2, 8, 16, 22}+28n (n is equal to 0, 1, 2, . . . , 31, 40, . . . , 71, 80, . . . , or 95);

{2, 8, 16, 24}+28n (n is equal to 0, 1, 2, . . . , 31, 40, . . . , 71, 80, . . . , or 95);

{2, 8, 18, 24}+28n (n is equal to 0, 1, 2, . . . , 31, 40, . . . , 71, 80, . . . , or 95);

{2, 10, 14, 20}+28n (n is equal to 0, 1, 2, . . . , 31, 40, . . . , 71, 80, . . . , or 95);

{2, 10, 14, 22}+28n (n is equal to 0, 1, 2, . . . , 31, 40, . . . , 71, 80, . . . , or 95);

{2, 10, 14, 24}+28n (n is equal to 0, 1, 2, . . . , 31, 40, . . . , 71, 80, . . . , or 95);

{2, 10, 16, 22}+28n (n is equal to 0, 1, 2, . . . , 31, 40, . . . , 71, 80, . . . , or 95);

{2, 10, 16, 24}+28n (n is equal to 0, 1, 2, . . . , 31, 40, . . . , 71, 80, . . . , or 95);

{2, 10, 18, 24}+28n (n is equal to 0, 1, 2, . . . , 31, 40, . . . , 71, 80, . . . , or 95);

{4, 10, 14, 20}+28n (n is equal to 0, 1, 2, . . . , 31, 40, . . . , 71, 80, . . . , or 95);

{4, 10, 14, 22}+28n (n is equal to 0, 1, 2, . . . , 31, 40, . . . , 71, 80, . . . , or 95);

{4, 10, 14, 24}+28n (n is equal to 0, 1, 2, . . . , 31, 40, . . . , 71, 80, . . . , or 95);

{4, 10, 16, 22}+28n (n is equal to 0, 1, 2, . . . , 31, 40, . . . , 71, 80, . . . , or 95);

{4, 10, 16, 24}+28n (n is equal to 0, 1, 2, . . . , 31, 40, . . . , 71, 80, . . . , or 95); and {4, 10, 18, 24}+28n (n is equal to 0, 1, 2, . . . , 31, 40, . . . , 71, 80, . . . , or 95).

Alternatively, an index of the first symbol of a candidate SSB (candidate SS/PBCH blocks) meets any one of the following conditions:

{a, b, c, d, e, f, g, h}+56n (n is equal to 0, 1, 2, . . . , 15, 20, . . . , 35, 40, . . . , or 47).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 15, 20, . . . , 35, 40, . . . , or 47).

For another example, an index of the first symbol of a candidate SSB may meet {2, 10, 16, 24, 30, 38, 44, 52}+56n (n is equal to 0, 1, 2, . . . , 15, 20, . . . , 35, 40, . . . , or 47).

For another example, an index of the first symbol of a candidate SSB may meet {0, 8, 14, 22, 28, 36, 42, 50}+56n (n is equal to 0, 1, 2, . . . , 15, 20, . . . , 35, 40, . . . , or 47).

For example, when a subcarrier spacing of an SSB is 960 kHz, there are 384 positions for candidate SSBs, and a length of a DRS window is 3.5 ms. For a system operating on an unlicensed frequency band (or a system operating on a shared frequency band), an index of the first symbol of a candidate SSB (candidate SS/PBCH blocks) meets any one of the following conditions:

{0, 6}+14n (n is equal to 0, 1, 2, . . . , 63, 80, . . . , 143, 160, . . . , or 223);
{0, 8}+14n (n is equal to 0, 1, 2, . . . , 63, 80, . . . , 143, 160, . . . , or 223);
{0, 10}+14n (n is equal to 0, 1, 2, . . . , 63, 80, . . . , 143, 160, . . . , or 223);
{2, 8}+14n (n is equal to 0, 1, 2, . . . , 63, 80, . . . , 143, 160, . . . , or 223);
{2, 10}+14n (n is equal to 0, 1, 2, . . . , 63, 80, . . . , 143, 160, . . . , or 223);
{4, 10}+14n (n is equal to 0, 1, 2, . . . , 63, 80, . . . , 143, 160, . . . , or 223);
{0, 6, 14, 20}+28n (n is equal to 0, 1, 2, . . . , 31, 40, . . . , 71, 80, . . . , or 111);
{0, 6, 14, 22}+28n (n is equal to 0, 1, 2, . . . , 31, 40, . . . , 71, 80, . . . , or 111);
{0, 6, 14, 24}+28n (n is equal to 0, 1, 2, . . . , 31, 40, . . . , 71, 80, . . . , or 111);
{0, 6, 16, 22}+28n (n is equal to 0, 1, 2, . . . , 31, 40, . . . , 71, 80, . . . , or 111);
{0, 6, 16, 24}+28n (n is equal to 0, 1, 2, . . . , 31, 40, . . . , 71, 80, . . . , or 111);
{0, 6, 18, 24}+28n (n is equal to 0, 1, 2, . . . , 31, 40, . . . , 71, 80, . . . , or 111);
{0, 8, 14, 20}+28n (n is equal to 0, 1, 2, . . . , 31, 40, . . . , 71, 80, . . . , or 111);
{0, 8, 14, 22}+28n (n is equal to 0, 1, 2, . . . , 31, 40, . . . , 71, 80, . . . , or 111);
{0, 8, 14, 24}+28n (n is equal to 0, 1, 2, . . . , 31, 40, . . . , 71, 80, . . . , or 111);
{0, 8, 16, 22}+28n (n is equal to 0, 1, 2, . . . , 31, 40, . . . , 71, 80, . . . , or 111);
{0, 8, 16, 24}+28n (n is equal to 0, 1, 2, . . . , 31, 40, . . . , 71, 80, . . . , or 111);
{0, 8, 18, 24}+28n (n is equal to 0, 1, 2, . . . , 31, 40, . . . , 71, 80, . . . , or 111);
{0, 10, 14, 20}+28n (n is equal to 0, 1, 2, . . . , 31, 40, . . . , 71, 80, . . . , or 111);
{0, 10, 14, 22}+28n (n is equal to 0, 1, 2, . . . , 31, 40, . . . , 71, 80, . . . , or 111);
{0, 10, 14, 24}+28n (n is equal to 0, 1, 2, . . . , 31, 40, . . . , 71, 80, . . . , or 111);
{0, 10, 16, 22}+28n (n is equal to 0, 1, 2, . . . , 31, 40, . . . , 71, 80, . . . , or 111);
{0, 10, 16, 24}+28n (n is equal to 0, 1, 2, . . . , 31, 40, . . . , 71, 80, . . . , or 111);
{0, 10, 18, 24}+28n (n is equal to 0, 1, 2, . . . , 31, 40, . . . , 71, 80, . . . , or 111);
{2, 8, 14, 20}+28n (n is equal to 0, 1, 2, . . . , 31, 40, . . . , 71, 80, . . . , or 111);
{2, 8, 14, 22}+28n (n is equal to 0, 1, 2, . . . , 31, 40, . . . , 71, 80, . . . , or 111);
{2, 8, 14, 24}+28n (n is equal to 0, 1, 2, . . . , 31, 40, . . . , 71, 80, . . . , or 111);
{2, 8, 16, 22}+28n (n is equal to 0, 1, 2, . . . , 31, 40, . . . , 71, 80, . . . , or 111);
{2, 8, 16, 24}+28n (n is equal to 0, 1, 2, . . . , 31, 40, . . . , 71, 80, . . . , or 111);
{2, 8, 18, 24}+28n (n is equal to 0, 1, 2, . . . , 31, 40, . . . , 71, 80, . . . , or 111);
{2, 10, 14, 20}+28n (n is equal to 0, 1, 2, . . . , 31, 40, . . . , 71, 80, . . . , or 111);
{2, 10, 14, 22}+28n (n is equal to 0, 1, 2, . . . , 31, 40, . . . , 71, 80, . . . , or 111);
{2, 10, 14, 24}+28n (n is equal to 0, 1, 2, . . . , 31, 40, . . . , 71, 80, . . . , or 111);
{2, 10, 16, 22}+28n (n is equal to 0, 1, 2, . . . , 31, 40, . . . , 71, 80, . . . , or 111);
{2, 10, 16, 24}+28n (n is equal to 0, 1, 2, . . . , 31, 40, . . . , 71, 80, . . . , or 111);
{2, 10, 18, 24}+28n (n is equal to 0, 1, 2, . . . , 31, 40, . . . , 71, 80, . . . , or 111);
{4, 10, 14, 20}+28n (n is equal to 0, 1, 2, . . . , 31, 40, . . . , 71, 80, . . . , or 111);
{4, 10, 14, 22}+28n (n is equal to 0, 1, 2, . . . , 31, 40, . . . , 71, 80, . . . , or 111);
{4, 10, 14, 24}+28n (n is equal to 0, 1, 2, . . . , 31, 40, . . . , 71, 80, . . . , or 111);
{4, 10, 16, 22}+28n (n is equal to 0, 1, 2, . . . , 31, 40, . . . , 71, 80, . . . , or 111);
{4, 10, 16, 24}+28n (n is equal to 0, 1, 2, . . . , 31, 40, . . . , 71, 80, . . . , or 111); and
{4, 10, 18, 24}+28n (n is equal to 0, 1, 2, . . . , 31, 40, . . . , 71, 80, . . . , or 111).

Alternatively, an index of the first symbol of a candidate SSB (candidate SS/PBCH blocks) meets any one of the following conditions:

{a, b, c, d, e, f, g, h}+56n (n is equal to 0, 1, 2, . . . , 15, 20, . . . , 35, 40, . . . , or 55).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 15, 20, . . . , 35, 40, . . . , or 55).

For another example, an index of the first symbol of a candidate SSB may meet {2, 10, 16, 24, 30, 38, 44, 52}+56n (n is equal to 0, 1, 2, . . . , 15, 20, . . . , 35, 40, . . . , or 55).

For another example, an index of the first symbol of a candidate SSB may meet {0, 8, 14, 22, 28, 36, 42, 50}+56n (n is equal to 0, 1, 2, . . . , 15, 20, . . . , 35, 40, . . . , or 55).

There are 384 positions for candidate SSBs, and a length of a DRS window is 3.5 ms. For example, a parameter "discoveryBurstWindowLength" or "discoveryBurstWindowLength-r16" or "discoveryBurstWindowLength-r17" may be used to indicate the length of the DRS window, for example, discoveryBurstWindowLength-r17 ENUMERATED {ms0dot5, ms1, ms2, ms3, ms3dot5, ms4, ms5}. When a value of the parameter discoveryBurstWindowLength-r17 is ms2dot25, it may indicate that the length of the DRS window is 2.25 ms.

For example, when a subcarrier spacing of an SSB is 960 kHz, there are 416 positions for candidate SSBs, and a length of a DRS window is 4 ms. For a system operating on an unlicensed frequency band (or a system operating on a shared frequency band), an index of the first symbol of a candidate SSB (candidate SS/PBCH blocks) meets any one of the following conditions:

{0, 6}+14n (n is equal to 0, 1, 2, . . . , 63, 80, . . . , 143, 160, . . . , 223, 240, . . . , or 255);

{0, 8}+14n (n is equal to 0, 1, 2, . . . , 63, 80, . . . , 143, 160, . . . , 223, 240, . . . , or 255);

{0, 10}+14n (n is equal to 0, 1, 2, . . . , 63, 80, . . . , 143, 160, . . . , 223, 240, . . . , or 255);

{2, 8}+14n (n is equal to 0, 1, 2, . . . , 63, 80, . . . , 143, 160, . . . , 223, 240, . . . , or 255);

{2, 10}+14n (n is equal to 0, 1, 2, . . . , 63, 80, . . . , 143, 160, . . . , 223, 240, . . . , or 255);

{4, 10}+14n (n is equal to 0, 1, 2, . . . , 63, 80, . . . , 143, 160, . . . , 223, 240, . . . , or 255);

{0, 6, 14, 20}+28n (n is equal to 0, 1, 2, . . . , 31, 40, . . . , 71, 80, . . . , 111, 120, . . . , or 127);

{0, 6, 14, 22}+28n (n is equal to 0, 1, 2, . . . , 31, 40, . . . , 71, 80, . . . , 111, 120, . . . , or 127);

{0, 6, 14, 24}+28n (n is equal to 0, 1, 2, . . . , 31, 40, . . . , 71, 80, . . . , 111, 120, . . . , or 127);

{0, 6, 16, 22}+28n (n is equal to 0, 1, 2, . . . , 31, 40, . . . , 71, 80, . . . , 111, 120, . . . , or 127);

{0, 6, 16, 24}+28n (n is equal to 0, 1, 2, . . . , 31, 40, . . . , 71, 80, . . . , 111, 120, . . . , or 127);

{0, 6, 18, 24}+28n (n is equal to 0, 1, 2, . . . , 31, 40, . . . , 71, 80, . . . , 111, 120, . . . , or 127);

{0, 8, 14, 20}+28n (n is equal to 0, 1, 2, . . . , 31, 40, . . . , 71, 80, . . . , 111, 120, . . . , or 127);

{0, 8, 14, 22}+28n (n is equal to 0, 1, 2, . . . , 31, 40, . . . , 71, 80, . . . , 111, 120, . . . , or 127);

{0, 8, 14, 24}+28n (n is equal to 0, 1, 2, . . . , 31, 40, . . . , 71, 80, . . . , 111, 120, . . . , or 127);

{0, 8, 16, 22}+28n (n is equal to 0, 1, 2, . . . , 31, 40, . . . , 71, 80, . . . , 111, 120, . . . , or 127);

{0, 8, 16, 24}+28n (n is equal to 0, 1, 2, . . . , 31, 40, . . . , 71, 80, . . . , 111, 120, . . . , or 127);

{0, 8, 18, 24}+28n (n is equal to 0, 1, 2, . . . , 31, 40, . . . , 71, 80, . . . , 111, 120, . . . , or 127);

{0, 10, 14, 20}+28n (n is equal to 0, 1, 2, . . . , 31, 40, . . . , 71, 80, . . . , 111, 120, . . . , or 127);

{0, 10, 14, 22}+28n (n is equal to 0, 1, 2, . . . , 31, 40, . . . , 71, 80, . . . , 111, 120, . . . , or 127);

{0, 10, 14, 24}+28n (n is equal to 0, 1, 2, . . . , 31, 40, . . . , 71, 80, . . . , 111, 120, . . . , or 127);

{0, 10, 16, 22}+28n (n is equal to 0, 1, 2, . . . , 31, 40, . . . , 71, 80, . . . , 111, 120, . . . , or 127);

{0, 10, 16, 24}+28n (n is equal to 0, 1, 2, . . . , 31, 40, . . . , 71, 80, . . . , 111, 120, . . . , or 127);

{0, 10, 18, 24}+28n (n is equal to 0, 1, 2, . . . , 31, 40, . . . , 71, 80, . . . , 111, 120, . . . , or 127);

{2, 8, 14, 20}+28n (n is equal to 0, 1, 2, . . . , 31, 40, . . . , 71, 80, . . . , 111, 120, . . . , or 127);

{2, 8, 14, 22}+28n (n is equal to 0, 1, 2, . . . , 31, 40, . . . , 71, 80, . . . , 111, 120, . . . , or 127);

{2, 8, 14, 24}+28n (n is equal to 0, 1, 2, . . . , 31, 40, . . . , 71, 80, . . . , 111, 120, . . . , or 127);

{2, 8, 16, 22}+28n (n is equal to 0, 1, 2, . . . , 31, 40, . . . , 71, 80, . . . , 111, 120, . . . , or 127);

{2, 8, 16, 24}+28n (n is equal to 0, 1, 2, . . . , 31, 40, . . . , 71, 80, . . . , 111, 120, . . . , or 127);

{2, 8, 18, 24}+28n (n is equal to 0, 1, 2, . . . , 31, 40, . . . , 71, 80, . . . , 111, 120, . . . , or 127);

{2, 10, 14, 20}+28n (n is equal to 0, 1, 2, . . . , 31, 40, . . . , 71, 80, . . . , 111, 120, . . . , or 127);

{2, 10, 14, 22}+28n (n is equal to 0, 1, 2, . . . , 31, 40, . . . , 71, 80, . . . , 111, 120, . . . , or 127);

{2, 10, 14, 24}+28n (n is equal to 0, 1, 2, . . . , 31, 40, . . . , 71, 80, . . . , 111, 120, . . . , or 127);

{2, 10, 16, 22}+28n (n is equal to 0, 1, 2, . . . , 31, 40, . . . , 71, 80, . . . , 111, 120, . . . , or 127);

{2, 10, 16, 24}+28n (n is equal to 0, 1, 2, . . . , 31, 40, . . . , 71, 80, . . . , 111, 120, . . . , or 127);

{2, 10, 18, 24}+28n (n is equal to 0, 1, 2, . . . , 31, 40, . . . , 71, 80, . . . , 111, 120, . . . , or 127);

{4, 10, 14, 20}+28n (n is equal to 0, 1, 2, . . . , 31, 40, . . . , 71, 80, . . . , 111, 120, . . . , or 127);

{4, 10, 14, 22}+28n (n is equal to 0, 1, 2, . . . , 31, 40, . . . , 71, 80, . . . , 111, 120, . . . , or 127);

{4, 10, 14, 24}+28n (n is equal to 0, 1, 2, . . . , 31, 40, . . . , 71, 80, . . . , 111, 120, . . . , or 127);

{4, 10, 16, 22}+28n (n is equal to 0, 1, 2, . . . , 31, 40, . . . , 71, 80, . . . , 111, 120, . . . , or 127);

{4, 10, 16, 24}+28n (n is equal to 0, 1, 2, . . . , 31, 40, . . . , 71, 80, . . . , 111, 120, . . . , or 127); and {4, 10, 18, 24}+28n (n is equal to 0, 1, 2, . . . , 31, 40, . . . , 71, 80, . . . , 111, 120, . . . , or 127).

Alternatively, an index of the first symbol of a candidate SSB (candidate SS/PBCH blocks) meets any one of the following conditions:

{a, b, c, d, e, f, g, h}+56n (n is equal to 0, 1, 2, . . . , 15, 20, . . . , 35, 40, . . . , 55, 60, . . . , or 63).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 15, 20, . . . , 35, 40, . . . , 55, 60, . . . , or 63).

For another example, an index of the first symbol of a candidate SSB may meet {2, 10, 16, 24, 30, 38, 44, 52}+56n (n is equal to 0, 1, 2, . . . , 15, 20, . . . , 35, 40, . . . , 55, 60, . . . , or 63).

For another example, an index of the first symbol of a candidate SSB may meet {0, 8, 14, 22, 28, 36, 42, 50}+56n (n is equal to 0, 1, 2, . . . , 15, 20, . . . , 35, 40, . . . , 55, 60, . . . , or 63).

For example, when a subcarrier spacing of an SSB is 960 kHz, there are 512 positions for candidate SSBs, and a length of a DRS window is 5 ms. For a system operating on an unlicensed frequency band (or a system operating on a shared frequency band), an index of the first symbol of a candidate SSB (candidate SS/PBCH blocks) meets any one of the following conditions:

{0, 6}+14n (n is equal to 0, 1, 2, . . . , 63, 80, . . . , 143, 160, . . . , 223, 240, . . . , or 303);

{0, 8}+14n (n is equal to 0, 1, 2, . . . , 63, 80, . . . , 143, 160, . . . , 223, 240, . . . , or 303);

{0, 10}+14n (n is equal to 0, 1, 2, . . . , 63, 80, . . . , 143, 160, . . . , 223, 240, . . . , or 303);

{2, 8}+14n (n is equal to 0, 1, 2, . . . , 63, 80, . . . , 143, 160, . . . , 223, 240, . . . , or 303);

{2, 10}+14n (n is equal to 0, 1, 2, . . . , 63, 80, . . . , 143, 160, . . . , 223, 240, . . . , or 303);

{4, 10}+14n (n is equal to 0, 1, 2, . . . , 63, 80, . . . , 143, 160, . . . , 223, 240, . . . , or 303);

{0, 6, 14, 20}+28n (n is equal to 0, 1, 2, . . . , 31, 40, . . . , 71, 80, . . . , 111, 120, . . . , or 151);

{0, 6, 14, 22}+28n (n is equal to 0, 1, 2, . . . , 31, 40, . . . , 71, 80, . . . , 111, 120, . . . , or 151);

{0, 6, 14, 24}+28n (n is equal to 0, 1, 2, . . . , 31, 40, . . . , 71, 80, . . . , 111, 120, . . . , or 151);

{0, 6, 16, 22}+28n (n is equal to 0, 1, 2, . . . , 31, 40, . . . , 71, 80, . . . , 111, 120, . . . , or 151);

{0, 6, 16, 24}+28n (n is equal to 0, 1, 2, . . . , 31, 40, . . . , 71, 80, . . . , 111, 120, . . . , or 151);

{0, 6, 18, 24}+28n (n is equal to 0, 1, 2, . . . , 31, 40, . . . , 71, 80, . . . , 111, 120, . . . , or 151);

{0, 8, 14, 20}+28n (n is equal to 0, 1, 2, . . . , 31, 40, . . . , 71, 80, . . . , 111, 120, . . . , or 151);

{0, 8, 14, 22}+28n (n is equal to 0, 1, 2, . . . , 31, 40, . . . , 71, 80, . . . , 111, 120, . . . , or 151);

{0, 8, 14, 24}+28n (n is equal to 0, 1, 2, . . . , 31, 40, . . . , 71, 80, . . . , 111, 120, . . . , or 151);

{0, 8, 16, 22}+28n (n is equal to 0, 1, 2, . . . , 31, 40, . . . , 71, 80, . . . , 111, 120, . . . , or 151);

{0, 8, 16, 24}+28n (n is equal to 0, 1, 2, . . . , 31, 40, . . . , 71, 80, . . . , 111, 120, . . . , or 151);

{0, 8, 18, 24}+28n (n is equal to 0, 1, 2, . . . , 31, 40, . . . , 71, 80, . . . , 111, 120, . . . , or 151);

{0, 10, 14, 20}+28n (n is equal to 0, 1, 2, . . . , 31, 40, . . . , 71, 80, . . . , 111, 120, . . . , or 151);

{0, 10, 14, 22}+28n (n is equal to 0, 1, 2, . . . , 31, 40, . . . , 71, 80, . . . , 111, 120, . . . , or 151);

{0, 10, 14, 24}+28n (n is equal to 0, 1, 2, . . . , 31, 40, . . . , 71, 80, . . . , 111, 120, . . . , or 151);

{0, 10, 16, 22}+28n (n is equal to 0, 1, 2, . . . , 31, 40, . . . , 71, 80, . . . , 111, 120, . . . , or 151);

{0, 10, 16, 24}+28n (n is equal to 0, 1, 2, . . . , 31, 40, . . . , 71, 80, . . . , 111, 120, . . . , or 151);

{0, 10, 18, 24}+28n (n is equal to 0, 1, 2, . . . , 31, 40, . . . , 71, 80, . . . , 111, 120, . . . , or 151);

{2, 8, 14, 20}+28n (n is equal to 0, 1, 2, . . . , 31, 40, . . . , 71, 80, . . . , 111, 120, . . . , or 151);

{2, 8, 14, 22}+28n (n is equal to 0, 1, 2, . . . , 31, 40, . . . , 71, 80, . . . , 111, 120, . . . , or 151);

{2, 8, 14, 24}+28n (n is equal to 0, 1, 2, . . . , 31, 40, . . . , 71, 80, . . . , 111, 120, . . . , or 151);

{2, 8, 16, 22}+28n (n is equal to 0, 1, 2, . . . , 31, 40, . . . , 71, 80, . . . , 111, 120, . . . , or 151);

{2, 8, 16, 24}+28n (n is equal to 0, 1, 2, . . . , 31, 40, . . . , 71, 80, . . . , 111, 120, . . . , or 151);

{2, 8, 18, 24}+28n (n is equal to 0, 1, 2, . . . , 31, 40, . . . , 71, 80, . . . , 111, 120, . . . , or 151);

{2, 10, 14, 20}+28n (n is equal to 0, 1, 2, . . . , 31, 40, . . . , 71, 80, . . . , 111, 120, . . . , or 151);

{2, 10, 14, 22}+28n (n is equal to 0, 1, 2, . . . , 31, 40, . . . , 71, 80, . . . , 111, 120, . . . , or 151);

{2, 10, 14, 24}+28n (n is equal to 0, 1, 2, . . . , 31, 40, . . . , 71, 80, . . . , 111, 120, . . . , or 151);

{2, 10, 16, 22}+28n (n is equal to 0, 1, 2, . . . , 31, 40, . . . , 71, 80, . . . , 111, 120, . . . , or 151);

{2, 10, 16, 24}+28n (n is equal to 0, 1, 2, . . . , 31, 40, . . . , 71, 80, . . . , 111, 120, . . . , or 151);

{2, 10, 18, 24}+28n (n is equal to 0, 1, 2, . . . , 31, 40, . . . , 71, 80, . . . , 111, 120, . . . , or 151);

{4, 10, 14, 20}+28n (n is equal to 0, 1, 2, . . . , 31, 40, . . . , 71, 80, . . . , 111, 120, . . . , or 151);

{4, 10, 14, 22}+28n (n is equal to 0, 1, 2, . . . , 31, 40, . . . , 71, 80, . . . , 111, 120, . . . , or 151);

{4, 10, 14, 24}+28n (n is equal to 0, 1, 2, . . . , 31, 40, . . . , 71, 80, . . . , 111, 120, . . . , or 151);

{4, 10, 16, 22}+28n (n is equal to 0, 1, 2, . . . , 31, 40, . . . , 71, 80, . . . , 111, 120, . . . , or 151);

{4, 10, 16, 24}+28n (n is equal to 0, 1, 2, . . . , 31, 40, . . . , 71, 80, . . . , 111, 120, . . . , or 151); and {4, 10, 18, 24}+28n (n is equal to 0, 1, 2, . . . , 31, 40, . . . , 71, 80, . . . , 111, 120, . . . , or 151).

Alternatively, an index of the first symbol of a candidate SSB (candidate SS/PBCH blocks) meets any one of the following conditions:

{a, b, c, d, e, f, g, h}+56n (n is equal to 0, 1, 2, . . . , 15, 20, . . . , 35, 40, . . . , 55, 60, . . . , or 75).

A value of a is 0, 2, or 4; a value of b is 6, 8, or 10; a value of c is 14, 16, or 18; a value of d is 20, 22, or 24; a value of e is 28, 30, or 32; a value of f is 34, 36, or 38; a value of g is 42, 44, or 46; and a value of h is 48, 50, or 52.

For example, an index of the first symbol of a candidate SSB may meet {2, 8, 16, 22, 30, 36, 44, 50}+56n (n is equal to 0, 1, 2, . . . , 15, 20, . . . , 35, 40, . . . , 55, 60, . . . , or 75).

For another example, an index of the first symbol of a candidate SSB may meet {2, 10, 16, 24, 30, 38, 44, 52}+56n (n is equal to 0, 1, 2, . . . , 15, 20, . . . , 35, 40, . . . , 55, 60, . . . , or 75).

For another example, an index of the first symbol of a candidate SSB may meet {0, 8, 14, 22, 28, 36, 42, 50}+56n (n is equal to 0, 1, 2, . . . , 15, 20, . . . , 35, 40, . . . , 55, 60, . . . , or 75).

There are 128, 224, 256, 320, 384, 416, or 512 positions for candidate SSBs, and a length of a DRS window falls in {0.5 ms, 1 ms, 2 ms, 2.25 ms, 3 ms, 3.5 ms, 4 ms, 5 ms}. For example, a parameter "discoveryBurstWindowLength" or "discoveryBurstWindowLength-r16" or "discoveryBurst-WindowLength-r17" may be used to indicate the length of the DRS window, for example, discoveryBurstWindow-Length-r17 ENUMERATED {ms0dot5, ms1, ms2, ms2dot25, ms3, ms3dot5, ms4, ms5}.

It can be understood that, the DRS window described in this application may also be referred to as a DBTW (discovery burst transmission window).

What is claimed is:

1. A method for transmitting a synchronization/physical broadcast channel block (SS/PBCH block), wherein the method comprises:

receiving, by a terminal device, one SS/PBCH block;

obtaining, by the terminal device, indication information based on the one SS/PBCH block, wherein the indication information is useable to indicate candidate indexes of at least one SS/PBCH block in an SS/PBCH block burst set, a quantity of the candidate indexes is greater than 64, and the one SS/PBCH block is located in the SS/PBCH block burst set; and receiving, by the terminal device, configuration information, wherein the configuration information comprises a length of a discovery burst transmission window, the length of the discovery burst transmission window is greater than 5 ms, and the discovery burst transmission window is useable by the terminal device to receive a plurality of SS/PBCH block burst sets;

wherein at least two SS/PBCH block bursts of the plurality of SS/PBCH block burst sets occupy different corresponding slots, and corresponding positions of the at least two SS/PBCH block burst sets of the plurality of SS/PBCH block burst sets are the same;

at least two SS/PBCH block bursts of the plurality of SS/PBCH block burst sets occupy different corresponding slots, and corresponding positions of the at least two SS/PBCH block burst sets of the plurality of SS/PBCH block burst sets are different; or at least two SS/PBCH block bursts of the plurality of SS/PBCH block burst sets comprise different corresponding quantities of SS/PBCH blocks.

2. The method according to claim 1, wherein the indication information comprises information useable to indicate a demodulation reference signal (DMRS) sequence and information about PBCH payload, wherein the DMRS sequence occupies 3 bits, and the PBCH payload occupies 4 bits.

3. The method according to claim 1, wherein the quantity of the candidate indexes is greater than or equal to 128.

4. The method according to claim 1, wherein the SS/PBCH block burst set received by the terminal device from a network device is determined by the network device based on a listen before talk (LBT) result in response to the at least two of the plurality of SS/PBCH block burst sets occupying different corresponding slots, and the corresponding positions of SS/PBCH blocks in the at least two SS/PBCH block burst sets are the same.

5. The method according to claim 1, wherein the configuration information further comprises a discovery burst transmission window period, and the discovery burst transmission window period is different from an SS/PBCH block burst set periodicity.

6. The method according to claim 1, wherein one of:

a time-domain position occupied by the one SS/PBCH block in the SS/PBCH block burst set satisfies at least one of:

a start symbol of the one SS/PBCH block in the SS/PBCH block burst set is an even symbol between a first symbol and an eleventh symbol in one slot configured by the network device; or start symbols of two corresponding SS/PBCH blocks in the SS/PBCH block burst set that are adjacent to each other, are spaced by one or more of a third symbol, a fifth symbol or a ninth symbol; or the one SS/PBCH block and a physical downlink shared channel (PDSCH) associated with the one SS/PBCH block satisfies at least one of:

the PDSCH has a symbol length equal to 1 or 3; or a start symbol of the PDSCH is a second symbol of four symbols occupied by the one SS/PBCH block or a fourth symbol of four symbols occupied by the one SS/PBCH block.

7. A communication apparatus, comprising:

a processor; and a non-transitory memory coupled to the processor, the non-transitory memory configured to store non-transitory instructions, the processor being configured to execute the non-transitory instructions, to thereby cause the communication apparatus to:

receive one synchronization/physical broadcast channel block (SS/PBCH) block;

obtain indication information based on the one SS/PBCH block, wherein the indication information is useable to indicate candidate indexes of at least one SS/PBCH block in an SS/PBCH block burst set, a quantity of the candidate indexes is greater than 64, and the one SS/PBCH block is located in the SS/PBCH block burst set; and receive configuration information, wherein the configuration information comprises a length of a discovery burst transmission window, the length of the discovery burst transmission window is greater than 5 ms, and the discovery burst transmission window is useable by the terminal device to receive a plurality of SS/PBCH block burst sets;

wherein at least two SS/PBCH block bursts of the plurality of SS/PBCH block burst sets occupy different corresponding slots, and corresponding positions of the at least two SS/PBCH block burst sets of the plurality of SS/PBCH block burst sets are the same;

at least two SS/PBCH block bursts of the plurality of SS/PBCH block burst sets occupy different corresponding slots, and corresponding positions of the at least two SS/PBCH block burst sets of the plurality of SS/PBCH block burst sets are different; or at least two SS/PBCH block bursts of the plurality of SS/PBCH block burst sets comprise different corresponding quantities of SS/PBCH blocks.

8. The communication apparatus according to claim 7, wherein the indication information comprises information useable to indicate a demodulation reference signal (DMRS) sequence and information about PBCH payload, wherein the DMRS sequence occupies 3 bits, and the PBCH payload occupies 4 bits.

9. The communication apparatus according to claim 7, wherein the quantity of the candidate indexes is greater than or equal to 128.

10. The communication apparatus according to claim 7, wherein the SS/PBCH block burst set received by the terminal device from a network device is determined by the network device based on a listen before talk (LBT) result in response to the at least two of the plurality of SS/PBCH block burst sets occupying different corresponding slots, and the corresponding positions of SS/PBCH blocks in the at least two SS/PBCH block burst sets are the same.

11. The communication apparatus according to claim 7, wherein the configuration information further comprises a discovery burst transmission window period, and the discovery burst transmission window period is different from an SS/PBCH block burst set periodicity.

12. The communication apparatus according to claim 7, wherein one of:

a time-domain position occupied by the one SS/PBCH block in the SS/PBCH block burst set satisfies at least one of:

a start symbol of the one SS/PBCH block in the SS/PBCH block burst set is an even symbol between a first symbol and an eleventh symbol in one slot configured by the network device; or start symbols of two corresponding SS/PBCH blocks in the SS/PBCH block burst set that are adjacent to each other, are spaced by one or more of a third symbol, a fifth symbol or a ninth symbol; or the one SS/PBCH block and a physical downlink shared channel (PDSCH) associated with the one SS/PBCH block satisfies at least one of:

the PDSCH has a symbol length equal to 1 or 3; or a start symbol of the PDSCH is a second symbol of four symbols occupied by the one SS/PBCH block or a fourth symbol of four symbols occupied by the one SS/PBCH block.

* * * * *